(12) United States Patent
Ma et al.

(10) Patent No.: US 11,526,155 B2
(45) Date of Patent: Dec. 13, 2022

(54) COMPUTER SYSTEM AND METHOD FOR BATCH DATA ALIGNMENT WITH ACTIVE LEARNING IN BATCH PROCESS MODELING, MONITORING, AND CONTROL

(71) Applicant: AspenTech Corporation, Bedford, MA (US)

(72) Inventors: Jian Ma, Lexington, MA (US); Chen Yang, Watertown, MA (US); Hong Zhao, Sugar Land, TX (US); Mark-John Bruwer, Richmond, TX (US); Timothy Lim, Braintree, MA (US)

(73) Assignee: AspenTech Corporation, Bedford, MA (US)

( * ) Notice: Subject to any disclaimer, the term of this patent is extended or adjusted under 35 U.S.C. 154(b) by 370 days.

(21) Appl. No.: 16/943,312

(22) Filed: Jul. 30, 2020

(65) Prior Publication Data

US 2022/0035348 A1 Feb. 3, 2022

(51) Int. Cl.
  *G05B 19/418* (2006.01)
  *G06F 16/28* (2019.01)
  *G06N 20/00* (2019.01)

(52) U.S. Cl.
  CPC ..... *G05B 19/41835* (2013.01); *G06F 16/285* (2019.01); *G06N 20/00* (2019.01);
  (Continued)

(58) Field of Classification Search
  None
  See application file for complete search history.

(56) References Cited

U.S. PATENT DOCUMENTS 7,793,292 B2 9/2010 Worek et al.
10,133,268 B2 11/2018 Bokis et al.
(Continued)

FOREIGN PATENT DOCUMENTS

WO 2011146914 A2 11/2011
WO 2022026114 A1 2/2022

OTHER PUBLICATIONS

Nomikos, P., et al., "Monitoring Batch Processing Using Multiway Principal Component Analysis," AIChE Journal 40(8), pp. 1361-1375 (Aug. 1994).
(Continued)

*Primary Examiner* — Sean Shechtman
(74) *Attorney, Agent, or Firm* — Hamilton, Brook, Smith & Reynolds, P.C.

(57) ABSTRACT

Computer-based methods and systems provide automated batch data alignment for a batch production industrial process. An example embodiment selects a reference batch from batch data for a subject industrial process and configures batch alignment settings. In turn, a seed model configured to predict alignment quality given settings for one or more alignment hyperparameters is constructed. Collectively the selected reference batch, the configured batch alignment settings, the constructed seed model, and a set of representative batches, representative of the batch data for the industrial process, are used to perform at least one of: (i) automated active learning, (ii) interactive active learning, and (iii) guided learning to determine settings for the one or more alignment hyperparameters. Then, a batch alignment is performed using the determined settings for the one or more alignment hyperparameters and the configured batch alignment settings. The resulting aligned batch data of the subject industrial process enables improved modeling and control of batch productions by the subject industrial process.

27 Claims, 31 Drawing Sheets
(13 of 31 Drawing Sheet(s) Filed in Color)

(52) U.S. Cl.
CPC ............. *G05B 2219/31449* (2013.01); *G05B 2219/32396* (2013.01)

(56) References Cited

U.S. PATENT DOCUMENTS

| | | | |
|---|---|---|---|
| 2004/0243380 | A1 | 12/2004 | Blevins et al. |
| 2009/0287320 | A1 | 11/2009 | MacGregor et al. |
| 2010/0057237 | A1 | 3/2010 | Kettaneh et al. |
| 2011/0288660 | A1 | 11/2011 | Wojsznis et al. |
| 2011/0288837 | A1 | 11/2011 | Blevins et al. |
| 2019/0332101 | A1 | 10/2019 | Castillo Castillo et al. |
| 2020/0057958 | A1 | 2/2020 | Moore et al. |
| 2020/0150601 | A1 | 5/2020 | Valpola |

OTHER PUBLICATIONS

Gonzalez-Martinez, J., et al., "Real-time synchronization of batch trajectories for on-line multivariate statistical process control using Dynamic Time Warping," Chemometrics and Intelligent Laboratory Systems, 105(2), pp. 195-206 (2011).

Dai, C., et al., "Monitoring Profile Trajectories with Dynamic Time Warping Alignment," Quality and Reliability Engineering International, 30(6), pp. 815-827 (2014).

Gonzalez-Martinez, et al., "Multi-synchro: a novel approach for batch synchronization in scenarios of multiple asynchronisms," Journal of Chemometrics, 28(5), pp. 462-475 (2014).

Ramaker, H.J., et al., "Dynamic time warping of spectroscopic Batch data," Analytica Chimica Acta, 498(1), pp. 133-153 (2003).

Zhang, Y., et al., "A Robust Dynamic Time Warping Algorithm for Batch Trajectory Synchronization," American Control Conference, pp. 2864-2869 (Jun. 2008).

Tong, S., et al., "Support Vector Machine Active Learning with Applications to Text Classification," Journal of Machine Learning Research, pp. 45-66 (2001).

Guo, Y., et al., "Discriminative Batch Mode Active Learning," Proceeding NIPS'07 Proceedings of the 20th International Conference on Neural Information Processing Systems, pp. 593-600 (Dec. 2007).

Keogh, E., et al. "Segmenting Time Series: A Survey and Novel Approach," In M. Last, A. Kandel & H. Bunke (Eds.), Data mining in time series databases (pp. 1-15), Singapore: World Scientific Publishing (2004).

Kiefer, J., "Sequential Minimax Search for a Maximum," Proceedings of the American Mathematical Society, 4(3), 502-506 (1953).

Kashima, "Average trajectory calculation for bath processes using Dynamic Time Warping", SICE Annual Conference, Proceedings of, IEEE, Aug. 18, 2010, pp. 2939-2941.

International Search Report and the Written Opinion of the International Searching Authority, or the Declaration for International Application No. PCT/US2019/023160, entitled: "Computer System And Method For Automated Batch Data Alignment In Batch Process Modeling, Monitoring And Control", dated Jun. 24, 2019.

Cherry, et al., "Multiblock Principal Component Analysis Based on a Combined Index for Semiconductor Fault Detection and Diagnosis" May 2006, IEEE Transactions on Semiconductor Manufacturing vol. 19 No. 2, pp. 159-172 (Year: 2006).

Kassidas et al., "Synchronization of Batch Trajectories Using Dynamic Time Warping", Apr. 1998, AIChE Journal vol. 44 No. 4, (Year: 1998).

International Search Report and Writtien Opinion of PCT/US2021/040070 dated Oct. 18, 2021, titled "Computer System and Method for Batch Data Alignment with Active Learning In Batch Process Modeling, Monitoring, And Control".

Fransson M et al: "Real-time alignment of batch process data using COW for on-line process monitoring", Chemometrics and Intelligent Laboratory Systems, Elsevier Science Publishers B.V. Amsterdam, NL, vol. 84, No. 1-2, Dec. 1, 2006.

International Preliminary Report on Patentability, issued in PCT/US2019/023160, entitled "Computer System and Method for Automated Batch Data Alignment in Batch Process Modeling, Monitoring and Control," 11 pages, dated Nov. 12, 2020.

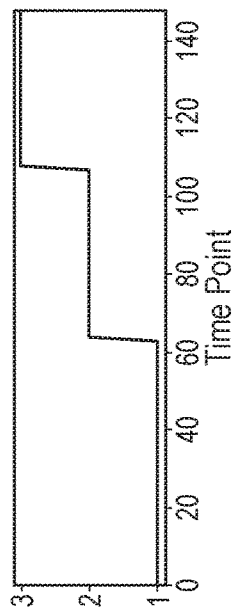
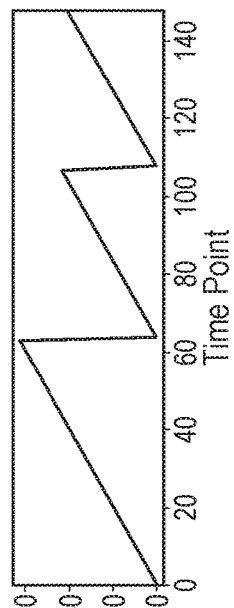
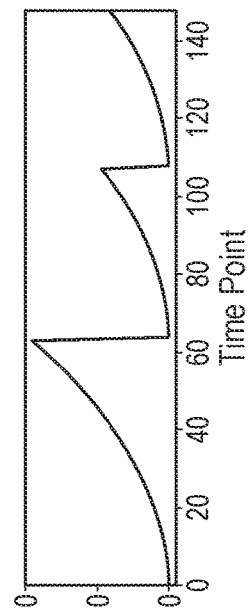
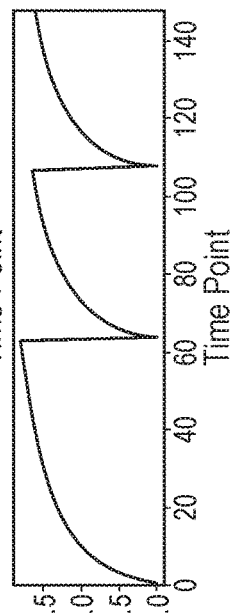
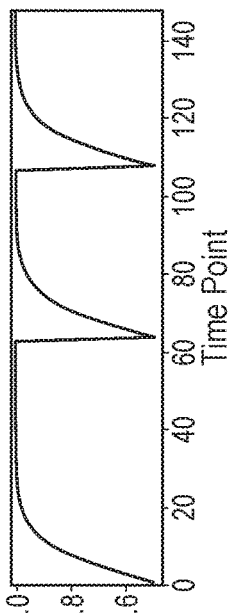

1500

| | Alignment Hyperparameters (X) | | | | | Performance Metrics (Y) | | | |
|---|---|---|---|---|---|---|---|---|---|
| Obs ID | Time Smoothness | Window Size | Difference Penalty | Search Interval | Variable Generator | Batch Maturity Generator | Phase ID Score | Total Alignment Score | Time Taken |
| 83 | 18.8125 | 11 | 0.5625 | 1.028125 | Sigmoid | 74.64947423 | 88.57452342 | 80.86507581 | 38.2147116 |
| 98 | 3.96875 | 13 | 0.53125 | 1.0253125 | Sigmoid | 74.0357348 | 89.01824272 | 80.65849094 | 38.9099199 |
| 69 | 14.65625 | 16 | 0.71875 | 1.0009375 | Steps | 74.52836314 | 87.85941613 | 80.56253138 | 25.037014 |
| 58 | 6.9375 | 13 | 0.9375 | 1.016875 | Steps | 73.84121225 | 88.5973198 | 80.4647072 | 39.4580915 |
| 14 | 14.65625 | 16 | 0.71875 | 1.0009375 | SawTooth | 73.62953643 | 88.24179757 | 80.24298952 | 20.8634754 |
| 49 | 8.125 | 17 | 0.625 | 1.00375 | Steps | 73.61435127 | 87.95018229 | 80.13016229 | 38.6190186 |
| 80 | 3.375 | 22 | 0.875 | 1.02625 | Sigmoid | 72.85170055 | 88.57833333 | 79.90067521 | 103.1940347 |
| 4 | 16.4375 | 23 | 0.4375 | 1.001875 | SawTooth | 72.9809869 | 88.06683239 | 79.83606431 | 45.3137367 |
| 54 | 14.0625 | 26 | 0.8125 | 1.005625 | Steps | 72.50381959 | 88.64367537 | 79.80069435 | 110.4859831 |
| 47 | 15.25 | 15 | 0.75 | 1.0075 | Steps | 72.52690921 | 88.4453728 | 79.71957479 | 39.4283685 |
| 61 | 2.1875 | 28 | 0.6875 | 1.009375 | Steps | 72.30342104 | 88.42520421 | 79.62790445 | 141.4368631 |
| 55 | 18.8125 | 11 | 0.5625 | 1.028125 | Steps | 72.03946114 | 88.85644097 | 79.5671615 | 43.9594257 |
| 59 | 16.4375 | 23 | 0.4375 | 1.001875 | Steps | 72.23262106 | 87.94604384 | 79.42681548 | 65.3065487 |
| 90 | 2.78125 | 19 | 0.84375 | 1.0121875 | Sigmoid | 71.61751336 | 88.97846966 | 79.40827531 | 54.0163433 |
| 78 | 14.0625 | 26 | 0.8125 | 1.005625 | SawTooth | 71.86354336 | 88.25222376 | 79.31539078 | 68.3628229 |
| 62 | 2.78125 | 19 | 0.84375 | 1.0121875 | Steps | 71.3128533 | 88.96832136 | 79.27091909 | 61.9132399 |
| 6 | 2.1875 | 28 | 0.6875 | 1.009375 | SawTooth | 71.5145695 | 88.28476859 | 79.15375708 | 93.8452987 |
| 3 | 6.9375 | 13 | 0.9375 | 1.016875 | SawTooth | 70.47293584 | 88.92673311 | 78.8711901 | 30.7991918 |
| 71 | 3.96875 | 13 | 0.53125 | 1.0253125 | Steps | 70.67731695 | 88.7282443 | 78.76224325 | 44.3120822 |
| 85 | 6.9375 | 13 | 0.9375 | 1.016875 | Sigmoid | 70.12395351 | 89.08622196 | 78.60069869 | 33.1062706 |
| 73 | 10.5 | 20 | 0.5 | 1.015 | Sigmoid | 70.49809169 | 88.53535674 | 78.54121073 | 63.0831434 |
| 23 | 8.125 | 17 | 0.625 | 1.00375 | SawTooth | 70.05811279 | 88.61992033 | 78.47762396 | 27.3375132 |
| 74 | 15.25 | 15 | 0.75 | 1.0075 | Sigmoid | 70.09200104 | 89.08914074 | 78.44959091 | 31.5169073 |
| 52 | 3.375 | 22 | 0.875 | 1.02625 | Steps | 69.48119658 | 89.18281502 | 78.28058044 | 110.7135323 |
| 65 | 7.53125 | 24 | 0.59375 | 1.0196875 | Steps | 69.78705412 | 88.5239734 | 78.18603973 | 123.1770197 |
| 88 | 2.1875 | 28 | 0.6875 | 1.009375 | Sigmoid | 69.72149354 | 88.70016333 | 78.17809814 | 150.4311143 |
| 93 | 7.53125 | 24 | 0.59375 | 1.0196875 | Sigmoid | 69.75006372 | 88.44088751 | 78.05666997 | 99.3449223 |
| 68 | 19.40625 | 21 | 0.96875 | 1.0234375 | Steps | 69.06385631 | 88.8168413 | 78.04146095 | 96.4666337 |
| 1 | 15.25 | 15 | 0.75 | 1.0075 | SawTooth | 69.13298124 | 88.62736824 | 77.91311409 | 26.9103599 |
| 10 | 7.53125 | 24 | 0.59375 | 1.0196875 | SawTooth | 68.97447336 | 88.66159958 | 77.91036637 | 83.0478237 |
| 96 | 14.65625 | 16 | 0.71875 | 1.0009375 | Sigmoid | 69.33830774 | 88.78565931 | 77.89731555 | 25.0761365 |
| 64 | 17.03125 | 14 | 0.09375 | 1.0046875 | Steps | 68.23524552 | 89.46639748 | 77.87531126 | 34.1925291 |
| 95 | 19.40625 | 21 | 0.96875 | 1.0234375 | Sigmoid | 69.03075278 | 88.90575744 | 77.86384778 | 76.78707 |

FIG. 15

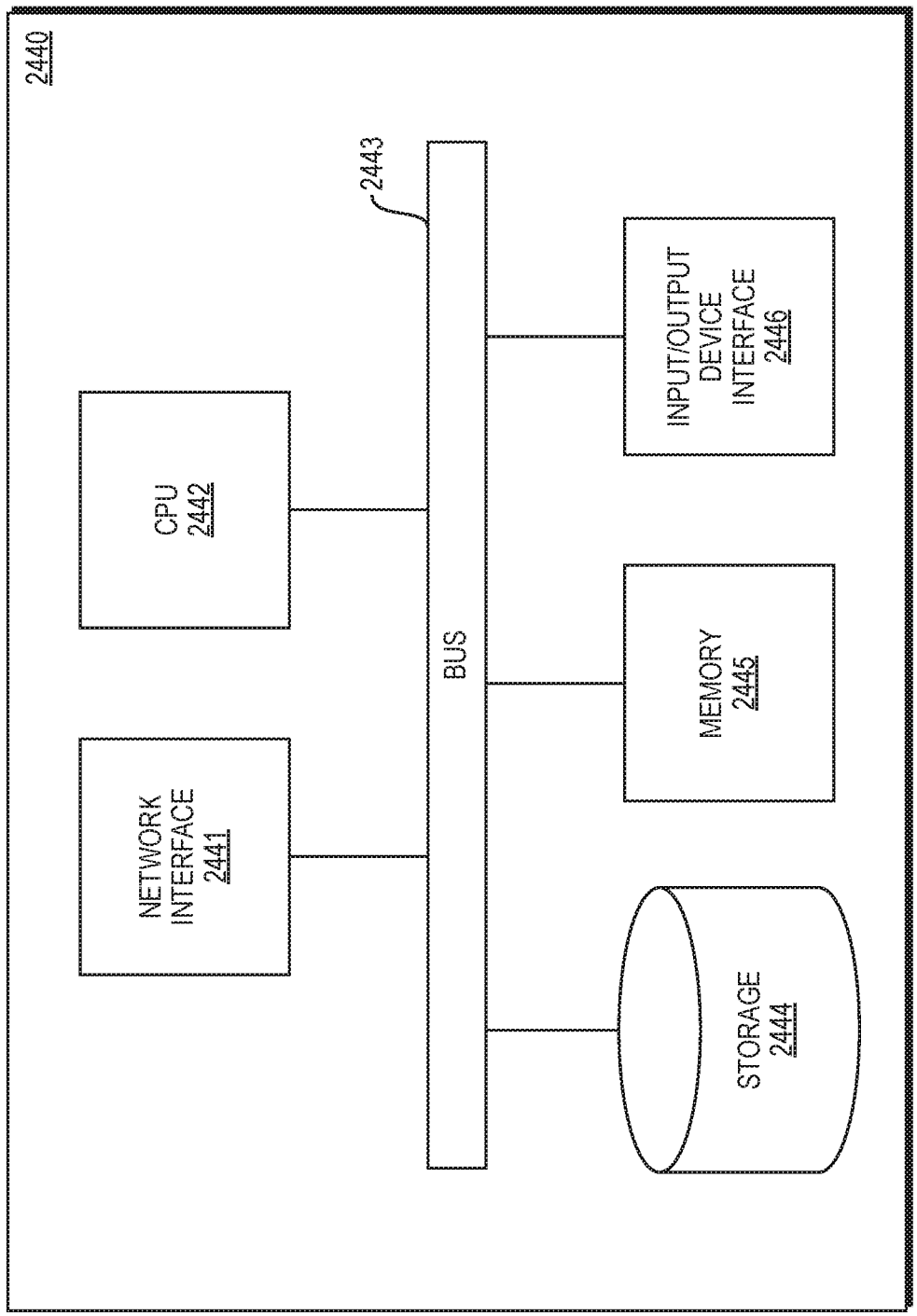

COMPUTER SYSTEM AND METHOD FOR BATCH DATA ALIGNMENT WITH ACTIVE LEARNING IN BATCH PROCESS MODELING, MONITORING, AND CONTROL

BACKGROUND

In the process industry, advanced process control, such as Multivariable Predictive Control (MPC) and real-time optimization (RT-OPT), have been progressing and applied in practice over the last three decades. Thousands of MPC systems are running in refineries, chemical plants, petrochemical processing units, and other manufacturing environments to maintain the safe operation of processes, e.g., manufacturing processes, while maximizing process margins, i.e., efficiency. However, most of the successful uses of MPC systems are concentrated in continuous manufacturing processes. In another type of important production process often seen in the process industry, batch processes, the state of the art, however, is quite behind. Many batch processes are still running with conventional proportional-integral-derivative (PID) control or manual control.

Batch processes play an important role in many industries such as specialty chemical, pharmaceutical, food, and biological products, polymer processing, semiconductor manufacturing, and metallurgy, amongst others. Therefore, developing and deploying advanced modeling, monitoring, and control systems in batch production processes is desirable and very beneficial to many manufacturers. The uses of advanced modeling monitoring and control is particularly advantageous for processes in the special chemicals, pharmaceutical, traditional energy, and petro-chemical industries.

SUMMARY

A batch process is a process with defined start and end conditions and some transient evolution of behavior (captured by measured variables) in between. Typical batch process examples are often seen in the manufacturing industry of special chemicals, pharmaceuticals, blending and mixing, polymer processing, semi-conductor manufacturing, and processing of food products, amongst other examples. Batch production processes have a number of special characteristics that make it difficult to simply apply many of the existing modeling approaches that are used for process monitoring, control, and optimization for continuous processes. Instead, a set of special modeling and control technologies for batch processes are typically utilized. For example, batch-specific Principal Component Analysis (PCA) and Projection to Latent Structure (PLS) multivariate statistical model structures are proposed and used to monitor and control batch processes (See Paul Nomikos, John F. MacGregor, "Monitoring Batch Processes Using Multiway Principal Component Analysis, AIChE Journal," 40(8), 1361-1375 (August 1994)).

A problem in data-driven batch modeling is that the time duration of each batch completion may be inconsistent. This makes "batch data alignment" important prior to any modeling or analysis of historical batch data. Likewise, "batch data alignment" is important prior to real-time batch monitoring and control of live batch data. "Batch data alignment" refers to functionality to resample raw batch time-series data so that the resampled data has exactly the same number of sampled values as a selected, representative reference batch. The sampling time-points are chosen with equal or non-equal sample intervals along the duration of the raw batch data so that the resampled data patterns match the patterns in the reference batch as closely as possible for all the resampled variables (e.g. temperature, pressure, level, etc. time-series variables). Although academic research and case studies on batch data alignment problems are reported (See González-Martínez, J. M., Ferrer, A., & Westerhuis, J. A., "Real-time synchronization of batch trajectories for on-line multivariate statistical process control using Dynamic Time Warping," Chemometrics and Intelligent Laboratory Systems, 105(2), 195-206 (January 2011); Dai, C., Wang, K., & Jin, R., "Monitoring Profile Trajectories with Dynamic Time Warping Alignment," Quality and Reliability Engineering International, 30(6), 815-827 (June 2014); González Martínez, J. M., De Noord, O., & Ferrer, A. "Multi-synchro: a novel approach for batch synchronization in scenarios of multiple asynchronisms," Journal of Chemometrics, 28(5): 462-475 (October 2014); Ramaker, H. J., van Sprang, E. N., Westerhuis, J. A., & Smilde, A. K., "Dynamic time warping of spectroscopic BATCH data," Analytica Chimica Acta, 498(1), 133-153 (August 2003); Zhang, Y., & Edgar, T. F., "A Robust Dynamic Time Warping Algorithm for Batch Trajectory Synchronization," American Control Conference, pp. 2864-2869 (June 2008)), in these existing approaches, the proposed approaches are based on the Dynamic Time Warping (DTW) algorithm. However, this is problematic because the DTW approach may result in undesirable alignment results in some cases (Zhang, Y., & Edgar, T. F., "A Robust Dynamic Time Warping Algorithm for Batch Trajectory Synchronization," American Control Conference, pp. 2864-2869 (June 2008)) and the DTW approach is not mature enough for industrial practice, i.e., the DTW approach cannot be employed to monitor, control, and optimize real-world processing.

Recent work developed by the Applicant addressed batch process modeling and batch data alignment issues with a systematic method and improved efficiency. See U.S. patent application Ser. No. 15/967,099, entitled "Computer System and Method For Automated Batch Data Alignment In Batch Process Modeling, Monitoring And Control" the contents of which are incorporated herein by reference in their entirety. This earlier functionality uses a comprehensive method (and system) that addresses many steps of batch data alignment and provides an automated workflow suitable for both offline batch data alignment for modeling and online batch data alignment for process monitoring and control.

Aligning batch trajectory data properly to a reference batch in nearly real time is very useful, but extremely challenging. The prior work detailed in U.S. patent application Ser. No. 15/967,099, referred to herein as the "online dynamic method" provides significant improvements over existing batch data alignment techniques. However, several issues have been observed in recent practice with industrial applications of the online dynamic method. The online dynamic alignment method works for some industrial batch processes with default settings for the alignment hyperparameters, but the online dynamic method has difficulty aligning batch data for other processes. Observed errors include: a) phase identity prediction with error, b) batch maturity prediction jumping forward or backward rather than advancing smoothly, and c) in some cases, the batch maturity never reaches 100%. Moreover, with the online dynamic method, the batch alignment model with default parameters is not always robust for industrial batch data with higher variability. For some applications these issues limit the capability of using the online dynamic method for accurate batch modeling, monitoring, and control. This can negatively impact the production rate and profit margin of batch processes that are controlled based upon the results determined through methods that rely on the alignment methods of U.S. patent application Ser. No. 15/967,099.

Further, when the default hyperparameter settings for the online dynamic alignment method do not work well, it is very difficult and tedious for users, especially new and less experienced users, to manually tune these hyperparameters without any guidance. A user may have to repeatedly go through a trial and error approach for many iterations to produce alignment results with the desired quality. When this occurs, each iteration executes an alignment experiment under a certain condition for the given dataset with the selected alignment method. The time it takes to run an alignment experiment can vary from a few seconds to hours, depending on the size of the batch dataset and the alignment method chosen. Visually comparing alignment results from several alignment experiments by users is very time-consuming and when using the online dynamic method, it has been challenging to extract insights on how to tune these hyperparameters to achieve better alignment quality. Without a quantified measurement for the results of an alignment experiment, systematically comparing alignment results from several alignment experiments without human intervention is not possible. Thus, in the practice of industrial batch process simulation and control, there is an urgent need for a quantified measurement for alignment results and for providing systematic guidance of alignment parameter selections and settings.

Recently, rapid development and applications of Artificial Intelligence (AI) and Machine Learning (ML) provide new opportunities for industrial practitioners. Active learning (AL) is an effective strategy to help speed up a process of data recognition and labeling. A typical workflow for active learning starts with a pool of unlabeled data, picks up a few points with heuristic learners, and determines labels for these few points. Then, a process is iterated that includes: (i) fitting a classifier to the labels seen so far and (ii) querying an unlabeled point that is closest to the boundary (or most uncertain, or most likely to decrease overall uncertainty). As a special case of supervised machine learning, active learning is well-motivated in many modern machine learning problems, where it is time-consuming or expensive to prepare labels for unlabeled observations. Because an active learning learner actively chooses the most informative observation to be labeled next, the total number of observations required to be labeled to establish insights for a study subject is typically much smaller than the number of observations required in a nondiscrimination supervised machine learning method.

In the batch alignment scenario, an unlabeled observation is an alignment experiment under a condition and the label for the observation is a quantified performance metric evaluated with the alignment experiment's alignment results. As such, for the case of batch alignment labeling, determining an observation for the alignment problem is an expensive operation because it requires performing an alignment experiment, i.e., an alignment with particular conditions. Therefore, active learning is a good approach to provide systematic guidance of alignment parameter selection, i.e., guidance for alignment conditions, for batch alignment, if a quantified measurement for the alignment results can be provided. In other words, if the quality of an alignment can be quantified, active learning is a good approach to use to provide guidance on alignment parameters, i.e., hyperparameters, to use and the value(s) for the alignment parameters.

Active learning has been used to address classification problems. For instance, academic research has explored ways to minimize the number of instances to be labelled and how they are labelled. Most studies focus on selecting a single most informative unlabeled instance to be labeled at a time. This is problematic because it can cause biased decisions with great uncertainty. Even though some batch mode active learning methods have been proposed to extend those single instance selection strategies so as to overcome the potential biased decisions, the biased decisions are still problematic. Details can be found from Simon Tong, Daphne Koller, "Support Vector Machine Active Learning with Applications to Text Classification", Journal of Machine Learning Research (2001), 45-66 (November 2001); Yuhong Guo, Dale Schuurmans, "Discriminative Batch Mode Active Learning", Proceeding NIPS'07 Proceedings of the 20th International Conference on Neural Information Processing Systems, Pages 593-600, Dec. 3-6, 2007, ISBN: 978-1-60560-352-0. Active learning is not known to address any batch data alignment issues, which is not a classification problem.

Embodiments provide comprehensive systems and methods to address several alignment issues observed in industrial applications of existing alignment methods, such as the online dynamic alignment method described in U.S. patent application Ser. No. 15/967,099. For example, embodiments address errors for phase ID prediction and/or jagged progress for batch maturity or a batch never reaching 100% maturity in a process. Embodiments also address the problem that existing methods are not always robust for industrial batch data with higher variability, and embodiments address the difficulty of selecting alignment hyperparameters and settings when the default settings do not work well. Embodiments also include a default alignment environment, i.e., default batch alignment settings, and an environment library, i.e., database storing alignment settings, to make it easier to set up, customize, and switch the alignment environment (settings) and produce consistent alignment results.

Embodiments solve these problems through use of intermediate derived pseudo time-series variable(s) that are generated and used implicitly as alignment-guidance variable(s) during the batch alignment. Embodiments can also utilize alignment-guidance-only process variables that are explicitly provided based on process domain knowledge and expertise to help the batch alignment process. Embodiments can also leverage purpose-built performance metrics to measure the batch trajectory alignment quality. Using the performance metrics also allows embodiments to employ learning workflows. Embodiments can employ an automated active learning workflow to recommend settings for alignment hyperparameters that maximize predicted batch trajectory alignment quality within given constraints. Further, embodiments can employ an interactive active learning workflow that allows users to explore potential settings inside and/or outside typical ranges for hyperparameters and trade-off among the predicted alignment quality metrics to select settings for hyperparameters. Moreover, when further exploratory experiments are needed, guided learning can also be used to prepare another run of machine learning. Further still, embodiments can implement an alignment environment library to manage settings of hyperparameters for active learning and guided learning workflows so as to facilitate alignment environment setup and produce consistent alignment results.

Purpose-Built Performance Metrics and Alignment Acceptance Criteria

Embodiments provide purpose-built performance metrics to measure the batch alignment quality for an executed alignment experiment objectively and systematically. In contrast, existing methods only evaluate alignment quality through visual inspection by an expert with domain knowledge. Further, embodiments allow the performance metrics for different alignment methods to be varied. For example, for an enhanced online dynamic alignment method, the metrics may evaluate the batch maturity score (smoothness of maturity progress), the phase ID score (errors on batch phase ID prediction), and the total quality score (combining the batch maturity score and the phase ID score). Such an embodiment may also consider the amount of time it takes to run the alignment process.

Embodiments also provide quantified performance metrics that enable comparison without human intervention between alignment results produced with different alignment experiments for the same underlying batch dataset. Use of the quantified performance metrics also makes automation possible. In an embodiment, the alignment acceptance criteria are defined with settings or thresholds for some or all performance metrics for a given alignment method. In such an embodiment, when the performance metrics satisfy the acceptance criteria, the results from the alignment experiment are acceptable and such an embodiment can proceed to build a batch model with the aligned batch dataset. Because different alignment methods can have different performance metrics, the corresponding acceptance criteria for different alignment methods can be varied. For instance, in the example of an enhanced online dynamic alignment method, the default acceptance criteria are 1) the total quality score being higher than the minimal threshold and 2) the total time it takes to finish the alignment must be less than a maximum allowed alignment time. In an embodiment, the settings or thresholds can be adjusted to tighten or relax the acceptance criteria. For each performance metric, for a given alignment method, embodiments, via a user, can also customize the alignment method's definition and adjust the method's threshold(s) to affect the acceptance criteria.

Supervised Machine Learning Model Built on the Alignment Metadata Datasheet

For any given alignment method, it may not be practical (or even possible) to execute all possible combinations of hyperparameter settings to achieve the best possible alignment results without a significant investment in computing resources and time. In the example of the enhanced online dynamic method, there are thousands of unrepeated alignment experimental conditions that can be generated with five hyperparameters and a list of typical options, settings, and ranges for each hyperparameter. Executing thousands of alignments using these various settings is not practical.

Rather than performing thousands of alignment experiments to determine settings or using a trial and error approach, embodiments automatically build a supervised machine learning model based on an alignment metadata datasheet with a limited amount (N) of labeled observations for a batch dataset for a given alignment method. In such an embodiment, each labeled observation corresponds to an executed alignment experiment. In an embodiment, a model to suggest alignment settings to maximize predicted alignment quality can be built using the labeled observations. Embodiments can employ different supervised machine learning algorithms for regression to build the models, such as the Projection to Latent Structure (PLS) multivariate statistical model. Instead of relying on time-consuming trial and error approaches to tune the settings for the hyperparameters, the model can then be used by different workflows to extract alignment insights, and an alignment experiment, i.e., settings for performing an alignment, can be suggested based on the model-predicted alignment quality. This suggested alignment experiment can be executed to confirm if its performance metrics satisfy the acceptance criteria. This guides the selection of the alignment hyperparameters settings.

The prediction quality of a supervised machine learning model improves as the number of labeled observations used to create the model increases. However, creating a labeled observation is a time consuming and expensive process that requires, in this case, the execution of an alignment experiment. To help minimize the number of experiments needed, embodiments create a supervised machine learning seed model that is used. The term "seed model" means the model is built initially with a limited amount N of labeled observations to get a jump start and the seed model is then automatically updated or rebuilt to improve the seed model's prediction quality with labeled observations from alignment experiments that are executed in various workflows. In some embodiments, the seed model is built with a large amount N of labeled observations at the beginning and the model will not support model updating or rebuilding.

Preparation of the Alignment Metadata Datasheet with or without Early Termination According to an embodiment, a set of alignment experiments, i.e., N alignment experiments, are created to facilitate the selection of settings for alignment tunable parameters (hyperparameters) that drive the behavior of the methods for batch alignment. The proper size of N depends on the number of hyperparameters to be varied for a given alignment method. In an embodiment, the number of hyperparameters to vary may be configured in the alignment environment (the collection of alignment settings and configurations). A larger N provides more meaningful insights through the model as the dimensions of the variations to be captured increase. In certain circumstances, when a brute force approach is taken with enough computing resources, N can be very large. For example, N can be as little as 50 to build a seed PLS model to extract alignment insights for the example dataset DS08 and the enhanced online dynamic alignment method. Since it is generally found that model prediction quality increases as the number of labeled observations used to build the model increases, and a DS08 alignment experiment typically finishes in 1-2 minutes with the enhanced online dynamic alignment method, if using the enhanced online dynamic alignment method, a user may set N as 100 in the alignment environment to create a seed model with better prediction performance.

For a given batch dataset and a selected alignment method, the N alignment experiments can be prepared in a few different ways. One approach is to use a low-discrepancy sequence (LDS) approach, such as a Sobol sequence or other similar methods (see https://en.wikipedia.org/wiki/Low-discrepancy_sequence for more details). Alternatively, the set of experiments can be determined using a design of experiments (DOE) approach such as a D-optimal design or other similar methods (see https://en.wikipedia.org/wiki/Optimal_design for more details). In certain circumstances, a brute force approach can also be used to either randomly or uniformly generate alignment conditions for the N alignment experiments.

After the alignment experiments are executed (sequentially or in parallel) using a given alignment method on a batch dataset, the results for each alignment experiment are evaluated with corresponding performance metrics and acceptance criteria. These alignment related metadata are collected into a datasheet. In the datasheet, each observation corresponds to an executed alignment experiment and the observation's alignment conditions are X variables and the observation's performance metrics are Y variables. An observation with values available for its Y variables is referred to herein as a labeled observation, and an observation without any values for its Y variables is referred to herein as an unlabeled observation.

Different alignment methods may have different alignment hyperparameters and performance metrics. As such, the X/Y variable lists in the metadata datasheet for different alignment methods can be different. For the enhanced online dynamic alignment method, the X variable list can include time smoothness, sliding window size, difference penalty, search interval, and different time series generator functions for the alignment-guidance pseudo variable. For the enhanced online dynamic alignment method, the Y variable list can include batch maturity score, phase ID score, total quality score, and time (total amount) to perform the alignment. FIG. 15, described in further detail below, shows an example alignment metadata datasheet 1500 with 100 labeled observations for an embodiment using the enhanced online dynamic alignment method on the DS08 dataset, whose alignment conditions are prepared by the Sobol sequence method.

In an embodiment with an early termination option, if the performance metrics for any executed experiment satisfy the acceptance criteria, the experiment's corresponding alignment conditions can be recommended as the alignment conditions to use and no further alignment experiments can be executed. In an embodiment without the early termination option, all prepared alignment experiments would be eventually executed and evaluated. In an embodiment, the metadata datasheet has one entry (row) for each experiment.

Automated and Interactive Active Learning Workflows with the Supervised Machine Learning Model Active learning is a special case of supervised machine learning and well-motivated in many modern machine learning problems, where labels are very time consuming or expensive, i.e., computationally expensive, to prepare for unlabeled observations. In active learning, an active learner chooses the most informative observation (the alignment experimental conditions with the best predicted alignment quality) to be labeled (executed) next. As such, by performing the alignment experiment using the conditions with the best predicted results, the total number of alignment experiments required to be executed to identify the alignment conditions is typically much smaller than the number required in a nondiscrimination supervised machine learning workflow.

Typically, with active learning, there is a risk of biased decisions with great uncertainty. In embodiments, to overcome this risk, a learner (regardless of automated or interactive) relies on an optimizer or analyzer with configured constraints for the supervised machine learning model to recommend the alignment experimental condition with the most desired predicted alignment quality to be executed next. Then, the recommended alignment experiment is executed to confirm if its performance metrics satisfy the acceptance criteria.

The active learning workflow with the automated learner is referred to herein as the automated active learning workflow. In an embodiment, the automated active learning workflow stops (i) when an alignment condition produces the desired alignment quality, or (ii) a maximum learning iteration count is reached. In an embodiment, for each iteration of performing an alignment experiment, the same constraints and acceptance criteria are applied. In an embodiment, these settings are configured in the alignment environment.

The active learning workflow with the interactive learner is referred to herein as the interactive active learning workflow. In an embodiment, the interactive active learning workflow can stop whenever a user decides to stop, and when stopped, the best-so-far alignment conditions and its aligned dataset are ready to be consumed by other processes. The other processes may include simulation or control systems that can be used to control real-world industrial processes. For instance, a simulation can be performed using the aligned data and the results of the simulation can be used to modify operating conditions for a real-world process. The interactive iterations can be performed as many times as a user wants. Further, because the constraints and acceptance criteria are adjustable during the interactive workflow, a user may make tradeoffs to accept the alignment results under an alignment condition even though the overall quality of the experiment is not ideal.

Guided Learning Process with the Supervised Machine Learning Model

Embodiments can use a guided learning process to extract insights from the supervised machine learning model. Embodiments can use any guided learning methods known in the art. For instance, eliminating variations for insignificant hyperparameters, customizing performance metrics and alignment acceptance criteria, rescanning executed alignment experiments with modified performance metrics and acceptance criteria, customizing alignment-guidance pseudo variable generator function definitions, and adjusting alignment hyperparameter ranges, options, or constraints with insights identified by various model analyzers, amongst other options. In embodiments, ad-hoc alignment experiments can be executed repeatedly to confirm the ad-hoc experiment's impact direction, i.e., improving or degrading, on the alignment quality.

The learning process can implement as many iterations as a user wants. When a user decides to stop, the best-so-far alignment condition and its aligned dataset are ready to be consumed by other processes. Embodiments can prepare an alignment metadata datasheet with the modified alignment environment to rebuild the supervised machine learning model.

Alignment-Guidance Pseudo Variable and Alignment-Guidance-Only Variable

In an embodiment, when the existing process variables cannot provide clear enough guidance for batch alignment in each phase, one or more intermediate derived pseudo time series and/or process-insignificant variables with strong alignment guidance can be included in the batch dataset to improve the alignment quality. These enhancements can be applied to different alignment methods. In other words, such embodiments incorporate another variable (pseudo variable or alignment-guidance-only variable) into the batch data and this other variable participates in the alignment process and affects the decision of where each observation of a raw batch, should map to which observation of the reference batch. This, in turn, improves the quality of the alignment.

According to an embodiment, the intermediate derived pseudo time series, also called "alignment-guidance pseudo variables," can be automatically generated using purpose-built monotonic functions based on the corresponding batch phase information. An embodiment can employ built-in per phase time series generator functions that can be selected for use. These built-in functions can include "Steps", polynomial functions (such as "Saw tooth", "Squared", etc.), logarithmic functions, and exponential functions, amongst other options.

In an embodiment, the alignment-guidance-only variables may not be a measurable process variable, but be explicitly generated outside this system with similar time series functions based on the batch phase information in users' historian databases and distributed control system amongst other examples. In another embodiment, process-insignificant variables with clear alignment guidance information may be included by a user to guide alignment. These process-insignificant variables are also referred to herein as alignment-guidance-only variables.

In another example embodiment, after the alignment, the alignment-guidance pseudo variables and the alignment-guidance-only variables can be optionally excluded from the aligned dataset before applying it for batch model building, analysis, and predicting. This reduces unnecessary computational effort. However, failing to exclude the alignment-guidance pseudo variables and the alignment-guidance-only variables will not necessarily degrade the batch model built on the aligned dataset.

Alignment Environment Settings and Environment Library

An embodiment includes a set of alignment environment settings which are used to facilitate the management of alignment hyperparameters and their values, alignment performance metrics, alignment acceptance criteria, alignment-guidance pseudo variables, and variable generator functions, amongst other examples, for a given batch dataset. The environment settings can be implemented using a database storing the various alignment settings, e.g., parameters and values.

Different batch datasets from different batch processes or the same process, but different manufacturing plants, may require different alignment environment settings. As such, in an embodiment, a user can customize alignment settings, including performance metrics, adjust acceptance criteria, and provide user-defined functions as alignment-guidance pseudo variable generator functions. Also, a user can choose different alignment methods, customize alignment methods to meet specific needs, and persist selected settings into these alignment environments, i.e., configured settings.

Another embodiment implements an environment library to manage a list of the alignment environment settings, i.e., settings used for alignments that have been performed. This allows a user to quickly set up an environment or switch from one environment to another. Having a database of alignment settings facilitates applying the same alignment environment to the same batch dataset. This allows embodiments to provide consistent alignment results.

An example embodiment is directed to a computer-implemented method for performing automated batch data alignment for a batch production industrial process. Such an example embodiment begins by selecting a reference batch from batch data for an industrial process and configuring batch alignment settings. In turn, a seed model is constructed that is configured to predict alignment quality given settings for one or more alignment hyperparameters. To continue, learning is performed using the selected reference batch, the configured batch alignment settings, the constructed seed model, and a set of batch data that is representative of the industrial process. The learning determines settings for the one or more alignment hyperparameters by performing at least one of: (i) automated active learning, (ii) interactive active learning, and (iii) guided learning (e.g., expert or user guided learning). Such an embodiment performs batch alignment on a batch from the batch data for the industrial process using the determined settings for the one or more alignment hyperparameters and the configured batch alignment settings. Performing the batch alignment results in alignment of batch data of the industrial process in a manner that enables improved modeling of the industrial process.

In embodiments, configuring the batch alignment settings can include configuring, e.g., storing in computer memory, values and settings for any parameters and variables used in performing embodiments. According to an embodiment, configuring batch alignment settings comprises at least one of: (1) selecting a batch alignment method for performing the batch alignment, (2) selecting the one or more alignment hyperparameters and corresponding setting ranges for the one or more alignment hyperparameters for performing at least one of the automated active learning, the interactive active learning, and the guided learning, (3) setting values for at least one hyperparameter of the one or more alignment hyperparameters, (4) selecting constraints and settings for performing at least one of the automated active learning, the interactive active learning, and the guided learning, (5) selecting and customizing performance metrics for evaluating alignment results for at least one batch of the set of representative batches during an alignment experiment, (6) setting up acceptance criteria for at least one of the automated active learning, the interactive active learning, and the guided learning based on selected performance metrics, and (7) selecting to enable or disable early termination of performing the at least one of the automated active learning, the interactive active learning, and the guided learning upon satisfying acceptance criteria.

In an example embodiment, selecting a batch alignment method for performing the batch alignment on the batch comprises selecting a base batch alignment method. Such an embodiment may also include enhancing the selected base batch alignment method. In an embodiment, the enhancing includes enhancing the selected base batch alignment method with one or more alignment-guidance pseudo variables by performing at least one of: (i) selecting the one or more alignment-guidance pseudo variables to be included as a process variable for the batch, (ii) selecting one or more generator functions for generating one or more alignment-guidance pseudo variable time series for the one or more alignment-guidance pseudo variables, and (iii) selecting one or more if/what customizations for one or more generator functions. In another embodiment, enhancing the selected base batch alignment method includes enhancing the base batch alignment method with one or more alignment-guidance only process variables by selecting the one or more alignment-guidance only process variables to be included as a process variable for the batch.

According to an embodiment, constructing the seed model comprises selecting: (i) an alignment method, (ii) hyperparameters associated with the selected alignment method, (iii) respective settings for the selected hyperparameters, and (iv) a minimum number of observations to build the seed model. In such an embodiment, constructing the seed model also includes determining a set of alignment experiments to perform based upon the selected (i) alignment method, (ii) hyperparameters associated with the selected alignment method, (iii) respective settings for the selected hyperparameters, and (iv) minimum number of observations to build the seed model. This embodiment executes each experiment in the determined set of alignment experiments to generate respective alignment results for the set of representative batches. Such an embodiment also quantifies the respective alignment results with selected performance metrics for each experiment and constructs the seed model based upon the quantified respective alignment results and the respective settings for the selected hyperparameters.

Embodiments may use a variety of different techniques to determine the set of alignment experiments. In an embodiment, the set of alignment experiments is determined using at least one of: low-discrepancy sequence processing, design of experiments processing, randomly generating experiment conditions, and uniformly generating experiment conditions. According to an embodiment, executing each experiment in the determined set of alignment experiments comprises executing each experiment in the determined set sequentially or executing each experiment in the determined set in parallel.

According to another example embodiment, performing automated active learning includes configuring constraints and alignment quality settings for performing the automated active learning. Such an embodiment uses the constructed seed model, the configured constraints, and the configured alignment quality settings to automatically determine a given setting for the one or more alignment hyperparameters that maximizes an alignment quality score as predicted by the constructed seed model. The embodiment performs an experimental batch alignment on at least one batch of the set of representative batches using the given setting for the one or more alignment hyperparameters. In turn, if results of performing the experimental batch alignment satisfy a criterion, the given setting for the one or more alignment hyperparameters is maintained, and if the results do not satisfy the criteria, the constructed seed model is updated or rebuilt. After updating or rebuilding the seed model, such an embodiment may iterate (i) configuring constraints and alignment quality settings, (ii) automatically determining a given setting, and (iii) performing an experimental batch alignment.

In an embodiment, performing the interactive active learning includes configuring constraints and alignment quality settings for performing the interactive active learning. Performing the interactive active learning uses the constructed seed model, the configured constraints, and the configured alignment quality settings, to interactively recommend a given setting for the one or more alignment hyperparameters. In such an embodiment, an experimental batch alignment is performed on at least one batch of the set of representative batches using the given setting for the one or more alignment hyperparameters. If results of performing the experimental batch alignment satisfy a criterion or based on user input, the given setting for the one or more alignment hyperparameters are maintained or the constructed seed model is updated or rebuilt. Such an embodiment may also iterate configuring the constraints and alignment quality settings, interactively recommending the given setting, and performing an experimental batch alignment. If results of performing the experimental batch alignment do not satisfy a criterion or based on user input, the constructed seed model is updated or rebuilt, and (i) configuring constraints and alignment quality settings, (ii) interactively recommending the given setting, and (iii) performing an experimental batch alignment are iterated, i.e., performed again, until the criteria are met or a user no longer wants to continue.

In an embodiment, performing the guided learning process includes performing a variety of different tasks based upon user input and the constructed seed model. One such embodiment performs at least one of: (1) analyzing importance of the one or more alignment hyperparameters and impact of the one or more alignment hyperparameters on alignment quality predicted by the constructed seed model, (2) customizing alignment quality performance metrics and acceptance criteria, (3) customizing alignment-guidance pseudo time series generator functions, (4) adjusting ranges, options, or constraints for the one or more alignment hyperparameters, and (5) performing a batch alignment experiment on at least one batch of the set of representative batches using an exploratory setting for the one or more alignment hyperparameters to confirm impact of the one or more alignment hyperparameters to alignment quality.

Another embodiment determines if the performed batch alignment satisfies acceptance criteria. Such an embodiment iteratively performs functionality until the performed batch alignment satisfies the acceptance criteria. This functionality includes iterating: (1) updating or rebuilding the constructed seed model; (2) using the updated or rebuilt constructed seed model, the selected reference batch, the configured batch alignment settings, and the set of representative batches, performing at least one of: (i) automated active learning, (ii) interactive active learning, and (iii) guided learning to determine settings for the one or more alignment hyperparameters; (3) performing the batch alignment on the batch using the settings for the one or more alignment hyperparameters determined using the updated or rebuilt constructed seed model and the configured batch alignment settings; and (4) determining if the batch alignment performed using the settings for the one or more alignment hyperparameters determined using the updated or rebuilt constructed seed model satisfy the acceptance criteria.

Yet another embodiment stores and manages the determined settings for the one or more alignment hyperparameters in an alignment environment library. Storing and managing the determined settings for the one or more alignment hyperparameters in the alignment environment library, according to an embodiment, includes associating the determined settings for the one or more alignment hyperparameters with the batch data for the industrial process. Such an embodiment may also classify and organize the determined settings for the one or more alignment hyperparameters based on at least one of: industrial processes, plants, and operating conditions for transfer learning. Further, such an embodiment may apply the determined settings for the one or more alignment hyperparameters as a starting point for a new batch data set.

Another embodiment of the present invention is directed to a system that includes a processor and a memory with computer code instructions stored thereon. In such an embodiment, the processor and the memory, with the computer code instructions, are configured to cause the system to implement any embodiments or combination of embodiments described herein.

Yet another embodiment is directed to a cloud computing implementation for performing automated batch data time alignment for a batch production industrial process. Such an embodiment is directed to a computer program product executed by a server in communication across a network with one or more clients. In this embodiment, the computer program product comprises instructions which, when executed by a processor, causes the processor to implement any embodiments described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 6A-E are graphs illustrating alignment-guidance pseudo variable time series for embodiments.

FIG. 15 is an example datasheet that may be employed in embodiments to build a model.

FIG. 24 is a simplified block diagram of a computer system for performing automated batch data time alignment according to an embodiment.

DETAILED DESCRIPTION

A description of example embodiments follows.

The teachings of all patents, published applications, and references cited herein are incorporated by reference in their entirety.

Figure 1:
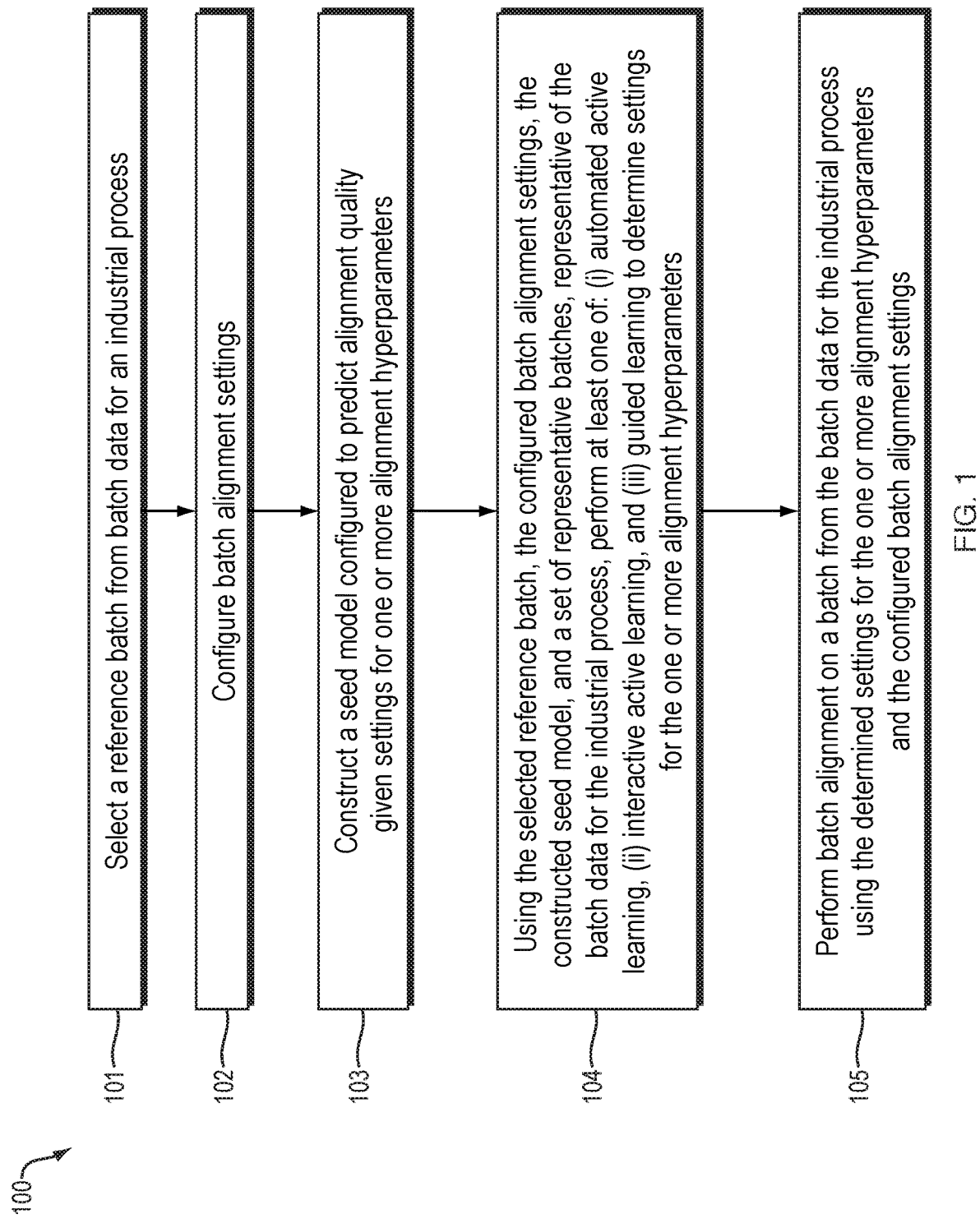
FIG. 1 is a flow chart of an example embodiment for performing automated batch data time alignment for a batch production industrial process.

Embodiments provide functionality for performing automated batch data alignment for a batch production industrial process. FIG. 1 is a flow chart of an example computer-implemented method embodiment 100 for performing automated batch data alignment for a batch production industrial process. The method 100 begins by selecting 101 a reference batch from batch data for an industrial process and configuring 102 batch alignment settings. To continue, a seed model is constructed 103 that is configured to predict alignment quality given settings for one or more alignment hyperparameters. In turn, learning is performed 104 using the reference batch selected at step 101, the batch alignment settings configured at step 102, the seed model constructed at step 103, and a set of representative batches. In such an embodiment, the set of representative batches are representative of the batch data for the subject industrial process. The learning 104 includes performing at least one of: (i) automated active learning, (ii) interactive active learning, and (iii) guided learning to determine settings for the one or more alignment hyperparameters. Finally, batch alignment is performed 105 on a batch from the batch data for the subject industrial process using the settings for the one or more alignment hyperparameters determined at step 104 and the batch alignment settings configured at step 102.

In embodiments, the selection of a reference batch at step 101 can be performed based upon user input and/or based upon analysis of batch data. In an embodiment, selection by a user at step 101 allows users to interact with a system implementing the method 100 to take advantage of the users' input or selection based on the user's domain knowledge. Another embodiment provides a list of candidate batches that is determined based on batch data analysis and a user can select a batch from the list of candidate batches or a best candidate batch can be automatically selected based on the analysis. For example, a candidate list for the reference batch can be recommended using the technique "select reference batch" described in U.S. patent application Ser. No. 15/967,099).

In an embodiment, the seed model built at step 103 can be used to explore the relationships between alignment conditions and the corresponding performance metrics to facilitate selection of alignment conditions in the automated active learning, interactive active learning, and the guided learning at step 104. During various learning workflows, the seed model can also be updated or rebuilt with newly available alignment experiment results to improve prediction quality.

In an example implementation of the automated active learning workflow (performed at step 104), a model optimizer is used as the core of the automated learner to recommend the next alignment experimental condition that maximizes the predicted total alignment quality score while resulting in an alignment that can be performed under the maximum allowed time to perform the alignment. In such an embodiment, if the recommended alignment experiment condition has never been executed, but purely predicted by the seed model with the model optimizer to satisfy the optimization target(s), an alignment experiment will be executed under that condition and its alignment results will be evaluated against the acceptance criteria. The automated active learning can repeatedly iterate automatically to improve alignment quality determined by the optimization target(s) and no user interference is necessary. The automated active learning can stop when either an alignment condition satisfying the acceptance criteria is found or the maximum number of learning iterations has been carried out. Then, the best-so-far or criteria-met alignment condition with the corresponding alignment results and performance metrics are available to downstream workflows.

In an example implementation of the interactive active learning workflow (at step 104), a user and a model optimizer collaborate to form the core of an interactive learner. In such an embodiment, the model optimizer suggests the next alignment experimental condition that maximizes the predicted total alignment quality score while resulting in an alignment that can be performed under the maximum allowed time to perform the alignment. However, in such an embodiment, it is up to the user to approve or reject the suggested alignment condition to be executed. Utilizing a user interface (UI), a user can directly adjust the optimizer settings, i.e. optimization targets, to move the optimization in a desired direction. Moreover, a user can repeatedly run the optimization as many times as desired before approving an alignment experiment to be executed. The interactive active learning iteration can repeat as many times as a user wants. When the interactive active learning completes, the best-so-far alignment condition with the corresponding alignment results and performance metrics are available to downstream workflows.

In an example implementation of the guided learning workflow (performed at step 104), a user (e.g., expert user), various model analyzers, and a model optimizer collaborate to extract insights from the seed model constructed at step 103. The guided learning may include analyzing importance of the one or more alignment hyperparameters and impact of the one or more alignment hyperparameters on alignment quality predicted by the constructed seed model. This determination of importance and impact can be used to tweak hyperparameter selection, adjust selected hyperparameters' ranges/options, customize alignment quality performance metrics and acceptance criteria, and customize alignment-guidance pseudo time series generator functions. Moreover, the guided learning can include performing a batch alignment experiment could on at least one batch of the set of representative batches using an exploratory setting for the one or more alignment hyperparameters to confirm impact of the one or more alignment hyperparameters to alignment quality.

In an embodiment of the method 100, configuring 102 the batch alignment settings can include configuring, e.g., storing in computer memory, values and settings for any parameters and variables used in performing embodiments. According to an embodiment, configuring 102 batch alignment settings comprises at least one of: (1) selecting a batch alignment method for performing the batch alignment, (2) selecting the one or more alignment hyperparameters and corresponding setting ranges for the one or more alignment hyperparameters for performing at least one of the automated active learning, the interactive active learning, and the guided learning, (3) setting values for at least one hyperparameter of the one or more alignment hyperparameters, for instance where the hyperparameter is expected to have fixed settings, (4) selecting constraints and settings for performing at least one of the automated active learning, the interactive active learning, and the guided learning, (5) selecting and customizing performance metrics for evaluating alignment results for at least one batch of the set of representative batches during an alignment experiment, (6) setting up acceptance criteria for at least one of the automated active learning, the interactive active learning, and the guided learning based on selected performance metrics, and (7) selecting to enable or disable early termination of performing the at least one of the automated active learning, the interactive active learning, and the guided learning upon satisfying acceptance criteria.

Embodiments, as an alternative to utilizing the online dynamic alignment method described in U.S. patent application Ser. No. 15/967,099, can also use other methods as the base alignment method. For example, a user could also select the linear warping alignment or the offline dynamic warping alignment method as the base alignment method. For the online dynamic alignment method, hyperparameters include time smoothness, sliding window size, difference penalty, and search interval. In the linear warping alignment, the batch data will be warped according to an indicator variable a user chooses and the indicator variable itself should be monotonic. For the linear alignment method, hyperparameters include indicator variables, where an indicator variable determines the progress of a batch phase and a different indicator variable could be set for each batch phase. In the offline dynamic warping alignment, the data is warped according to the weighting of each variable. For the offline dynamic alignment method, hyperparameters include time smoothness, and variable alignment weights, where time smoothness places a weight on the smoothness of the curve (the higher this value, the greater the smoothing applied to the time usage variable that is created during alignment). For the offline dynamic alignment method, if the batch maturity for each phase is checked, it is assumed the phase reached 100% completion. As such, each phase is aligned against the entire reference batch phase. If batch maturity is unchecked, such an embodiment guesses the percentage completion of each phase in each batch, and only aligns against the corresponding portion of the reference batch. Moreover, the weight that each variable should have during the alignment process and variables are weighted relative to each other only. In this example, the enhanced online dynamic alignment method may be chosen by a user for batch alignment. The user may select: fixing the time smoothness hyperparameter value to 1, applying the Sobol sequence technique to vary sliding window size, difference penalty, and search interval with default ranges to prepare 50 alignment experiments, using a total alignment score larger than 80, and a total time for alignment to be shorter than 10 minutes as the acceptance criteria, amongst other example user chosen settings.

Embodiments of the method 100 may include selecting a batch alignment method that may be used when executing alignment experiments to prepare the alignment metadata datasheet at step 103 and/or performing the learning at step 104 and/or performing the batch alignment at step 105. The batch alignment method may be selected at step 102 as part of configuring the batch alignment settings. Embodiments may utilize any alignment method known in the art. Further, it is noted that while embodiments are described herein as utilizing the online dynamic alignment method described in U.S. patent application Ser. No. 15/967,099, embodiments are not so limited and may employ any alignment method known in the art.

Embodiments may also include enhancing the selected base batch alignment method. In an embodiment, this may include enhancing the selected base batch alignment method with one or more alignment-guidance pseudo variables. According to an embodiment, enhancing the alignment method with alignment-guidance pseudo variables may entail at least one of: (i) selecting the one or more alignment-guidance pseudo variables to be included as a process variable for the batch, (ii) selecting one or more generator functions, e.g., steps, saw tooth, squared, etc., for generating one or more alignment-guidance pseudo variable time series for the one or more alignment-guidance pseudo variables, and (iii) selecting one or more if/what customizations for one or more generator functions. For example, for a built-in Logarithmic time series generator function, a user could prefix a scaling factor to the (t–t0) term and/or change the default constant term from 1 to 100 based on the user's domain knowledge to generate a different time series profile. In another embodiment, enhancing the selected base batch alignment method includes enhancing the base batch alignment method with one or more alignment-guidance only process variables by selecting the one or more alignment-guidance only process variables to be included as a process variable for the batch.

An embodiment of the method 100 uses the method 1300 described hereinbelow in relation to FIG. 13 to build the seed model at step 103. Moreover, according to another embodiment, constructing the seed model at step 103 comprises selecting (i) an alignment method, (ii) hyperparameters associated with the selected alignment method, (iii) respective settings for the selected hyperparameters, and (iv) a minimum number of observations to build the seed model. In such an embodiment, constructing the seed model at step 103 also includes determining a set of alignment experiments to perform based upon the selected (i) alignment method, (ii) hyperparameters associated with the selected alignment method, (iii) respective settings for the selected hyperparameters, and (iv) minimum number of observations to build the seed model. Such an embodiment executes each experiment in the determined set of alignment experiments to generate respective alignment results for the set of representative batches. In turn, the respective alignment results are quantified with selected performance metrics for each experiment, and the seed model is constructed based upon the quantified respective alignment results and the respective settings for the selected hyperparameters.

Quantifying respective alignment results with these purpose-built "alignment performance metrics" described herein below makes it possible to apply machine learning to batch alignment. The quantification process determines the degree of maturity movement smoothness ("Batch Maturity Score"), the batch phase misprediction ratio ("Phase ID score"), the comprehensive alignment quality evaluation score ("Total Quality Score"), and/or the time taken to complete alignment. A user can customize not only the definitions of "Batch Maturity Score" and/or "Phase ID score" to incorporate their domain knowledge, but a user can also modify the definition of "Total Quality Score" to reflect the user's desire to emphasize one factor over the other. Embodiments may utilize a variety of techniques to build the seed model at step 103. For instance, embodiments may utilize Projection to Latent Structures (PLS) or Neural Network, amongst other examples.

Embodiments of the method 100 may use a variety of different techniques to determine the set of alignment experiments for constructing the seed model at step 103. In an embodiment, the set of alignment experiments is determined using at least one of: low-discrepancy sequence processing, design of experiments processing, randomly generating experiment conditions, and uniformly generating experiment conditions. According to an embodiment, executing each experiment in the determined set of alignment experiments comprises executing each experiment in the determined set sequentially or executing each experiment in the determined set in parallel.

An embodiment of the method 100 implements the method 16 described hereinbelow in relation to FIG. 16A to perform the learning at step 104. More specifically, performing the active learning may employ the method 1600 described hereinbelow in relation to FIG. 16B, performing the interactive active learning may employ the method 1601 described hereinbelow in relation to FIG. 16C, and performing the guided learning may employ the method 1602 described hereinbelow in relation to FIG. 16D.

According to an example embodiment of the method 100, performing automated active learning at step 104 comprises configuring constraints and alignment quality settings for performing the automated active learning and using the constructed seed model, the configured constraints, and the configured alignment quality settings to automatically determine a given setting for the one or more alignment hyperparameters. In such an embodiment, the given setting maximizes an alignment quality score as predicted by the constructed seed model. Such an embodiment performs an experimental batch alignment on at least one batch of the set of representative batches using the given setting for the one or more alignment hyperparameters. In turn, if results of performing the experimental batch alignment satisfy a criterion, the given setting for the one or more alignment hyperparameters is maintained, and if the results do not satisfy the criteria, the constructed seed model is updated or rebuilt. Updating or rebuilding the model may also include updating the alignment conditions and the corresponding performance metrics from the newly completed alignment experiment. After updating or rebuilding the seed model, such an embodiment may iterate (i) configuring constraints and alignment quality settings, (ii) automatically determining a given setting, and (iii) performing an experimental batch alignment.

In an embodiment, performing the interactive active learning at step 104 includes configuring constraints and alignment quality settings for performing the interactive active learning. Such an embodiment uses the constructed seed model, the configured constraints, and the configured alignment quality settings, to interactively recommend a given setting for the one or more alignment hyperparameters. Next, in such an embodiment, an experimental batch alignment is performed on at least one batch of the set of representative batches using the given setting for the one or more alignment hyperparameters. If results of performing the experimental batch alignment satisfy a criterion or based on user input, then the given setting for the one or more alignment hyperparameters is maintained or the constructed seed model is updated or rebuilt. If the constructed seed model is updated or rebuilt, then the method continues by iterating (i) configuring constraints and the alignment quality settings, (ii) interactively recommending the given setting, and (iii) performing an experimental batch alignment. If results of performing the experimental batch alignment do not satisfy a criterion or based on user input, then the constructed seed model is updated or rebuilt and the method iterates (i) configuring constraints and the alignment quality settings, (ii) interactively recommending the given setting, and (iii) performing an experimental batch alignment. Updating or rebuilding the model may include updating the alignment conditions and the corresponding performance metrics from the newly completed alignment experiment.

In an embodiment, performing the guided learning process at step 104 includes performing a variety of different tasks based upon user input and the constructed seed model. The guided learning process may include analyzing importance of the one or more alignment hyperparameters and impact of the one or more alignment hyperparameters on alignment quality predicted by the constructed seed model. Moreover, the guided learning process may include customizing alignment quality performance metrics and acceptance criteria, customizing alignment-guidance pseudo time series generator functions, and/or adjusting ranges, options, or constraints for the one or more alignment hyperparameters. Furthermore, performing the guided learning may also include performing a batch alignment experiment on at least one batch of the set of representative batches using an exploratory setting for the one or more alignment hyperparameters to confirm impact of the one or more alignment hyperparameters on alignment quality.

Another embodiment of the method 100 determines if the batch alignment performed at step 105 satisfies acceptance criteria. If the performed batch alignment does not satisfy the acceptance criteria, such an embodiment of the method 100 iteratively performs functionality until the batch alignment satisfies the acceptance criteria. Such an embodiment iterates (1) updating or rebuilding the constructed seed model of step 103; (2) using the updated or rebuilt constructed seed model, the selected reference batch, the configured batch alignment settings, and the set of representative batches, to perform at least one of (i) automated active learning, (ii) interactive active learning, and (iii) guided learning to determine settings for the one or more alignment hyperparameters of step 104; (3) performing the batch alignment of step 105 on the batch using the settings for the one or more alignment hyperparameters determined using the updated or rebuilt constructed seed model and the configured batch alignment settings of step 102; and (4) determining if the batch alignment performed using the settings for the one or more alignment hyperparameters determined using the updated or rebuilt constructed seed model satisfy the acceptance criteria.

Yet another embodiment of the method 100 stores and manages the settings determined at step 104 for the one or more alignment hyperparameters in an alignment environment library. Such an embodiment may also store in the alignment environment library the batch alignment settings configured at step 102. Storing and managing the determined settings for the one or more alignment hyperparameters in the alignment environment library, according to an embodiment, includes associating the determined settings for the one or more alignment hyperparameters with the batch data for the industrial process. Such an embodiment may also classify and organize the determined settings for the one or more alignment hyperparameters based on at least one of: industrial processes, plants/facilities, and operating conditions. Storing these categories along with indications of the industrial process, plant, and operating conditions under which the batch data was generated can facilitate transfer learning. Further, such an embodiment may apply the determined settings for the one or more alignment hyperparameters as a starting point for a new batch data set. In an embodiment, the settings may be used as a starting point for batch data for batch data from the same or a similar industrial process, plant, or process with similar operating conditions. This prevents having to start anew from generic default settings.

Hereinbelow, functionality for embodiments is outlined, including, purpose-built performance metrics, alignment acceptance criteria, building a seed supervised machine learning model automatically based on an alignment metadata datasheet, automated and interactive active learning workflows, guided learning processes, alignment-guidance pseudo variable enhancement, alignment-guidance-only variable enhancement, and an alignment library. Embodiments are described below as addressing several issues observed with the online dynamic alignment method in recent practice with industrial applications. However, the embodiments described herein are not limited to being used in conjunction with the online dynamic alignment method described in U.S. patent application Ser. No. 15/967,099, and embodiments may be employed in any alignment methods.

The description below explains an example system using: (1) the enhanced online dynamic alignment method as an example alignment method (referred to in short as "the enhanced alignment"); (2) alignment experiments to be executed for the alignment metadata datasheet (labeled observations) prepared with a Sobol Sequence approach; (3) the Projection to Latent Structure (PLS) multivariate statistical model as an example supervised machine learning algorithm to build the seed model; (4) AspenTech ProMV® PLS model optimizer with constraints as an example core optimizer for the automated or interactive learner and multiple PLS based analyzers used in the guided learning process to demonstrate what can be done to extract alignment insights. However, it is noted that embodiments are not limited to the particular implementations described herein and various changes in form and details may be made without departing from the scope of the present invention.

Figure 2:
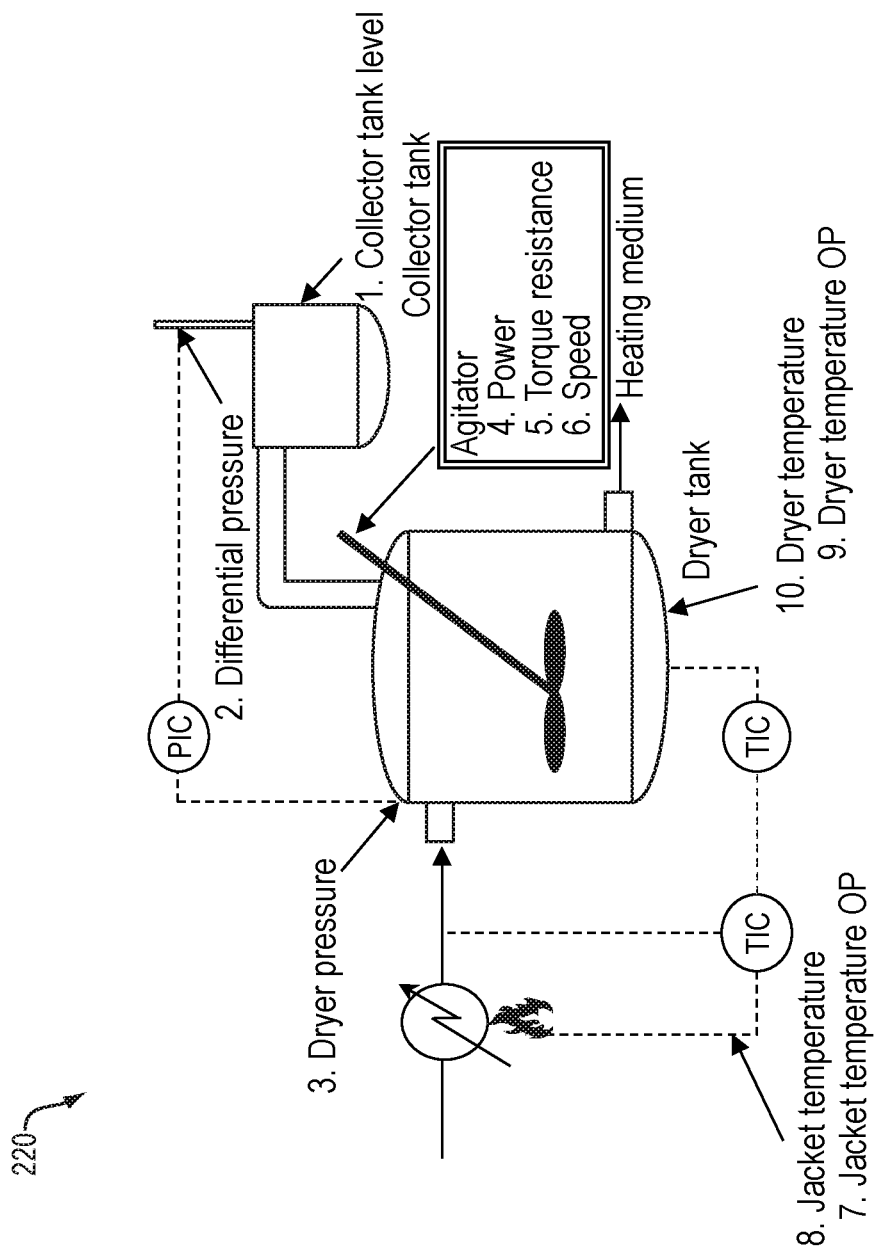
FIG. 2 is a simplified diagram of an industrial multi-phase batch reactor/dryer process that may be simulated and controlled using embodiments.
Figure 3B:
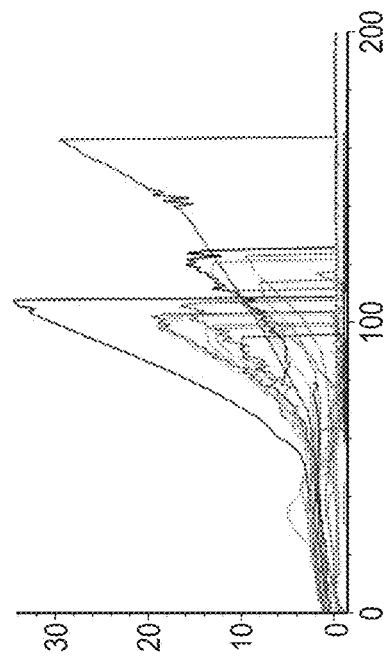
FIG. 3A-J are plots of process variables from an industrial process that may be aligned using embodiments.
Figure 3D:
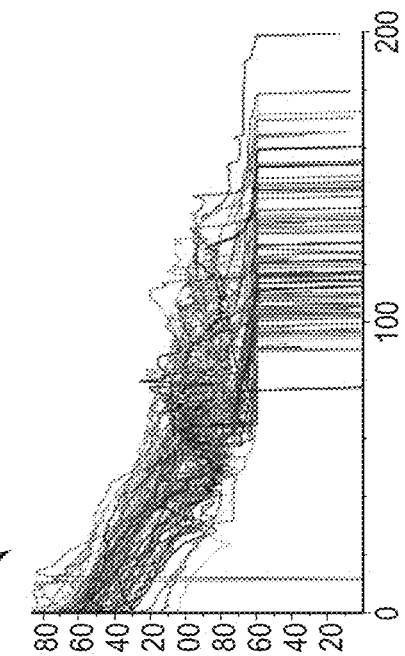
Figure 3A:
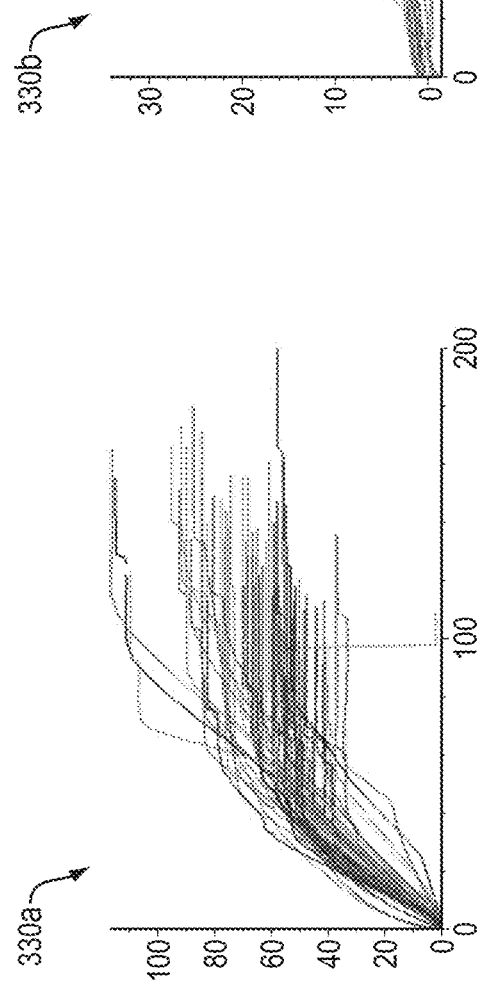
Figure 3C:
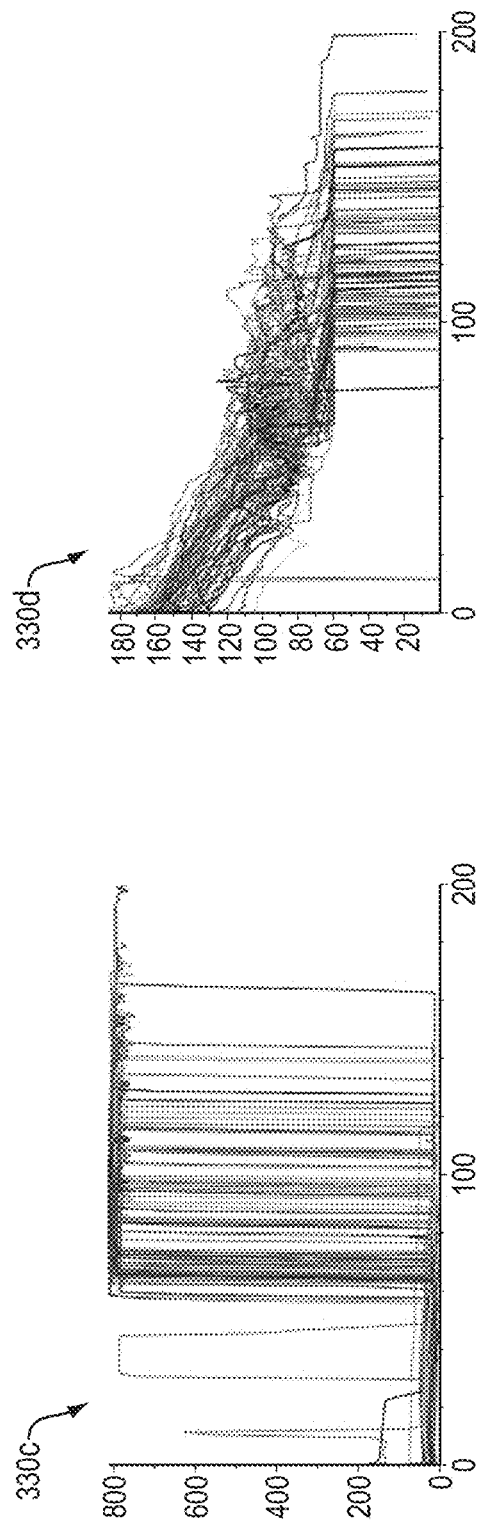
Figure 3F:
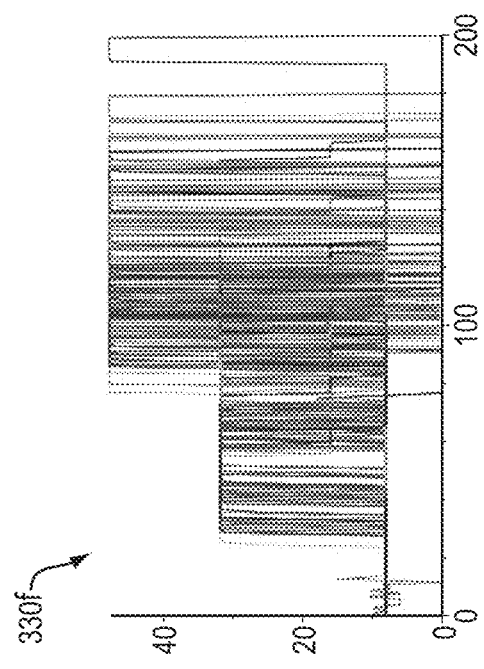
Figure 3H:
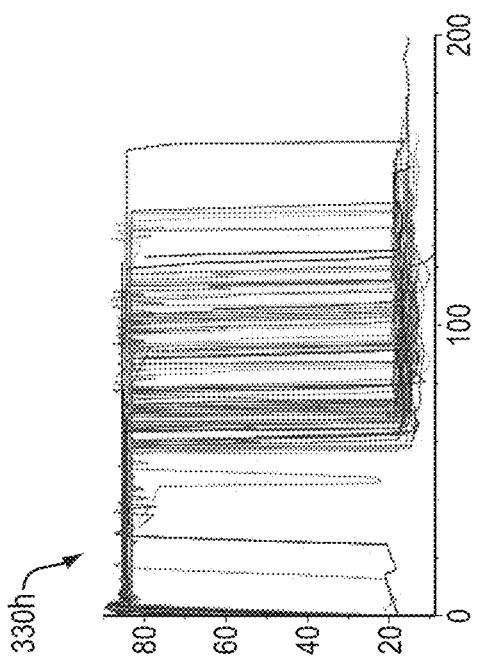
Figure 3E:
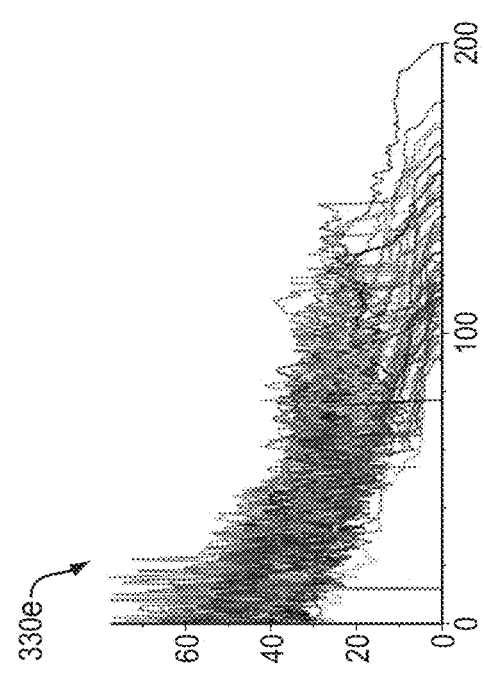
Figure 3G:
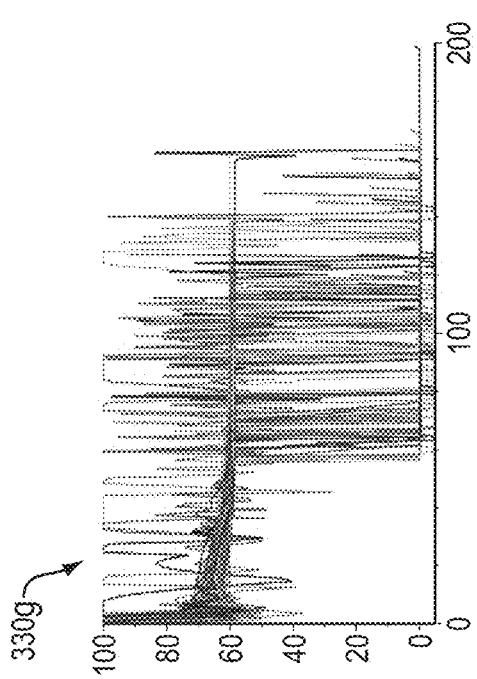
Figure 3J:
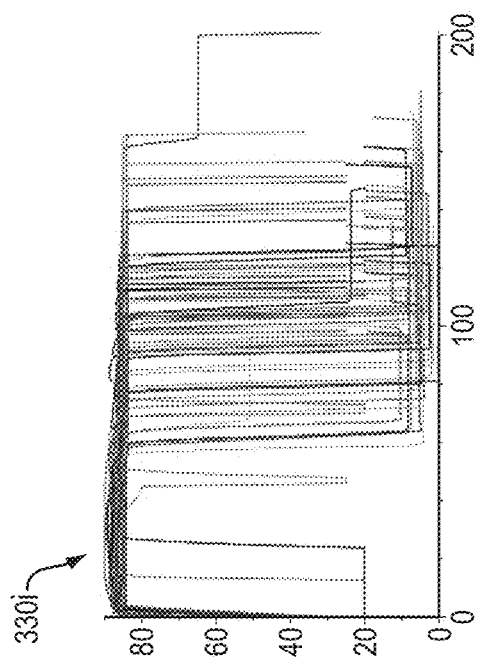
Figure 3I:
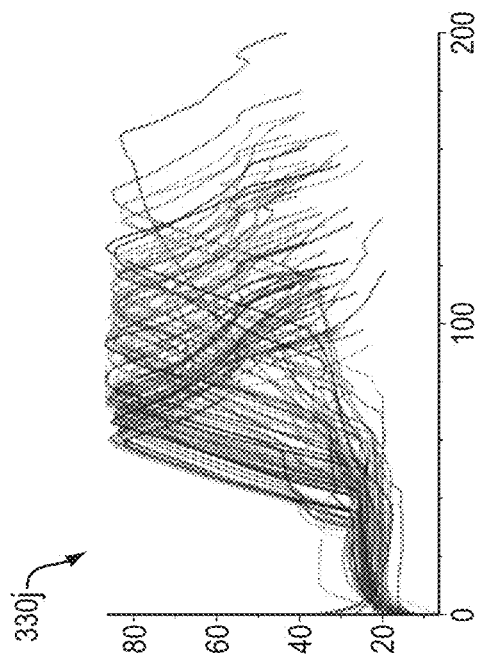

A small dataset (DS08) in the public domain for the industrial multi-phase batch reactor/dryer process 220 depicted in FIG. 2 is used as an example herein to demonstrate how to align batch data using embodiments of the present invention. The system 220 is an example system that implements batch processes. Data from the system 220 may be aligned (with respect to the number of sampled values) using embodiments of the present invention. Moreover, the aligned data can be used to simulate the system 220 and control operation of the system in the real-world. Likewise, embodiments of the present invention can be used to determine process settings and these settings can be used to control manufacturing and other batch processes.

The DS08 dataset has 71 batches and each batch has 10 process variables, which are illustrated (in original engineering units) in FIGS. 3A-J. FIGS. 3A-J illustrate the collector tank level 330$a$ (item 1 in FIG. 2), the differential pressure 330$b$ (item 2 in FIG. 2), the dryer pressure 330$c$ (item 3 in FIG. 2), the agitator power 330$d$ (item 4 in FIG. 2), the agitator torque resistance 330$e$ (item 5 in FIG. 2), the agitator speed 330$f$ (item 6 in FIG. 2), the jacket temperature OP 330$g$ (item 7 in FIG. 2), the jacket temperature 330$h$ (item 8 in FIG. 2), the dryer temperature OP 330$i$ (item 9 in FIG. 2), and the dryer temperature 330$j$ (item 10 in FIG. 2). The x-axis in FIGS. 3A-J is the sampling points for a given batch in the process and the y-axis is the trajectory variable's measured value at each sampling point. Each trajectory represents the variable profile for a batch. A DS08 batch length can vary from less than 50 sampling points to over 200 sampling points. For the DS08 batch data, it can take, in total, a couple of minutes to complete an end-to-end alignment for all raw data batches against the designated reference batch using the online dynamic alignment method with the default settings of all of the hyperparameters.

Another batch dataset (DS04) from a more complicated multi-phase industrial batch process is used to demonstrate that the challenges sometimes observed in recent practice of the online dynamic alignment method with industrial applications are resolved by embodiments of the present invention. Because DS04 has many more trajectory variables, sampling points, and batches than DS08, it is expected that the end-to-end alignment run can take much longer to complete and even longer on less powerful computing resources or if the implementation is inefficient.

There are a wide variety of implementation variations for embodiments. Some embodiments may not have the alignment environment and the alignment library. In such an embodiment, the customization or settings are applied directly in each workflow. Different alignment methods can be enhanced by the alignment-guidance pseudo variable enhancement and/or the alignment-guidance-only variable enhancements described herein. Embodiments can include different built-in pseudo variable generator functions and allow or not allow a user to customize the generator functions. Embodiments can also allow users to provide their own generator function definitions. An embodiment may not explicitly earmark the alignment-guidance-only variable as such, but include them together with other process variables only to provide alignment guidance as needed. Embodiments may remove alignment-guidance-only variables or keep alignment-guidance-only variables in the aligned batch dataset for downstream processes. Embodiments may have variations on performance metrics definitions and corresponding acceptance criteria. In embodiments, the alignment experiments to be executed for the alignment metadata datasheet (labeled observations) may be prepared with either a low-discrepancy sequence (LDS) approach, such as a Sobol sequence or other similar methods, or a design of experiments (DOE) approach, such as a D-optimal design or other similar methods. In certain circumstances, a brute force approach can also be used to randomly or uniformly generate alignment conditions for the alignment experiments. In embodiments, the seed model may be built using a variety of different supervised machine learning algorithms, such as Projection to Latent Structures (PLS), Neural Network, etc. Further, various model analyzers and optimizers may also be used to construct the automated or interactive learners and various model analyzers may be used for the guided learning process to extract alignment insights.

System Workflow

Figure 4:
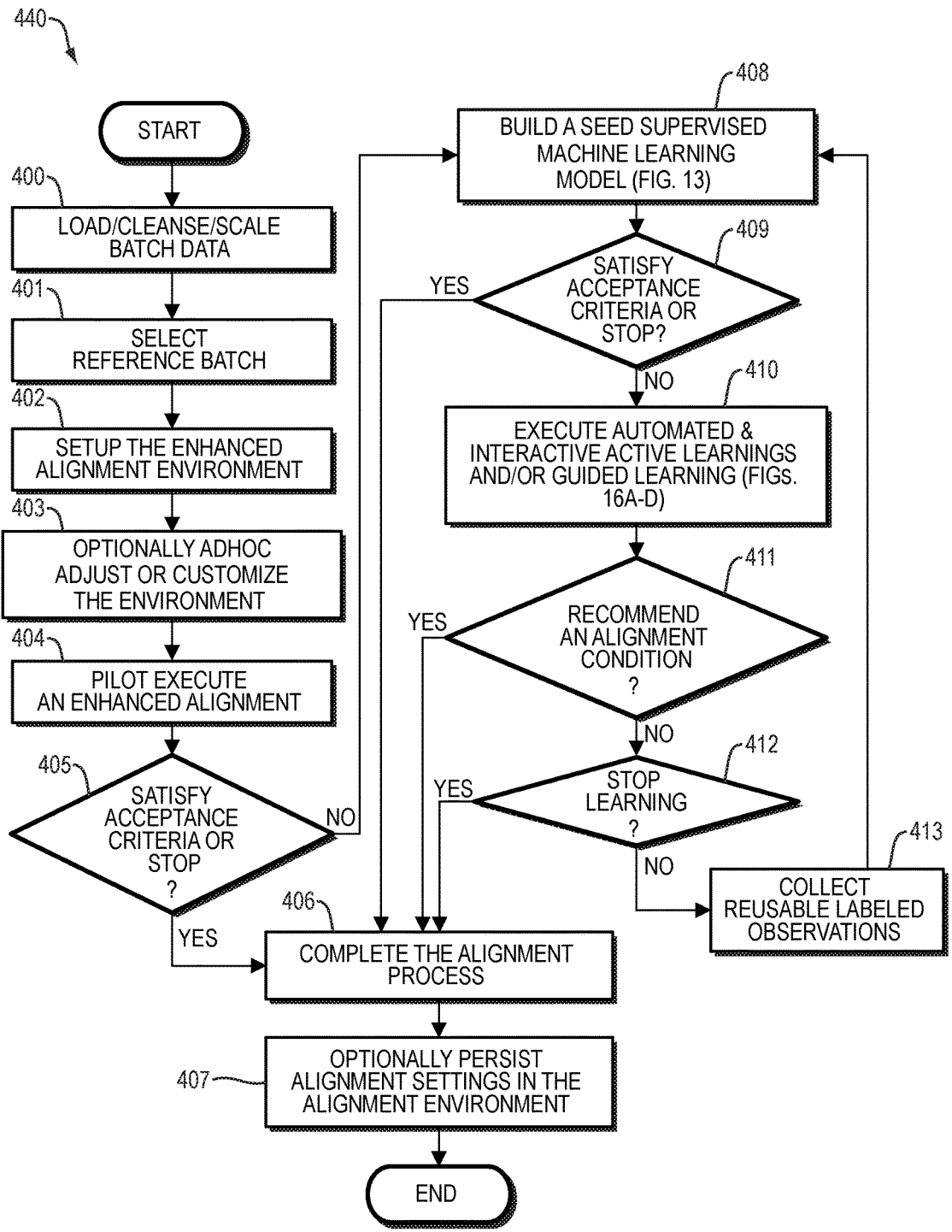
FIG. 4 depicts such an example system workflow for an alignment process according to an embodiment.

FIG. 4 depicts a batch alignment process 440 (for use in implementing process 100 of FIG. 1, for non-limiting example) according to an embodiment. The process 440 includes active learning workflows (automated and interactive) and a guided learning process to recommend alignment conditions. The process 440 can apply these alignment enhancements to an alignment method itself to improve alignment quality from a high level.

The process 440 starts at step 400 with loading, cleansing, and/or scaling batch data. In this example: these procedures are applied to DS08. In an example embodiment, after the DS08 dataset is loaded at step 400, the raw data is preprocessed. This may include removing outlier observations based on the distribution for each variable, applying centering (for example: mean centering (MC)), and applying scaling (for example: unit variant (UV) scaling, aka unity scaling), amongst other examples, to improve data quality. Centering helps to focus analysis on only the relevant variation of a variable (being the variation between the observations). Scaling each variable by a factor, which is likely different for each variable, helps to analyze data based on correlations.

Then, the process 440 at step 401 selects a reference batch. This may be implemented by allowing a user to directly select a reference batch or asking the disclosed system to provide a candidate list for the reference batch and, then, selecting a reference batch from the list. In an embodiment, the candidate list for the reference batch is recommended by the online dynamic alignment method as described in U.S. patent application Ser. No. 15/967,099. For purposes of illustration, batch 1 from DS08 is selected as the reference batch to align the other 70 batches against.

Figure 5A:
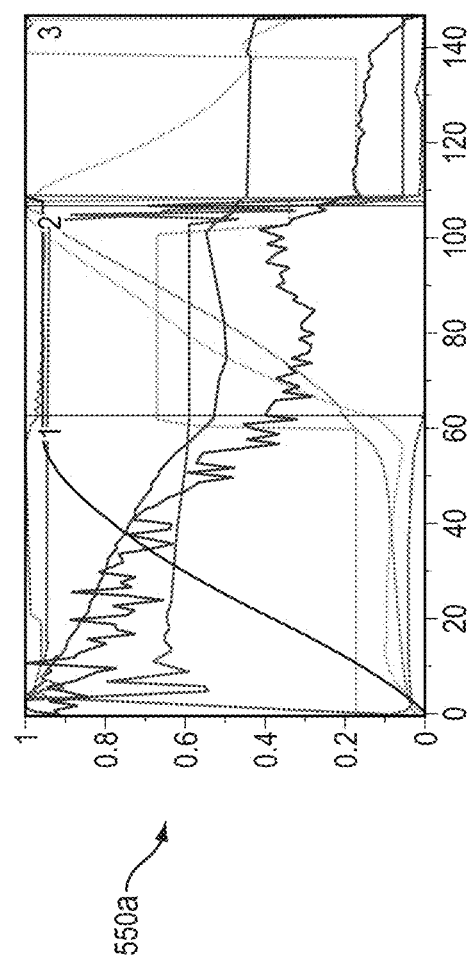
FIGS. 5A-B are plots illustrating process variables from an industrial process that may be employed in embodiments.
Figure 5B:
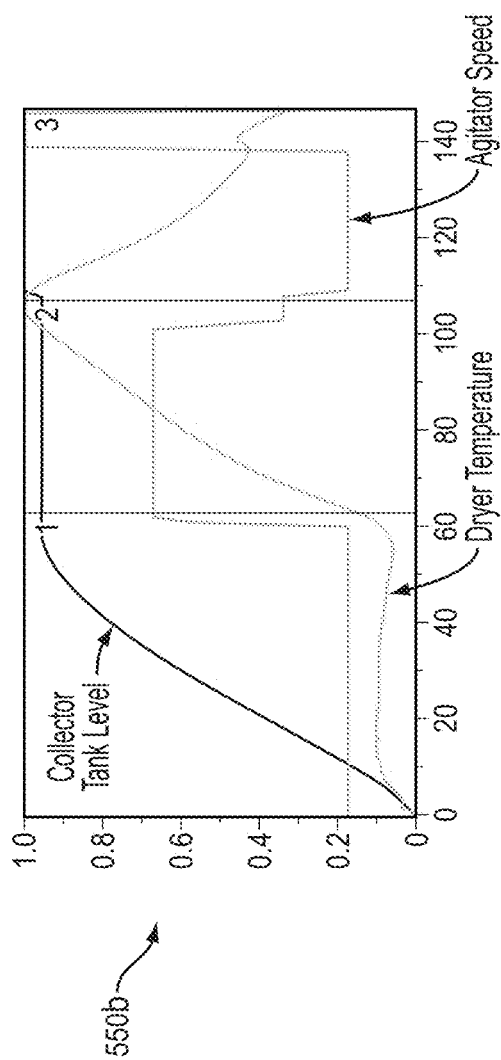

FIG. 5A shows the 10 unity scaled process variables (from FIGS. 3A-J) in the plot 550a for the reference batch (batch 1) selected at step 401. In the plot 550a of FIG. 5A, the two vertical lines divide the reference batch into 3 batch phases, which are marked as 1, 2, and 3. For the purpose of data alignment, some variables play a more important role than others. FIG. 5B shows, in the plot 550b, the process variables recommended by the online dynamic alignment method, namely the collector tank level, the dryer temperature, and the agitator speed. These are the process variables that are recommended for alignment guidance. In embodiments, the alignment variables are recommended in the online dynamic alignment method as described in U.S. patent application Ser. No. 15/967,099.

Returning to FIG. 4, the process 440, at step 402 allows a user to set up the enhanced alignment environment to align a given batch dataset (for example: DS08). Such, functionality includes configuring batch alignment settings. Functionality implemented at step 402 of the process 440 may be implemented at step 102 of the method 100 described hereinabove in relation to FIG. 1. In an embodiment, at step 402, a new environment library is started with a default enhanced alignment environment with default settings for the hyperparameters of the enhanced alignment method. Further, in an embodiment, at step 402, a user can adjust or customize the settings for a different process or a same process that is being carried out at a different manufacturing sites. These changes can be persisted for different alignment environments. According to an embodiment, when an alignment process, as described herein, is implemented with the enhanced online dynamic alignment method, the default enhanced alignment environment has the alignment-guidance pseudo variable option enabled with at least one built-in time series generator function (such as "Steps"). Other default settings that may be used include alignment performance metrics with default definitions and default acceptance criteria that focus on both total quality score and time to perform the alignment. Moreover, in an embodiment, given characteristics of a batch dataset, a different alignment environment can be selected from a library at step 402 to quickly set up the alignment conditions by adopting alignment conditions from the environment selected in the library. Further details regarding this functionality are described hereinbelow under the heading "Alignment Environment and Environment Library."

After the alignment environment is set up at step 402 (which can be done using preconfigured settings from an alignment environment persisted in the library), at step 403, a user can make optional ad-hoc adjustments or customizations on settings/options for these hyperparameters, such as time smoothness, sliding window size, difference penalty, and search interval for the online dynamic alignment method in the example system. This may include enabling or disabling alignment-guidance pseudo variables, which are temporarily available in the current alignment environment. When there is no alignment environment concept in an implementation of the process 440, the customization or adjustment at step 403 can be made directly on the settings and options for the alignment, e.g., hyperparameters, acceptance criteria, etc.

Next, at step 404 a pilot run of the enhanced alignment for the given trajectory data set with the current alignment environment is executed. The alignment at step 404 may be implemented using the method 1020 described hereinbelow in relation to FIG. 10. Further detail of this functionality is described herein below under the heading "Enhanced Alignment Workflow." The alignment results from the pilot run executed at step 404 are evaluated automatically with the performance metrics, such as "batch maturity score", "phase ID score", "total quality score", and "alignment time taken." Further detail regarding the alignment performance metrics definitions is described hereinbelow under the "Alignment Performance Metrics" heading.

Continuing the process 440, at step 405, the alignment performance metrics are compared against the alignment acceptance criteria configured in the current alignment environment. Further details of the alignment acceptance definitions are described below under the "Alignment Acceptance Criteria" heading. If the current alignment environment is custom-built for the given type of industrial batch datasets, it is likely that pilot run executed at step 404 produces alignment results with reasonable performance metrics. As such, the results from the alignment at step 404 may satisfy the acceptance criteria evaluated at step 405. Further, it is noted that at step 405, if the performance metrics are not good enough to meet the acceptance criteria, a user can stop and accept the aligned dataset "as is". In both cases (meeting acceptance criteria or accepting the aligned data "as is"), the process 440 proceeds to step 406.

At step 406, the whole alignment process is complete. The accepted aligned dataset and its corresponding alignment condition can be stored so as to be available outside the system implementing the process 440. Moreover, other alignment results, performance metrics, and their corresponding alignment conditions are no longer needed and can be deleted at step 406.

If the current alignment environment has settings/options/definitions different from the original environment in the library, the process 440 provides an option to persist, i.e., store in computer memory, the entire current alignment environment as a brand new environment or update/replace the original environment in the library. This functionality is carried out at step 407. Storing the settings (alignment conditions, values of variables and parameters, etc.) at step 407 allows the alignment process to be rerun. This allows consistent alignment results to be produced. Alternatively, at step 407, a user can choose to discard these temporary changes and make no change to the library.

Returning to step 405, if the acceptance criteria are not met, or the user does not accept the alignment despite the criteria being met, the process 440 moves to step 408. At step 408 the process 440 builds a seed model configured to predict alignment quality given settings for one or more alignment hyperparameters. The method 440 may implement the method 1300 described hereinbelow in relation to FIG. 13 to build the seed model at step 408. An embodiment of the process 440 prepares the alignment metadata datasheet for constructing the seed supervised machine learning model at step 408. In such an embodiment, the max N (such as 50) alignment experiments are performed during this initial implementation of step 408 on the batch dataset with early termination using the enhanced alignment method. The early termination option exits step 408 during the metadata datasheet preparation if the alignment results for an experiment meet the acceptance criteria. Otherwise, a supervised machine learning model is automatically built based on the metadata datasheet to extract insights on the impact of settings/options for alignment hyperparameters to alignment quality. In embodiments, a variety of different supervised machine learning methods, such as PLS, Neural Network, etc., can be used to build the seed model at step 408. In the example implementation described below, the PLS algorithm is used to build the seed model. Further details for building the machine learning model at step 408 are described hereinbelow under the "Build a Seed Supervised Machine Learning Model" heading. Moreover, the machine learning model may be built at step 408 using the method 1300 described hereinbelow in relation to FIG. 13.

Next, at step 409, the process 440 checks if alignment results from any of these N alignment experiments (performed at step 408 to construct the machine learning model) satisfy the acceptance criteria. If the criteria are met, then the process 440 moves to step 406 described previously. Likewise, the process 440 will move to step 406 even if the alignment results from the alignment experiments performed at step 408 are not good enough to meet the acceptance criteria, but a user has chosen to stop and accept the aligned dataset "as is". If, at step 409 it is determined that the acceptance criteria are not met, then the process 440 moves to step 410.

At step 410, the process 440 implements at least one of three built-in workflows to leverage the seed supervised machine learning model (built in step 408) to recommend a practical alignment condition with its alignment results and performance metrics for a given batch dataset. At step 410, the process 440 implements at least one of (1) an automated active learning workflow, (2) an interactive active learning workflow, and (3) a guided learning process. These three workflows can be implemented at step 410 in parallel and a user can select which workflow to follow, in which sequence to proceed through these workflows, and whether to repeat a workflow after performing a workflow. For example, using the seed model, an experienced user may choose to interactively study the relationship between alignment hyperparameter settings and the alignment metrics and make tradeoffs through an interactive active learning workflow and/or the guided learning process. In another example, a novice user may rely on an automated active learning workflow to get a recommended alignment condition and its alignment results and performance metrics for the underlying batch dataset. Further details of the workflows that may be implemented at step 410 are described hereinbelow under the "Automated Active Learning Workflow to Recommend an Alignment Condition," "Interactive Active Learning Workflow to Recommend an Alignment Condition," and "Guided Learning Process to Recommend an Alignment Condition" headings. Moreover, the functionality described hereinbelow in relation to FIGS. 16A-D may be implemented at step 410.

Next, at step 411, the process 440 checks whether an alignment condition with its alignment results and performance metrics, has been recommended by the active learning workflows or the guided learning process implemented at step 410. If an alignment condition is recommended, then the process 440 continues to step 406. If there is not a recommended alignment condition from step 410, then at the step 411, the process 440 proceeds to step 412.

At step 412 the process 440 checks whether a user wants to stop learning on the given batch dataset. If at step 412, the user provides an indication that he wants to stop, the process 440 proceeds to step 406 and the best-so-far alignment condition with its alignment results and performance metrics is made available (output from process 440). If at step 412, the user provides an indication that he does not want to stop, then the process 440 proceeds to step 413.

Given that both (a) executing an alignment experiment, i.e., labeling an observation, is computationally expensive, and (b) generally, the more executed alignment experiments (labeled observations) available, the better the model prediction of alignment quality, at step 413, the process 440 collects all compatible observations previously labeled for the same batch dataset during the pilot run, previous active learning workflows, and the guided learning process. After collecting reusable labeled observations at step 413, the process 440 returns to step 408 and iterates through steps 409, 410, 411, and 412. At step 408, these existing compatible observations can be merged with newly labeled observations to build/update a seed model that provides a better prediction of alignment quality.

Alignment Environment and Environment Library

Embodiments may employ an alignment environment to facilitate the management of: alignment hyperparameters and their settings, alignment performance metrics, alignment acceptance criteria, alignment-guidance pseudo variable generator functions, and any other alignment related data for a given batch dataset. According to an embodiment, the alignment environment library is a computer memory area storing the relevant data. In an embodiment, an environment library is utilized to manage a list of the alignment environments. Use of an environment library not only allows a user to quickly switch from one environment, i.e., collection of alignment settings, to another, but also ensures consistent alignment results when the same alignment environment is applied to the same batch dataset.

An embodiment utilizes a default alignment environment in the library. According to an example implementation, the default environment includes (1) an indication of an enhanced alignment method chosen from among a candidate list of alignment methods, (2) default settings for alignment hyperparameters, (3) default performance metric definitions, and (4) default acceptance criteria, along with any other relevant default settings and configurations. In an embodiment where the batch model is used for online analysis, monitoring, and control, the enhanced online dynamic alignment method is set as the system default in all built-in alignment environments. Moreover, in an embodiment, the default environment has the alignment-guidance pseudo variable enhancement enabled with one built-in time series generator function (such as "Steps"). The default environment may also include default performance metrics (e.g., batch maturity score, phase ID score, total quality score, and alignment time taken) with built-in default definitions and default acceptance criteria based on the total quality score and the time it takes to perform an alignment.

Different batch datasets from different batch processes or the same batch process executed at a different manufacturing plant, may require different alignment environments. As such, in an embodiment, a user can customize settings and configurations for particular batch processes. Settings that can be configured include performance metrics, acceptance criteria, and user-defined functions as alignment-guidance pseudo variable generator functions, amongst other examples. Moreover, users can choose different alignment methods, customize a chosen alignment method to meet specific needs, and persist these chosen configurations into alignment environments. Given the characteristics of a batch dataset, an alignment environment can be selected from the library to quickly set up alignment conditions.

For a new batch dataset, a user without any prior insights or domain knowledge on the process that produces the batch data, can start with a default alignment environment. Moreover, a user can adjust or customize the alignment environment, i.e., settings for performing the batch alignment. Users can also store the modified conditions as a new alignment environment in the library for reuse.

An example alignment environment built with the enhanced online dynamic alignment methods described herein can include a large variety of different alignment settings and configurations. The alignment environment can include hyperparameters and setting ranges for the hyperparameters. Example hyperparameters include time smoothness, sliding window size, difference penalty, and search interval, amongst others. Additional hyperparameters that may be employed in embodiments are described in U.S. patent application Ser. No. 15/967,099, the contents of which are herein incorporated by reference.

The alignment environment can also store options and settings related to the alignment-guidance pseudo variable enhancement. This data may include a list of alignment-guidance pseudo variable time series monotonic generator functions (including built-in and user-defined) with their enabling or disabling flags and tunable settings (such as the variable alignment weight, etc.). These functions can be used by embodiments to automatically generate the alignment-guidance pseudo variable time series on-the-fly with the batch phase information to influence the alignment outcomes. Further details regarding this functionality are provided herein under the "Alignment-Guidance Pseudo Variables and their Generator Functions" heading.

Embodiments may also store options and settings related to the alignment-guidance only variable enhancement. This data may include a list of alignment-guidance-only time series variables either (i) explicitly generated with similar monotonic time series generator functions with batch phase information in user historian databases and distributed control system, etc., or (b) explicitly included by users as process-insignificant process variables for modeling purposes, but with clear alignment guidance information. These alignment-guidance only variables can be provided together with other process variables to an alignment implementation. Further details regarding this functionality are provided herein under the "Alignment-Guidance-Only Process Variables" section.

The environment may include a list of alignment performance metrics (including built-in and/or user-defined definitions) and the corresponding alignment quality acceptance criteria (default or customized). Further details regarding the metrics and acceptance criteria are provided below under the "Alignment Performance Metrics" and "Alignment Acceptance Criteria" headings.

Embodiments may also store settings and options for building a seed supervised machine learning model. This information may include: (1) the number of executed alignment experiments (labeled observations) required to build a model with reasonable accuracy, (2) the best choice of machine learning model technology (for example: Projection to Latent Structure (PLS) multivariate statistical model and Neural Network, amongst other examples), along with any other settings for building the seed learning model.

Another embodiment stores settings and options for the automated active learning workflow. Examples of these settings and options includes the maximum number of allowed iterations for automated learning, indications of model analyzers or optimizers to be used as the core of the automated learner, indications of the imposed constraints on the settings of the hyperparameters and the performance metrics, and an indication of how the automated learner determines which observation is the next most informative observation to be selected.

The settings and options for the interactive active learning workflow may also be stored in the environment library. This data may include which model analyzers or optimizers to use as the core of the interactive learner, the imposed constraints to the settings of the hyperparameters and the performance metrics, and how the interactive learner determines which observation is the next most informative to be selected, amongst other examples.

Similarly, the settings and options for the guided learning process may be stored in the environment. This may include which model analyzers (for example: the Variable Importance in Projection (VIP) analyzer) to be used to extract insights.

Embodiments may include some or all of the aforementioned data as well any other data known to those of skill in the art. Further, it is noted that embodiments do not require the use of an alignment environment and environment library and, in such an embodiment, settings for hyperparameters, performance metrics, acceptance criteria, and other alignment criteria can be directly applied and configured during implementation.

Alignment-Guidance Pseudo Variables and their Generator Functions

When there are not enough process variables with clear alignment guidance, one or more intermediate derived pseudo time series can be included together with the underlying batch dataset to provide alignment guidance. Herein, an intermediate derived time series is called an "alignment-guidance pseudo variable". In an embodiment, purpose-built time series generator functions or user provided generator functions can be configured or customized by users to produce the desired alignment-guidance pseudo variable time series.

According to an embodiment, the time series generator functions are per-phase and are monotonic in order to provide clear direction for the alignment process. Given the nature of each phase in a batch process, users with domain knowledge can apply different per-phase time series generator functions to generate an alignment-guidance trajectory for each phase because different time series shapes can have different effects on the alignment quality. For example, during the logarithmic growth phase for the bacteria in a bioreactor for water treatment, if there is a lack of clear alignment-guidance from the existing process variables, a logarithm-based monotonic time series generator function can be selected to automatically generate the time series with a logarithmic characteristic for that phase.

To illustrate, various polymerization processes may follow a step-growth mechanism or a chain-growth mechanism, where: 1) for the step-growth mechanism, large quantities of monomers are consumed early in the reaction; and 2) for the chain-growth mechanism, concentration of monomers decreases steadily over time. Depending on the double bond type involved and the catalyst applied, the metathesis polymerization of cycloolefins may follow either the step-growth mechanism or the chain-growth mechanism. If there is a lack of clear alignment-guidance from the existing process variables, for the polymerization reaction phase with step-growth, a "Step wise" or "Steps" time series generator function can be selected to automatically generate the time series with a step characteristic for that phase, while for the polymerization reaction phase with chain-growth, a "Saw tooth" based time series generator function can be selected to automatically generate the time series with a saw-tooth characteristic for that phase. A novice user can select one or more pseudo variable generator functions and apply the automated active learning workflow to find out the impact of the generator functions on the alignment quality for a given batch dataset. Further, details of this functionality are described below under the "Automated Active Learning Workflow to Recommend an Alignment Condition" section.

Figure 7:
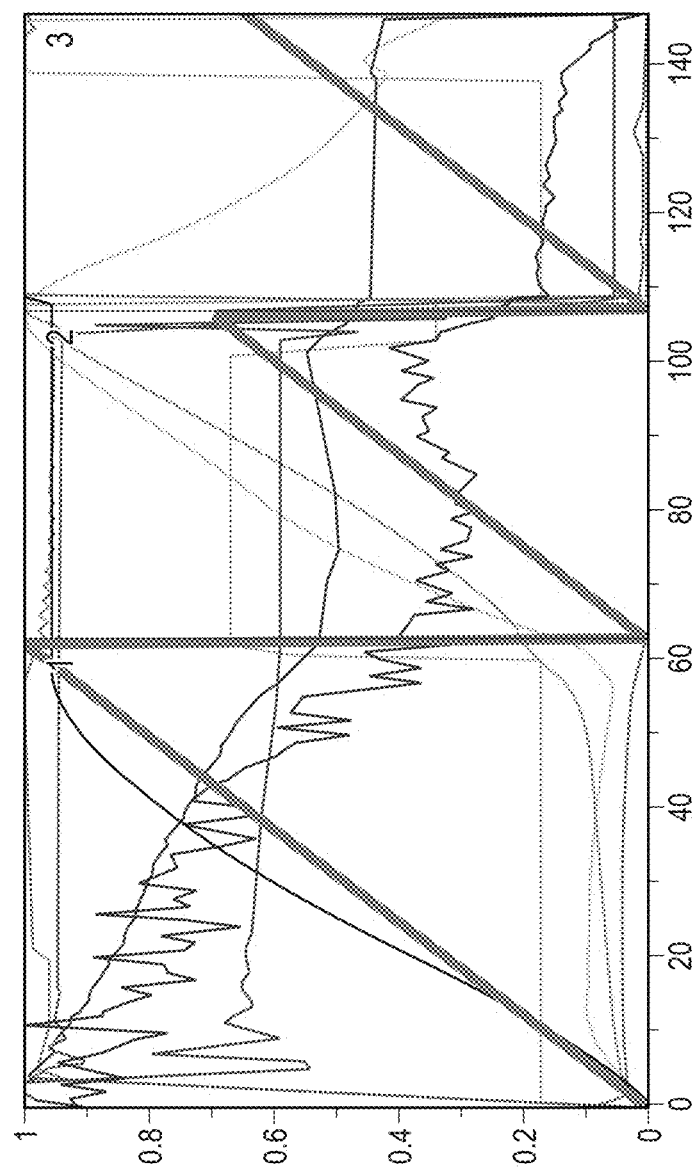
FIG. 7 is a graph depicting a pseudo variable merged with process variables according to an embodiment.

In embodiments, the built-in per phase time series generator functions may include, but are not limited to, polynomial functions (such as "Steps", "Saw tooth", "Squared", etc.), logarithmic functions, and exponential functions, amongst other examples. The input "t" to a given time series generator is the current observation's index in the batch, while "t0" is the beginning observation's index in the batch for a phase, so that "t–t0" would be the 0 based relative index for an observation in that particular phase if both "t" and "t0" are in the same phase. In other words, the generated batch trajectory for each alignment-guidance pseudo variable is monotonic in each batch phase respectively. To illustrate, in an example embodiment, the built-in "Saw tooth" time series generator will repeatedly read in phase ID information for a new observation and internally compare the new observation with the very last observation's phase ID information to determine if a new phase has just started. If a new phase starts, the counter will be reset to 0, while if the phase for the new observation is the same as that of the very last observation, the counter will increase by 1. In this way, the count becomes the 0 based relative index for the current batch phase. The plot 770 in FIG. 7 shows the "Saw tooth" generated pseudo variable for DS08's batch 1 merged with the other 10 process variables of DS08's batch 1. Below are a few typical forms for these formulae and they work "as is" for most cases, but if needed, can be customized further.

Steps Time Series Generator Function:

$$y(t) = \text{numeric phase ID e.g. 1, 2, and 3 in the 3 phase batch process} \tag{1}$$

Saw Tooth Time Series Generator Function:

$$y(t) = t - t0 \tag{2}$$

Squared Time Series Generator Function:

$$y(t) = (t - t0)^2 \tag{3}$$

Logarithmic Time Series Generator Function:

$$y(t) = \log(t - t0 + 1) \tag{4}$$

Exponential Time Series Generator Function:

$$y(t) = \frac{1}{1 + e^{-(t-t0)/5}} \tag{5}$$

FIGS. 6A-E are plots 660a-e illustrating alignment-guidance pseudo variables generated with the above equations (1) to (5) for built-in pseudo variable generator functions and the phase information for DS08's batch 1. DS08's batch 1 has 149 sampling points with indices from 0 to 148, and from 0 to 62 for the first phase, from 63 to 106 for the second phase, and from 107 to 148 for the third phase. To keep the demonstration simple, the pseudo generator functions are not switched for different phases during the time series generation for the batch. Specifically, in FIG. 6A the time series is generated by the "Steps" generator function, in FIG. 6B the time series is generated by the "Saw tooth" generator function, in FIG. 6C the time series is generated by the "Squared" generator function, in FIG. 6D the time series is generated by the "Logarithmic" generator function, and in FIG. 6E the time series is generated by the "Exponential" generator function.

As an example, the plot 770 in FIG. 7 shows the "Saw tooth" generated pseudo variable for DS08's batch 1 merged with the other 10 process variables of DS08's batch 1. In an embodiment, the "Saw tooth" generator function is applied to the other 70 batches of DS08 in the same fashion to generate the pseudo variable for each of them. Thus, in such an implementation, the updated dataset (10 process variables and 1 "Saw tooth" pseudo variable for each batch) is enhanced with the "alignment-guidance pseudo variable" and ready for alignment. In this way, embodiments align the data of the saw tooth along with the data of the other process variables to a reference batch.

Alignment-Guidance-Only Process Variables

When the batch alignment quality is not sufficient, embodiments, through direction from users, such as users with domain knowledge and process insights, can bring in additional process variables, which are insignificant to the batch process itself, but which, can provide meaningful guidance on batch alignment. Alternatively, an alignment-guidance-only time series may also be explicitly generated by users in their historians, distributed control system, etc. (e.g. outside the disclosed alignment system) using time series generator functions which are based on the batch phase information. This functionality may utilize the time series generator functions described above, such as "Steps," and "Saw tooth," amongst others. In both cases, the purpose of bringing in these variables is to provide alignment guidance. Thus, such variables are referred to as "alignment-guidance-only process variables". Given the nature of these variables as alignment-guidance-only, they may be excluded from the initial study to reduce computational overhead, but later included in a batch dataset to improve the alignment quality.

Figure 8:
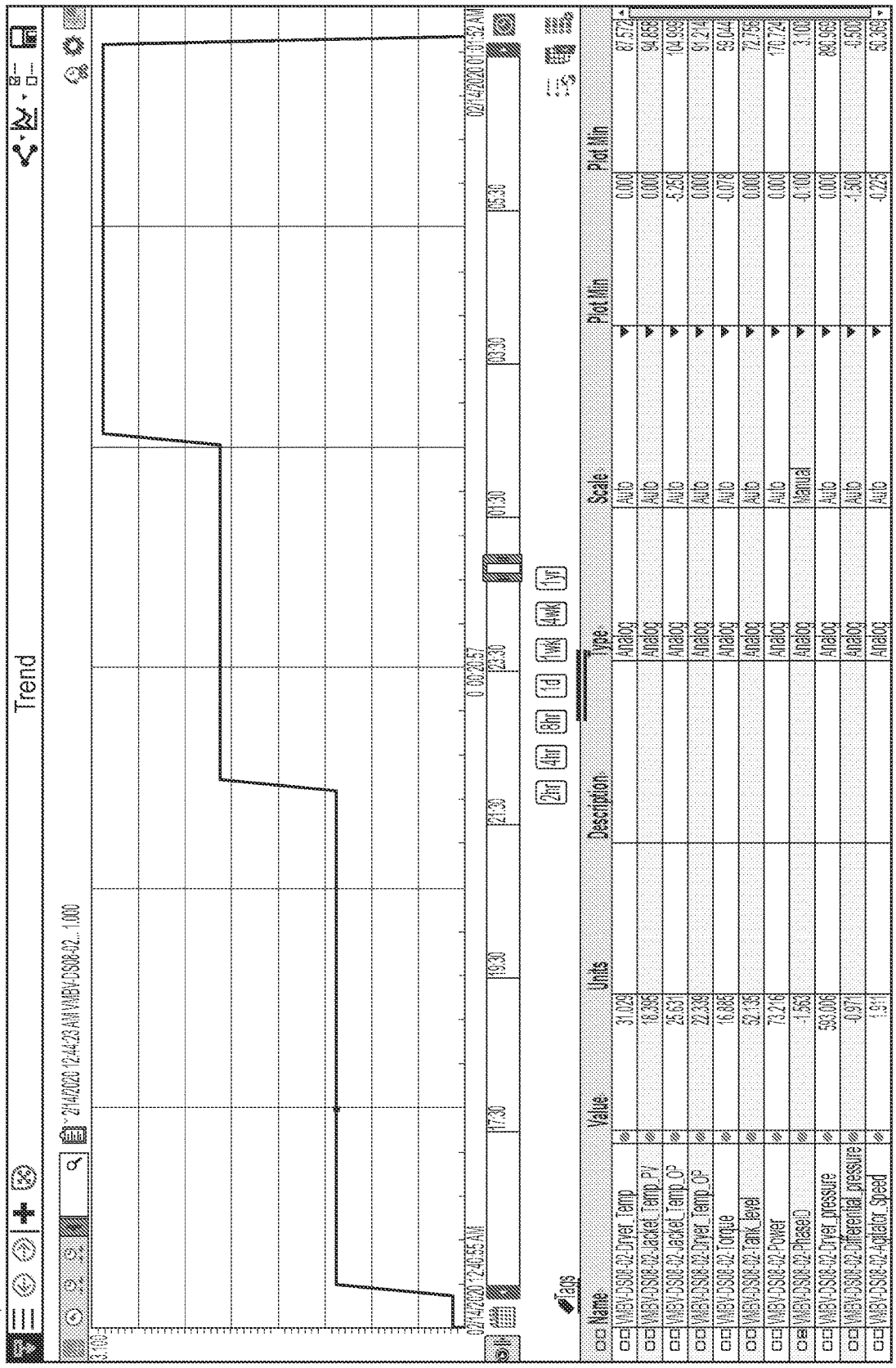
FIG. 8 is a plot illustrating an alignment-guidance-only variable that may be utilized in embodiments.

The plot 880 in FIG. 8 shows the batch phase ID variable time series for a DS08 batch. The batch phase ID time series may be recorded in real time in a historian during a batch process recipe execution. Since the phase ID variable is "Steps" without much variation most of the time, it might not be included in the study initially to extract process insights. However, the steps variable provides alignment guidance on the phase boundaries. In other cases, the phase ID time series can be explicitly generated by users applying the "Steps" time series generator function in their historian, distributed control system, etc., for each batch. For example, to generate a "Steps" time series in a historian for the three-phase batch reactor/dryer process, a user can develop a script to be executed by a timer once every minute to check which phase the current batch is operating in. Then, the script can insert 0 into a historian if the batch is within a preparation phase, insert 1 into a historian if the batch is in the $1^{st}$ phase, insert 2 into a historian if the batch is in the $2^{nd}$ phase, and insert 3 into a historian if the batch is in the $3^{rd}$ phase. The "Steps" time series stored in the historian will look similar to the plot 880 in FIG. 8. Different from other real process variables stored in the historian, these time series are generated by utilizing the batch phase information and pseudo variable generator functions to purely provide alignment guidance. After the steps variable is produced, it can be used as an alignment-guidance-only variable for any alignment system.

Figure 9:
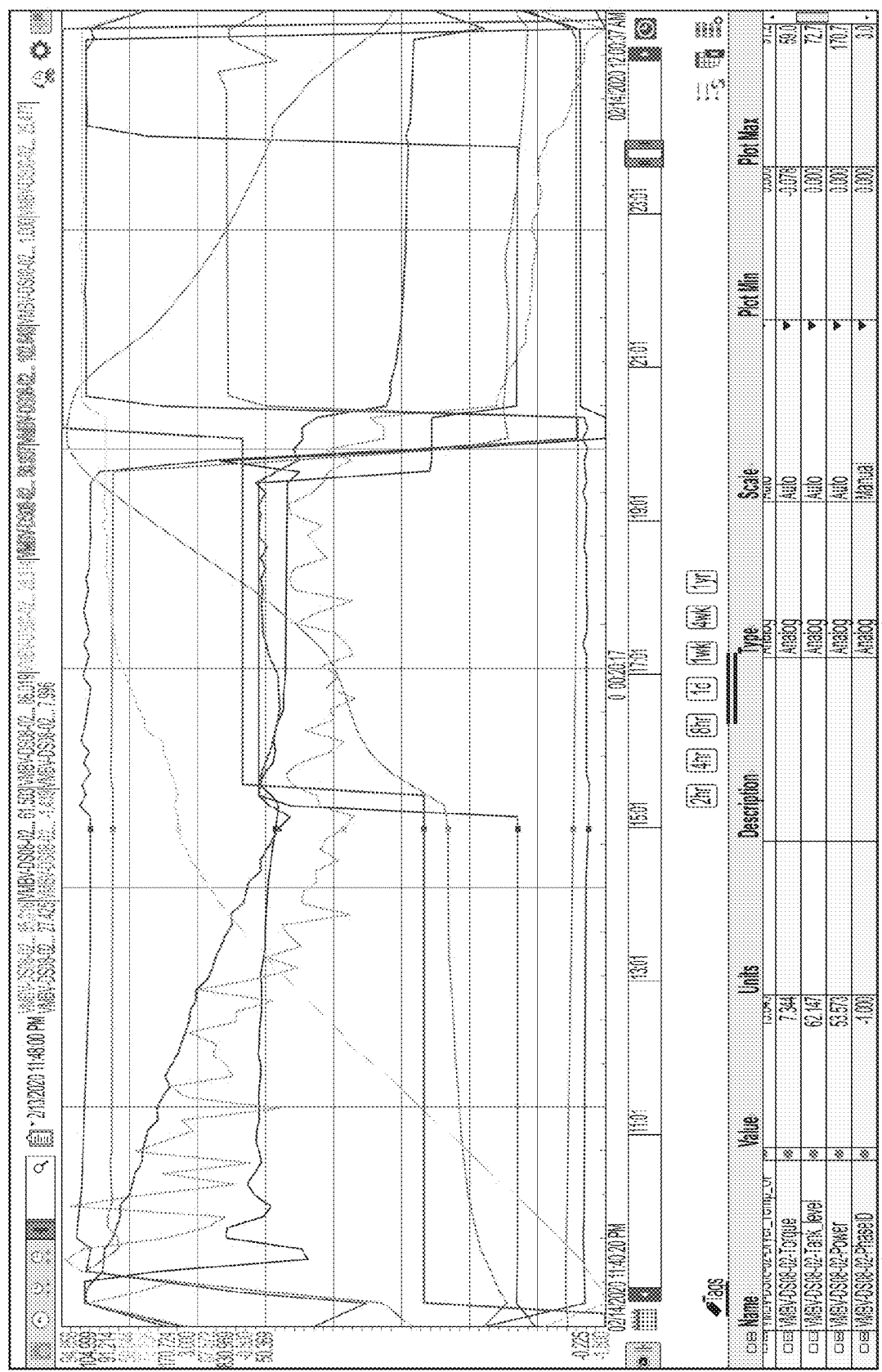
FIG. 9 is a plot of enhanced batch data employed in embodiments.

As an example, the plot 990 in FIG. 9 shows the "Steps" alignment-guidance-only variable together with the other 10 process variables for a batch of DS08. The same mechanism can be put in place for all other batches in DS08. Thus, the refined dataset (10 process variables and 1 "Steps" alignment-guidance-only variable for each batch) is now enhanced with the "alignment-guidance-only variable" and ready for alignment.

Enhanced Alignment Workflow

Figure 10:
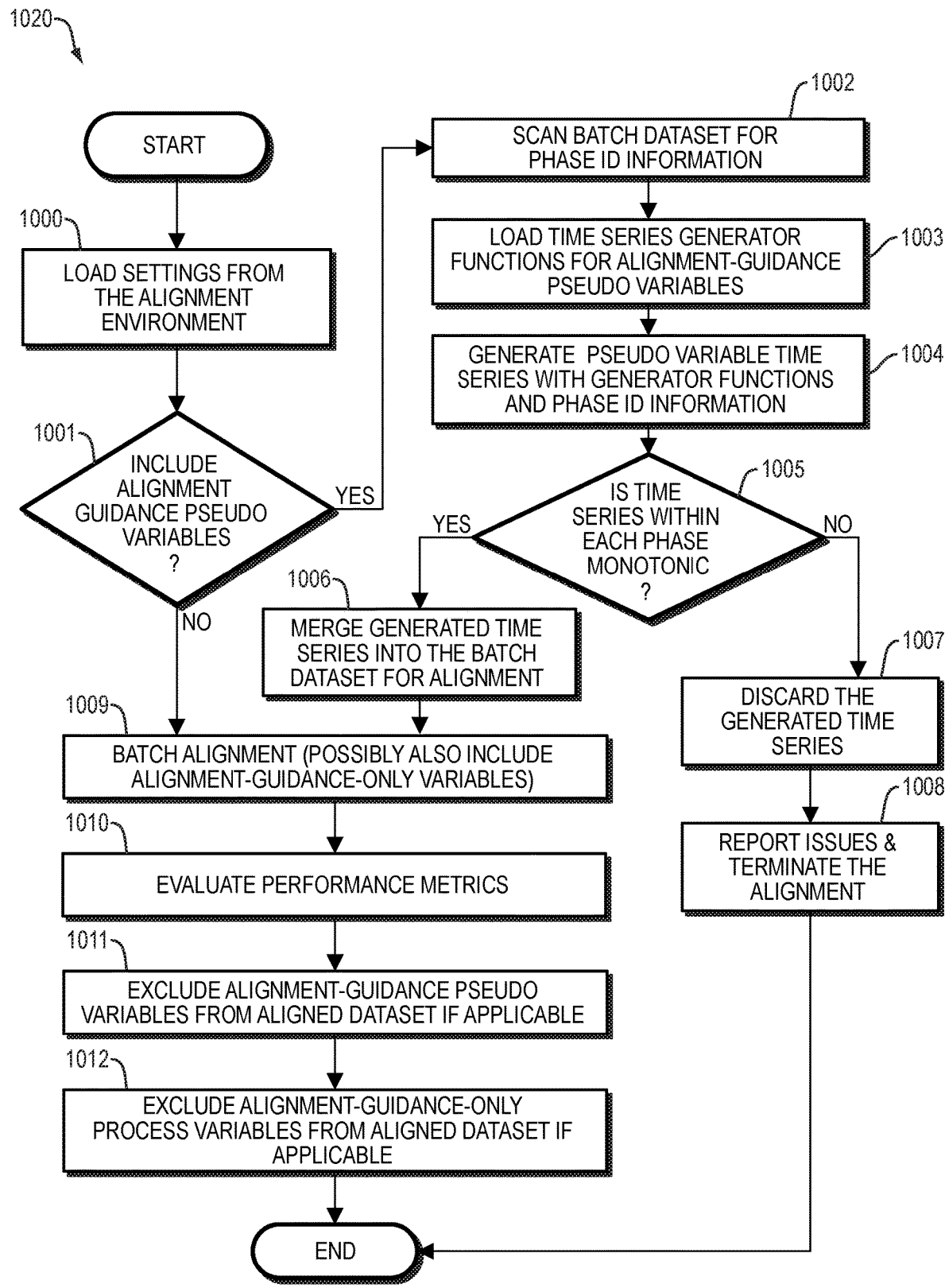
FIG. 10 is a flowchart of a method for performing an alignment according to an embodiment of the present invention.

An enhanced alignment workflow 1020 according to an embodiment is illustrated in FIG. 10. This method 1020 can be used to prepare alignment metadata datasheet used to construct the seed model at step 103 of FIG. 1, performing alignment during various learnings at step 104, or performing alignment at step 105. The workflow 1020 addresses numerous alignment issues. For example, the workflow 1020 handles errors on phase ID prediction and batch maturity non-monotonic progress. The workflow 1020 also prevents cases where the batch maturity never reaches 100% batch maturity and where the data is highly variable and the results are not robust. The workflow 1020 addresses these problems by applying the alignment-guidance pseudo variable enhancement and/or the alignment-guidance-only process variable enhancement to the underlying batch dataset before alignment. Further details on these enhancements is described herein under the "Alignment-Guidance Pseudo Variables and Their Generator Functions" heading and the "Alignment-Guidance-Only Process Variables" heading.

In this example workflow 1020, the online dynamic alignment method is provided in step 1009 and the "Saw-Tooth" generator function is selected as an example in step 1003 to generate an alignment-guidance pseudo variable to demonstrate the workflow. It is noted that this is but one example and for other embodiments, different alignment methods can be used with built-in or customer-provided pseudo variable generator functions.

The enhanced alignment workflow 1020 starts at step 1000 by loading settings from the alignment environment. The settings that may be loaded at step 1000 include (1) hyperparameters and hyperparameter setting ranges for the online dynamic alignment method, (2) options and settings for the alignment-guidance pseudo variable enhancement, (3) a list of alignment-guidance-only time series variables, and (4) alignment performance metrics and corresponding alignment acceptance criteria. Moreover, any variables described herein may be loaded at step 1000. Further details of settings that may be loaded at step 1000 are described herein under the "Alignment Environment and Environment Library" heading.

Next, step 1001 determines whether any alignment-guidance pseudo variable is enabled in the alignment environment. If yes, then the workflow 1020 proceeds to step 1002. Otherwise, the workflow 1020 proceeds to step 1009.

Figure 11A:
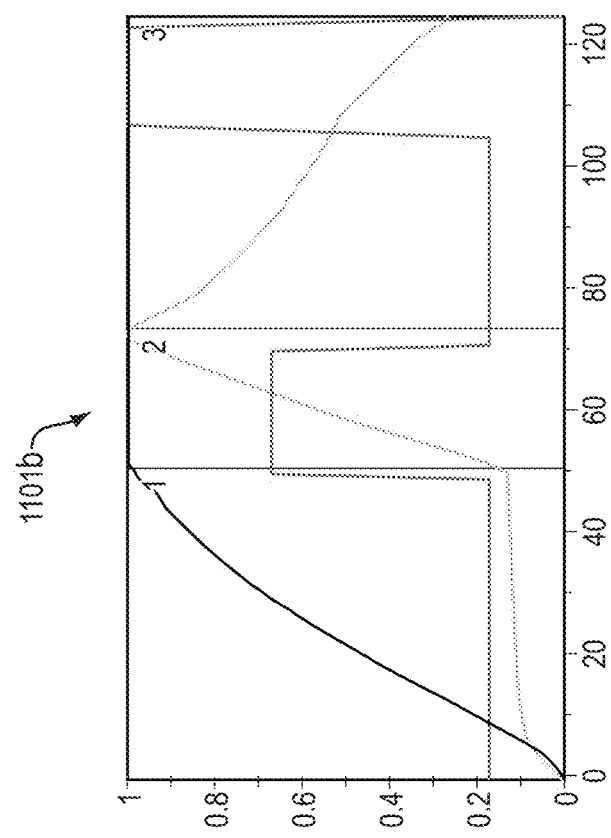
FIGS. 11A and 11B are plots illustrating phase information provided in an embodiment.
Figure 11B:
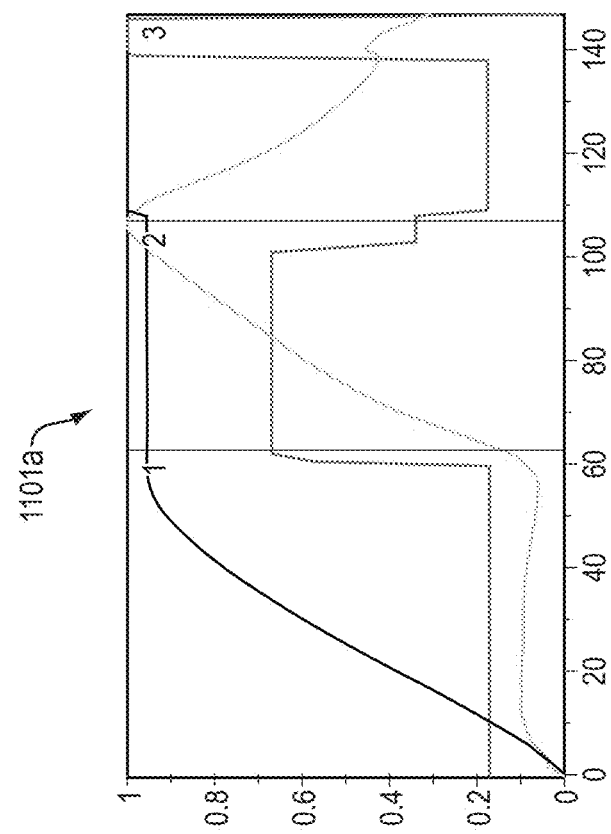

The process 1020, at step 1002 scans each to-be-aligned batch and the reference batch in the dataset to record each batch's phase ID information. FIGS. 11A-B show the phase ID information for two DS08 batches that may be determined at step 1002. When the online dynamic alignment method is used to align batches, the alignment process 1020 can only consume information up to the alignment sampling time. However, for purposes of illustration, the plots 1101a-b in FIGS. 11A-B are for whole batches. The plot 1101a in FIG. 11A shows the phase ID information for the reference batch 1 which has 149 sampling points with indices from 0 to 148, where the first phase is from 0 to 62, the second phase is from 63 to 106, and the third phase is from 107 to 148. The plot 1101b in FIG. 11B shows the phase ID information for the raw batch 32 which has 126 sampling points with indices from 0 to 125, where the first phase is from 0 to 50, the second phase is from 51 to 73, and the third phase is from 74 to 125.

Returning to FIG. 10, at step 1003, the process 1020 loads time series generator functions for alignment-guidance pseudo variables. At step 1003, any time series generator function definitions enabled in the alignment environment, i.e., alignment settings/configuration, are loaded. The loaded functions may be built-in functions or customer-provided functions. In this example described herein, a "Saw tooth" generator function definition is loaded at step 1003.

Next, at step 1004, pseudo variable time series are generated using the generator function loaded at step 1003 and the phase ID information determined at step 1002. The process 1020 produces the alignment-guidance pseudo variable time series for each to-be-aligned batch using the designated alignment-guidance pseudo variable generator functions (such as the "Saw tooth" function) and the phase ID information. Because this example is based on the online dynamic alignment method, the process 1020 should only have the phase ID information up to the current sampling time. Further details of this functionality are described herein in under the heading "Alignment-Guidance Pseudo Variables and Their Generator Functions."

Next, at step 1005, the process 1020 determines if the generated alignment-guidance pseudo variable is monotonic in each phase. If the generated alignment-guidance pseudo variable is monotonic, the process 1020 moves to step 1006, if not, the process 1020 moves to step 1007. In an example implementation, the built-in time series generators are monotonic. However, if the alignment-guidance pseudo variable generated by a user-provided generator functions is not monotonic (as determined at step 1005), the generated time series cannot be used and is discarded at step 1007 and the process 1020 moves to step 1008. At step 1008 the process 1020 issues an error that informs a user that the time series generated is not monotonic, and then, the alignment process 1020 ends.

Figure 12:
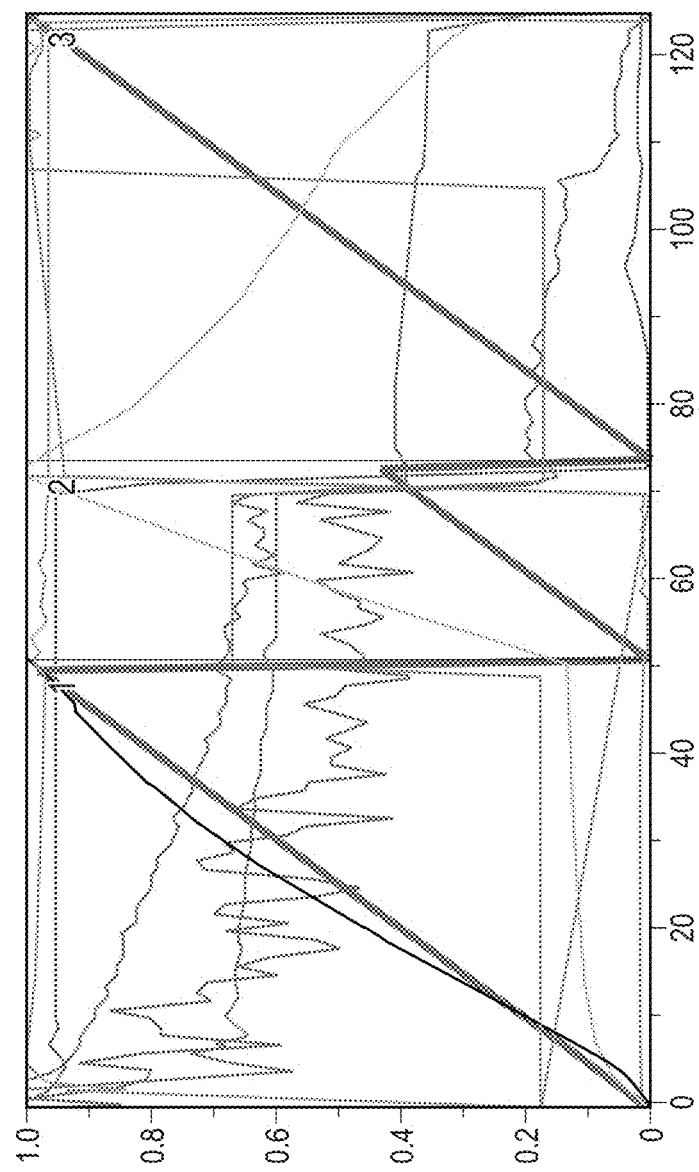
FIG. 12 is a graph illustrating a pseudo variable merged with batch data according to an embodiment.

Returning to step 1005, as noted above, if the generated alignment-guidance pseudo variable is monotonic, the process moves to step 1006. In this example, the "Saw tooth," which is monotonic, is selected to generate the alignment-guidance pseudo variable and, as such, the time series generated with the saw tooth is determined to be monotonic at step 1005 and the process proceeds to step 1006. At step 1006, the generated alignment-guidance pseudo variable for each batch is merged with the underlying batch dataset (for example: DS08). For illustration purposes, the graph 1200 in FIG. 12 plots illustrates the results of the merging performed at step 1006. In the graph 1200, all 10 process variables and 1 pseudo variable (in unity scale) of the whole batch 32 for DS08 are shown.

Returning to FIG. 10, after the merging at step 1006, the process 1020 advances to step 1009 where the batch alignment is performed. In the process 1020, the underlying original batch dataset could already be enhanced with one or more alignment-guidance-only variables by users with domain knowledge or process insights. Such functionality is described in the "Alignment-Guidance-Only Process Variables" section. Further, at step 1009, the overall dataset for alignment can include the process significant variables, the alignment-guidance-only process variables (a.k.a. the process insignificant variables), and the alignment-guidance pseudo variables. Process variables (regardless of being significant or insignificant) are variables that are from outside of the alignment system, such as historians, distributed control systems, etc. In other words, the process variables are not determined as part of the alignment process 1020. On the other hand, the alignment-guidance pseudo variables are generated implicitly and automatically as part of the alignment process 1020. At step 1009, the online dynamic alignment method is used to align the overall batch dataset and the process 1020 advances to step 1010.

At step 1010 the alignment results are evaluated with performance metrics. This functionality is detailed in the "Alignment Performance Metrics" section.

Depending on the settings for the process 1020, after performing the alignment at step 1009 and evaluating the performance metrics at step 1010, the alignment-guidance pseudo variables are automatically excluded from the aligned batch dataset at step 1011. Alternatively, the alignment-guidance pseudo variables can be kept in the aligned batch dataset for model building, analysis, or predicting. Keeping the alignment-guidance pseudo variables in the aligned batch dataset does not necessarily degrade the batch model built on the aligned batch dataset, but more computing resources are needed to build such a batch model.

After the alignment at step 1009, evaluating the performance metrics at step 1010, and excluding the alignment-guidance pseudo variables at step 1011, the alignment-guidance-only process variables are automatically excluded from the aligned batch dataset at step 1012. The alignment-guidance-only process variables can be automatically excluded before utilizing the batch for model building, analysis, and predicting to reduce unnecessary computing efforts. In an embodiment, the alignment-guidance-only process variables are automatically excluded at step 1012 if they are earmarked as alignment-guidance-only variables in the alignment environment. In embodiments, maintaining the alignment-guidance-only variables in the batch does not necessarily degrade the batch model built on the aligned trajectory dataset, but more computing resource would be required. As such, it can be computationally advantageous to exclude the alignment-guidance-only process variables at step 1012. Further, it is noted that in embodiments, steps 1011 and 1012 may be performed at the same time or in a different order than depicted in FIG. 10.

Alignment Performance Metrics

Embodiments employ purpose-built performance metrics to quantify the batch alignment quality. Utilizing the performance metrics allows the alignment results to be evaluated objectively and systematically. In embodiments, users can select and customize these performance metrics. Further, users can include their own definitions for performance metrics during the alignment configuration. Embodiments can utilize built-in performance metric functions to quantify the alignment results. Example performance metrics include batch maturity score, phase ID score, and total alignment score. Embodiments can also consider the time it takes to run the alignment process. Examples of the performance metrics are shown below using the enhanced online dynamic alignment method as an example to illustrate how performance metric functions quantify the alignment results into a batch maturity score, phase ID score, and total alignment score. However, it is noted that embodiments are not limited to the below examples and in other implementations, the performance metrics used to evaluate the alignment quality can be similar in theory, but employ different forms from what are demonstrated below. Details are as follows:

Batch Maturity Score

The batch maturity score for a batch measures both the completion percentage for a current alignment by comparing the current raw batch against a reference batch and the smoothness of raw batch maturity progress against a reference batch. The batch maturity score $Q_{batch\ maturity}$ for a batch is defined below:

$$Q_{batchmaturity} = \\ 100 - \log_e\left(e^{\frac{100-EndBatchMaturity}{2}} + \left(\sum_{i=0}^{batchend} e^{|Metric_i|} - \text{length (metrics)}\right)\right) \quad (6)$$

$$\text{Metric}_i = \begin{cases} BM_i^{diff} & (BM_i^{diff} < 0) \\ 0 & (0 \le BM_i^{diff} < 10) \\ BM_i^{diff} - 10 & (BM_i^{diff} \ge 10) \end{cases} \quad (7)$$

$$BM_i^{diff} = \begin{cases} 0 & (i = 0) \\ BM_i - BM_{i-1} & (i > 0) \end{cases} \quad (8)$$

The batch maturity score runs from $-\infty$ to 100. The natural log term contains two parts: an exponential part with respect to the batch maturity at alignment finish e100–End Batch Maturity/2, and a batch maturity difference term normalized by the number of iterations $\Sigma_{i=0}^{batch\ end} e^{|Metric_i|}$–length(metrics). End Batch Maturity is a number between 0 and 100 that indicates the percentage of alignment against a reference batch. For example, an end batch maturity value of 95 means that the alignment finishes with the raw trajectory aligned to 95% of a reference batch. The exponential form penalizes heavily against immature alignment. Metric$_i$ is defined in equation (7), whereas $BM_i^{diff}$ represents the 1$^{st}$ order difference at iteration i for batch maturity. The difference term penalizes heavily on both sharp changes and the number of changes for batch maturity during alignment progress.

Phase ID Score

The phase ID score for a batch measures errors on batch phase ID prediction and is defined as the following:

$$Q_{phaseid} = (1.0 - \sqrt{\text{AverageMisalignedRatio}}) * 100.0 \quad (9)$$

$$\text{MisalignedRatioperiteration} = \frac{\sum_{i=1}^{i=batchlength} \left|PhaseID_i^{aligned} - PhaseID_i^{raw}\right|}{batchlength} \quad (10)$$

$$PhaseID_i^{aligned} = \begin{cases} \max(j-1, 0), & i < StartIndex_j^{raw} \\ j, & i \ge StartIndex_j^{raw} \end{cases} (0 \le i < batchlength) \quad (11)$$

The phase ID score function (11) defines the phase identity of an aligned data point using the corresponding raw data. In equation (10), the count of misaligned phase IDs are normalized using batch length and this results in a misalignment score for one iteration in an alignment process. Equation (9) takes into account misalignment scores for all iterations and results in a single number scaled to be between 0 and 100. In most cases where phase IDs are correctly identified, this score is expected to be close to 100.

Total Quality Score

According to an embodiment, the total alignment quality metric $Q_{total}$ is composed of $Q_{batch\ maturity}$ and $Q_{phase\ id}$ to capture batch maturity smoothness and phase ID misclassification information, respectively. The total quality metric evaluation score would be 100 (perfect) only if both the corresponding batch maturity score and phase ID score were perfect. In cases where one of $Q_{batch\ maturity}$ and $Q_{phase\ id}$ are low, even if the other score has a high value, the resulting total score would still be a low value, indicating the existence of significant differences between a raw batch and a reference batch. The total alignment quality evaluation function of a batch is defined as follows:

$$Q_{total} = 100.0 * \left(1.0 - \log\left(\frac{e^{1.0-0.01*Q_{batchmaturity}} + e^{1.0-0.01*Q_{phaseId}}}{2}\right)\right) \quad (12)$$

$Q_{total}$ ranges from $-\infty$ to 100, with 100 being perfect alignment, whereas a value below 0 indicates that a raw batch cannot align with a reference batch effectively. $Q_{batch\ maturity}$ denotes the quality metric for batch maturity, and $Q_{phase\ id}$ represents the quality metric for phase ID accuracy as the alignment progress. The two sub-metrics are upper bounded by 100 as well. Both terms are raised to the power of natural log, such that a significant deviation from 100 of either $Q_{batch\ maturity}$ or $Q_{phase\ id}$ results in a low total quality score. This design resembles the softmax function often used in deep neural networks, which is a function proven to be effective in various deep learning applications. For the batch alignment functionality described herein, this approach results in an effective separation between successful and failed alignments.

For a dataset containing multiple batches, each batch would produce three of the above mentioned score values and a record on the time it takes to complete the alignment. The expected value of each score can be calculated as the average of the score value across all batches in the dataset. Then, the expected value performance metrics represent how the alignment behaves for this dataset. The total time it takes to align all batches in the dataset provides insight on hardware requirements and allows users to assess the tradeoff between resources needed and accuracy produced.

Alignment Acceptance Criteria

Quantified performance metrics enable comparisons among alignment results produced with different alignment conditions without human intervention and make automation possible. The example described herein utilizes the enhanced online dynamic alignment method, e.g., the basic method (the online dynamic alignment method) described in U.S. patent application Ser. No. 15/967,099, together with purpose-built performance metrics as an example to illustrate how the alignment acceptance criteria can be set up in the alignment environment based on the performance metrics chosen, e.g. the batch maturity score, the phase ID score, and the total alignment score. In embodiments, the time it takes to run the alignment process can be considered as well.

For this example, the default acceptance criteria include: 1) $Q_{total}$>=minimal threshold and 2) the total time it takes to finish the alignment<the max allowed time. Both acceptance criteria can be customized when configuring alignment settings, e.g., at step 102 of the method 100. Different batch datasets may have different thresholds for these acceptance criteria. A dataset without clear alignment guidance likely has a lower threshold on the total score than another dataset with some alignment guidance. However, embodiments can use the active learning framework to get an idea of appropriate alignment settings before running end-to-end alignment for each batch. The time it takes to perform batch alignment on an entire dataset can vary between a few seconds to hours, depending on the number of sampling points, the number of variables, and the number of batches within the dataset. For example, in DS08, 3 out of 10 process variables already provide reasonable alignment guidance, the total quality score criterion can be set up as $Q_{total}>=75$. An experiment run would give novice users some idea of how long an alignment will take. In this example, it takes about a minute or two to run through an alignment experiment with DS08 using default settings of alignment hyperparameters for the enhanced online dynamic alignment method on a 64-bit Windows 10 PC with Intel® Xeon® CPU E3-1245 v5 @3.5 GHz and 32 G RAM. Thus, a user may set 10 minutes as the maximum allowed alignment time for such an example.

Further, users with domain knowledge and process insights can modify the default acceptance thresholds based on batch maturity scores and phase ID scores with or without the total quality score as a criterion. For example, for a given batch process, where the phase ID score is far more important than the batch maturity score, users can modify the total alignment score definition to favor the phase ID score over the batch maturity score. However, such an embodiment can still use the total quality score as the major acceptance criterion for the alignment process and adjust the acceptance threshold accordingly. Moreover, users can set up the different acceptance criteria on each term, such as: (1) $Q_{toatl}>=60$; (2) $Q_{batch\ maturity}>=50$; (3) $Q_{phase\ id}>=90$; and (4) Time taken<10 minutes, amongst other examples.

It is noted that in other embodiments, the acceptance criteria used to check against the performance metrics can be different from those examples described herein. When another alignment method is used, corresponding performance metrics can be used to evaluate the alignment results and these alignment results can be compared with the appropriate acceptance criteria. For an embodiment without an alignment environment concept, i.e., without saved alignment settings and configurations, the acceptance settings can be applied directly in the corresponding workflows.

Build a Seed Supervised Machine Learning Model

As described above, embodiments can construct, e.g., at step 103 of the method 100, and employ, e.g., at step 104 of the method 100, a seed model. In an embodiment, a supervised machine learning model is constructed as the seed model. The seed model provides insights on the impact of different settings for alignment hyperparameters on alignment quality of a given alignment method. In other words, the seed model indicates how alignment quality is affected by hyperparameter settings.

Figure 13:
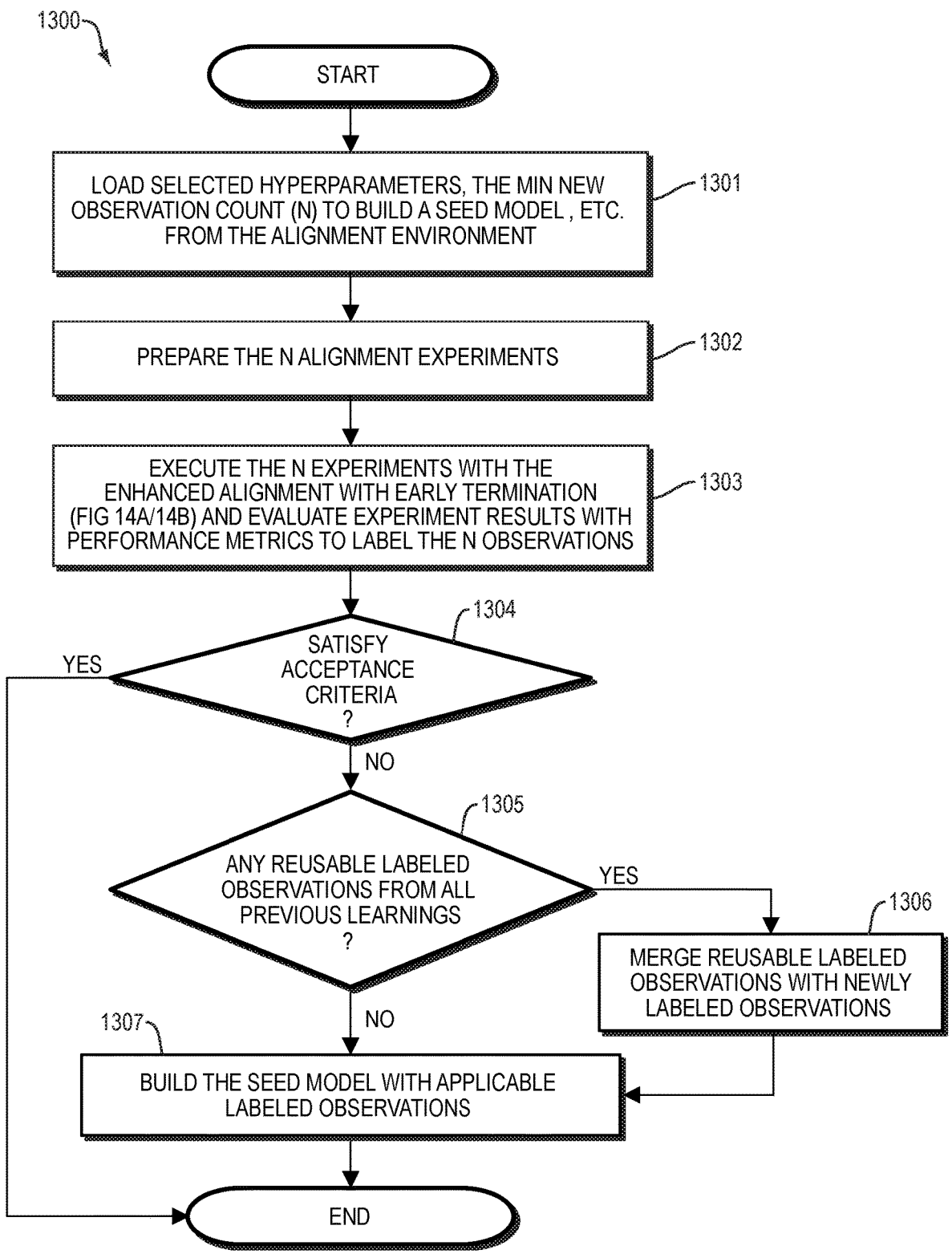
FIG. 13 is a flowchart of a method for building a seed model according to an embodiment.

FIG. 13 is a flowchart of a process 1300 for building a seed model according to an embodiment. The seed model building process 1300 starts at step 1301 with loading configuration information for an alignment. This data may be loaded at step 1301 from any computer memory communicatively coupled to a computing device implementing the process 1300. For example, this data may be loaded from an alignment environment, i.e., a collection of data representing alignment configurations and settings stored in memory. The data loaded at step 1301 may include: a selected alignment method, the alignment method's hyperparameters, settings for the hyperparameter, an indication of a number of new labeled observations required to build the seed model, an indication of a supervised machine learning algorithm to use to build the seed model, performance metrics, and acceptance criteria, amongst other examples.

For the example implementation using the DS08 dataset described herein, the data loaded at step 1301 includes: (1) the enhanced online dynamic alignment method as the alignment method, (2) the full list of hyperparameters for the enhanced online dynamic alignment method (e.g., time smoothness, sliding window size, difference penalty, search interval, built-in time series generator functions for alignment-guidance pseudo variable), (3) 100 as the maximum number of alignment experiments to be executed to prepare 100 labeled observations, (4) the PLS algorithm to build the supervised machine learning seed model, (5) the default performance metrics definitions for the enhanced online dynamic alignment, and (6) the default acceptance criteria, as $Q_{total}>=75$ and the total time it takes to perform the alignment as <10 minutes.

Next, the alignment conditions for the maximum N alignment experiments are prepared at step 1302. There are several different ways to prepare the N experiments at step 1302. One approach is to use a low-discrepancy sequence (LDS) approach, such as a Sobol sequence or other similar methods. This functionality may include the methods described at https://en.wikipedia.org/wiki/Low-discrepancy_sequence. Further, the set of experiments can be determined using a design of experiments (DOE) approach such as a D-optimal design or other similar methods described at https://en.wikipedia.org/wiki/Optimal_design. Compared with brute force approaches, using a LDS or DOE approach can produce better uniformity for higher dimensions without more experiments. In an embodiment, at step 1302, the alignment conditions prepared for these N experiments at step 1302 are listed as X variables in an alignment metadata datasheet, which is used to build the seed model. An example datasheet 1500 is depicted in FIG. 15 where the alignment hyperparameters (i.e., alignment conditions) are time smoothness, sliding window size, difference penalty, search interval, and different time series generator functions for the alignment-guidance pseudo variable, which are also referred to as X variables for supervised machine learning modeling purposes.

At step 1303, the process 1300 executes alignment experiments sequentially or in parallel, depending on available computing resources for a given implementation. In an embodiment, the experiments are run sequentially at step 1303 by implementing the method 1400*a* described hereinbelow in relation to FIG. 14A. In another embodiment, the experiments are run in parallel by implementing the method 1400*b* described hereinbelow in relation to FIG. 14B.

At the end of each alignment experiment, the alignment results from the experiment are evaluated with the performance metrics and the metrics are added to the alignment metadata datasheet as Y variables for that alignment condition. An example datasheet 1500 is depicted in FIG. 15 where the performance metrics evaluated (i.e., alignment quality indicators) from the alignment experiment results are batch maturity score, phase ID score, total quality score, and time to perform the alignment, which are also referred to as Y variables for supervised machine learning modeling purposes. This process is also referred to as labeling the observation in the datasheet corresponding to the alignment experiment. Running an alignment or labeling an observation is a computationally expensive operation and, as such, in an embodiment, early termination is included in the datasheet preparation workflow. In such an embodiment, if the performance metrics for any alignment experiment (observation) satisfy the acceptance criteria, the whole alignment process will terminate and its alignment results, and its performance metrics will be made available outside the alignment process. FIG. 15 shows an example alignment metadata datasheet 1500 with observations labeled using the enhanced online dynamic alignment method for DS08.

Returning to FIG. 13, the process 1300 continues at step 1304 and checks whether any observation in the metadata datasheet satisfies the acceptance criteria. If an observation satisfies the acceptance criteria, then the process 1300 terminates, and the alignment results and the alignment's performance metrics are made available outside the alignment process, e.g., to a computing process or device other than the computing process implementing the alignment. If it is determined at step 1304 that no observation satisfies the acceptance criteria, then the method 1300 proceeds to step 1305.

The method 1300 checks at step 1305 whether there are any reusable observations, which have been previously labeled in any earlier learnings before step 1303. If there are no reusable observations, then the method 1300 moves to step 1307. If there are reusable observations, then the method 1300 proceeds to step 1306. At step 1306 the newly labeled N observations from step 1303 are merged with those reusable observations that were previously labeled to form the alignment metadata datasheet, e.g., the sheet 1500 depicted in FIG. 15. After the merging at step 1306, the method 1300 advances to step 1307.

At step 1307, the process 1300 automatically builds the seed supervised machine learning model using the algorithm selected in the alignment environment (such as PLS) and the automatically prepared alignment metadata datasheet, e.g., the datasheet 1500 depicted in FIG. 15. In some cases, the seed model building process can be automatic, or interactive to take advantage of a user's domain knowledge and input. Regardless of either automated or interactive, the basic steps involved for the seed model building include: 1) load the alignment metadata datasheet available at step 1307 if they are not loaded already; 2) divide the alignment metadata datasheet into the training dataset and the validation dataset; 3) preprocess the training metadata, such as centering, scaling, categorical handling for alignment-guidance pseudo variables if the alignment-guidance pseudo variables enhancement is enabled, eliminating outliers, etc.; 4) build the seed model with the training dataset with the supervised machine learning algorithm selected; and 5) validate the seed model with the validation dataset to evaluate the model prediction quality.

Embodiments of the method 1300 can be implemented in a wide variety of different ways. For instance, different alignment methods can be used to run the alignment experiments at step 1303 and different settings can be used for the alignment hyperparameters. Further, different performance metrics can be used to evaluate the alignment results for labeling observations which match the alignment experiment conditions in the alignment metadata datasheet. Embodiments may also vary the acceptance criteria that are used and embodiments of the method 1300 can be executed with or without an early termination option, e.g., stopping execution of executing the experiments at step 1303 if the results of an experiment satisfy acceptance criteria. Moreover, different supervised machine learning methods can be implemented to build the seed model automatically at step 1307. In certain circumstances, a brute force approach could also be used to randomly or uniformly generate alignment conditions for the alignment experiments performed at step 1303 and embodiments can execute the experiments at step 1303 with the selected alignment method.

Figure 14A:
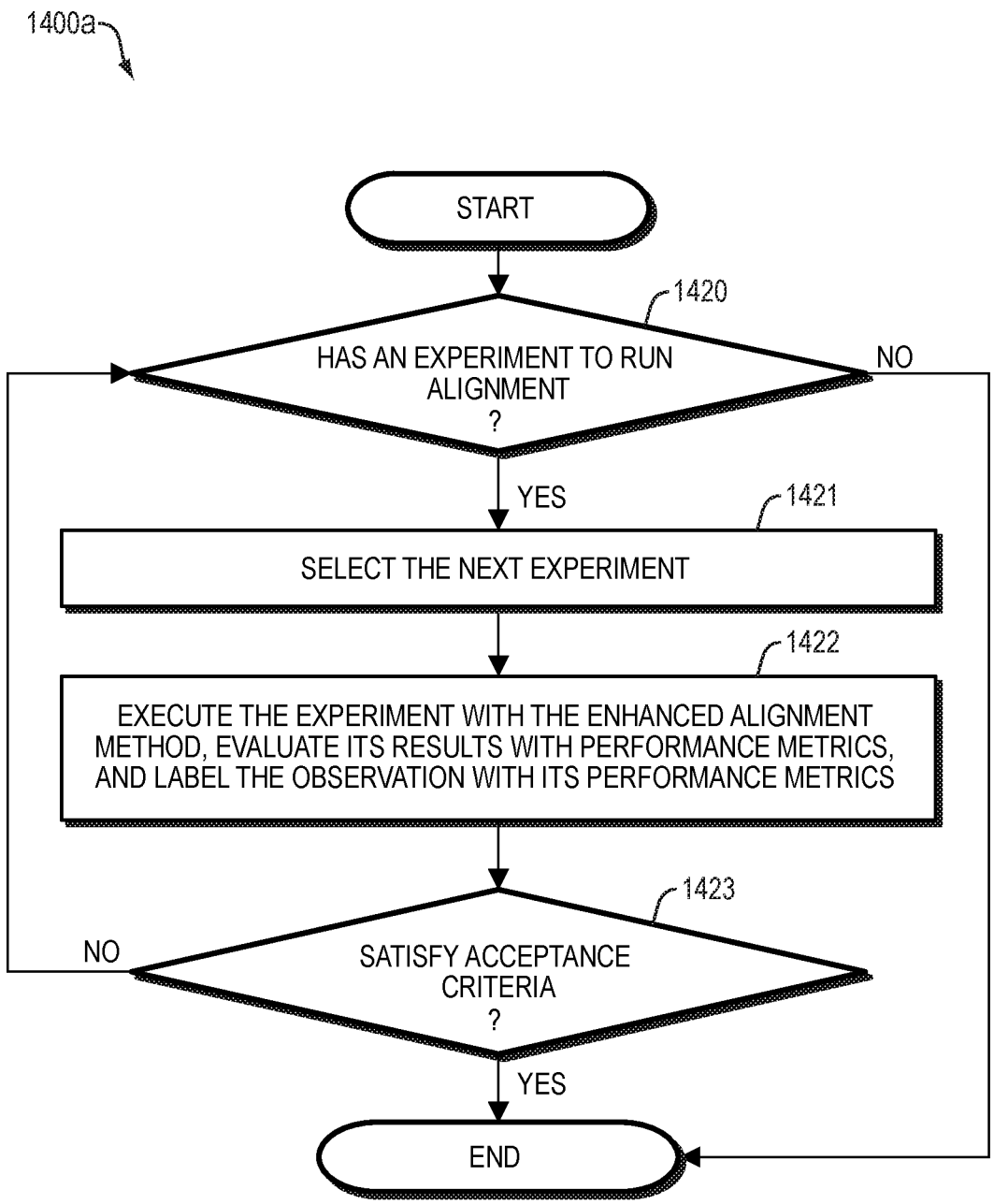
FIGS. 14A-B are flowcharts of processes for performing experiments as part of the method of building a seed model depicted in FIG. 13.

As described above, at step 1303 of the method 1300, experiments are executed sequentially or in parallel. FIG. 14A is a flowchart of a method 1400a that can be implemented at step 1303 to execute the experiments sequentially. The method 1400a may be used where, for example, the available computing resources are limited and the alignment experiments are executed one at a time in order to conserve resources.

The process 1400a begins at step 1420 by checking if there is an alignment experiment to run. If there is no experiment to run, the alignment metadata datasheet preparation is done and the method 1400a ends. If there is an alignment experiment to run, the process 1400a proceeds to step 1421. At step 1421 the process 1400a selects the next alignment experiment and moves to step 1422. The process 1400a, at step 1422, (1) executes the selected experiment with the enhanced online dynamic alignment method, (2) evaluates the alignment results with the performance metrics, and (3) labels the observation in the metadata datasheet with the performance metric values matching that executed experiment. In turn, at step 1423, the process 1400a checks if the alignment results for the experiment satisfy the acceptance criteria. If the alignment results do not satisfy the acceptance criteria, the method 1400a returns to step 1420. If the results satisfy the acceptance criteria, the alignment process will terminate and the alignment results, and the alignment's performance metrics are stored and made available outside the alignment process.

Figure 14B:
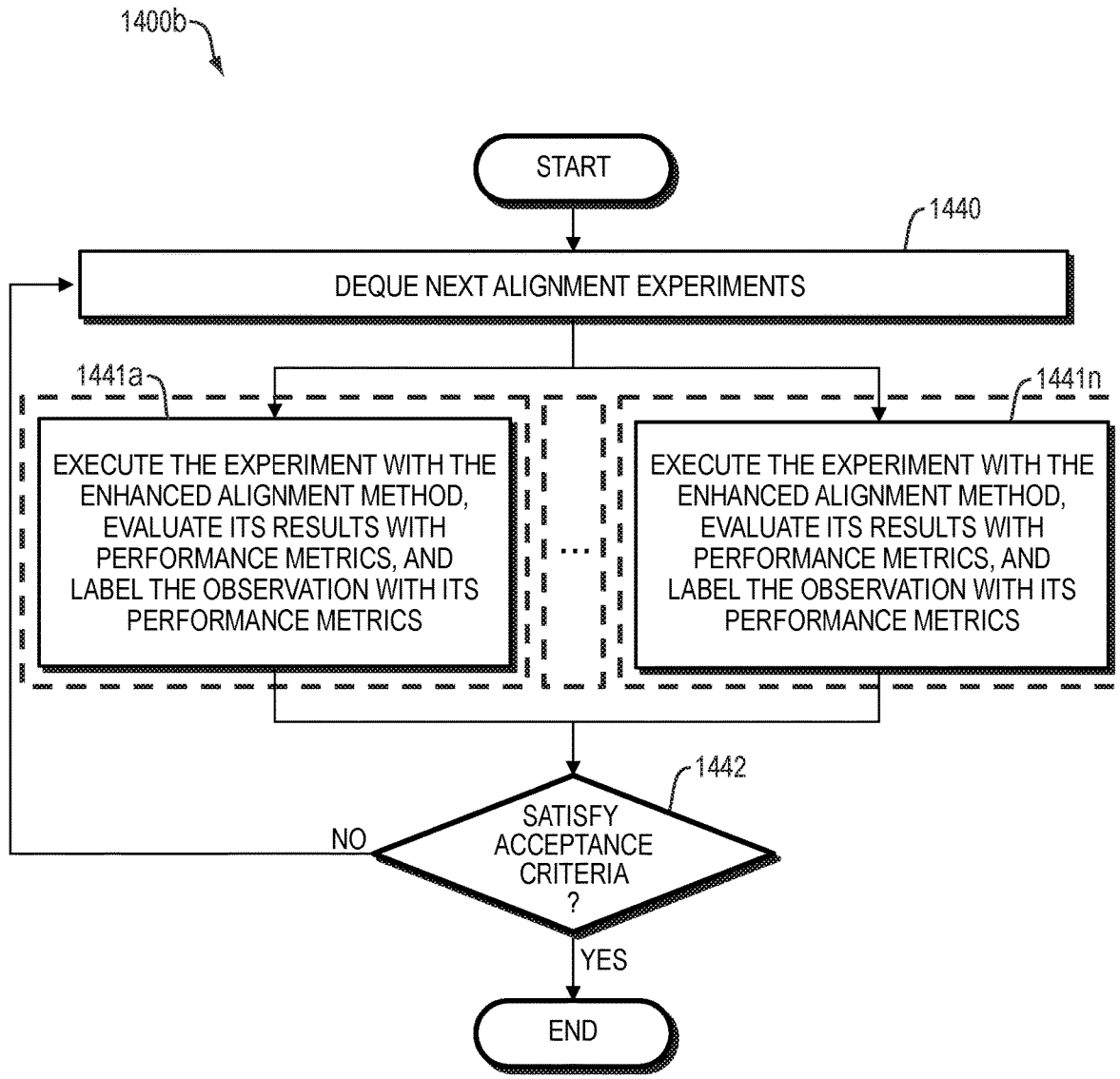

Alternatively to executing experiments sequentially as in the method 1400a, at step 1303 of the method 1300, the experiments can be executed in parallel. FIG. 14B is a flowchart of a method 1400b that can be implemented at step 1303 to execute the experiments in parallel. In the method 1400b the alignments experiments are run, and the observations are labeled in parallel. The method 1400b may be selected when there are sufficient available computing resources. Then, to increase the speed of performing the experiments, the experiments are executed independently in parallel.

The method 1400b employs a queue of alignment experiments that are ready to run. For each individual alignment subsystem, i.e., individual execution of an experiment, an experiment is dequeued at step 1440 and pushed into the subsystem performing the experiment. In embodiments of the method 1400b the subsystems operate independently from each other.

At step 1441a an alignment subsystem (1) executes the selected experiment with the enhanced online dynamic alignment method, (2) evaluates the alignment results with the performance metrics, and (3) labels the observation in the metadata datasheet with the performance metric values. The individual subsystem then proceeds to step 1442. While the step 1441a is being implemented, one or more other subsystems, e.g., other computational instances, may, in parallel perform the same functionality, e.g., step 1441n with a different alignment experiment that is removed from the queue at step 1440.

The method 1400b at step 1442 checks if the performance metrics of any newly executed alignment experiments satisfy the acceptance criteria. If not, the system proceeds to step 1440. If any experiments satisfy the criteria, the alignment process terminates and the alignment results and performance metrics from the experiment that satisfy the criteria are stored.

Supervised Machine Learning Model-Based Processes

As described herein, embodiments may utilize one or more learning processes. For instance, such processes may be implemented at step 104 of FIG. 1 or step 410 of FIG. 4, amongst other examples. FIG. 16A is a flowchart of a learning process 16 that may be implemented in embodiments. For example, the process 16 may be implemented at step 104 of FIG. 1 or step 410 of FIG. 4.

Figure 16A:
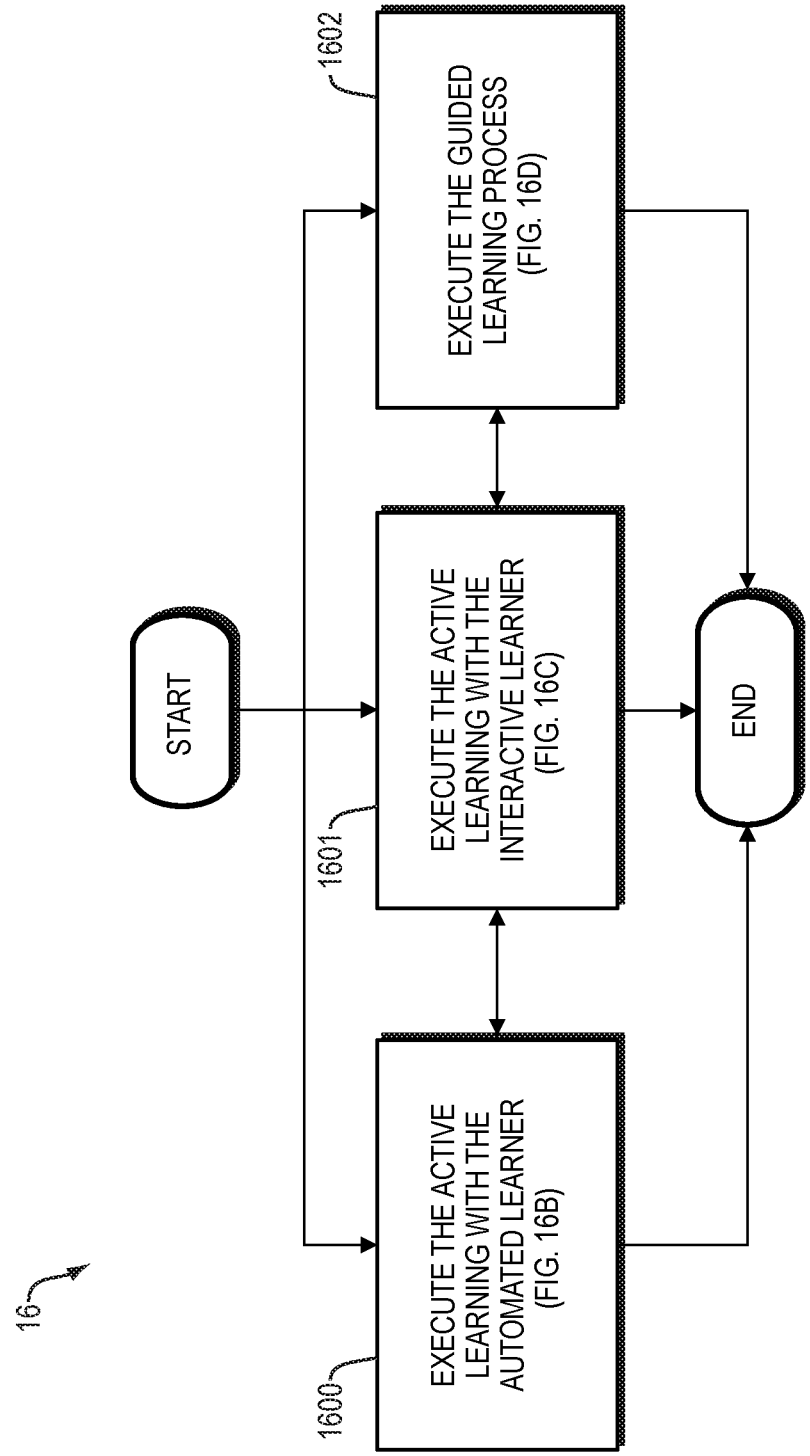
FIGS. 16A-D are flowcharts illustrating learning methods that may be employed in embodiments to determine alignment settings.

The method 16 in FIG. 16A, utilizes a supervised machine learning model in an automated learning workflow 1600, interactive active learning workflow 1601, and/or guided learning workflow 1602 to recommend an alignment condition with acceptable alignment quality within the given constraints. The workflows 1600-1602 can be executed in parallel. Further, a user can select (by command, menu option, etc.) which workflow to follow (1600-1602), in which sequence to perform the workflows (1600-1602), and whether to repeat or skip some workflows (1600-1602) after implementing one or more of the workflows (1600-1602).

Further details of the workflows 1600, 1601, and 1602 are described below. The description below of FIG. 16B under the heading "Automated Active Learning Workflow to Recommend an Alignment Condition" provides further details of the automated active learning workflow 1600. The description below of FIG. 16C under the heading "Interactive Active Learning Workflow to Recommend an Alignment Condition" provides further details of the interactive active learning workflow 1601. The description below of FIG. 16D under the heading "Guided Learning Process to Recommend an Alignment Condition" provides further details of the guided learning workflow 1602.

Automated Active Learning Workflow to Recommend an Alignment Condition

Figure 16B:
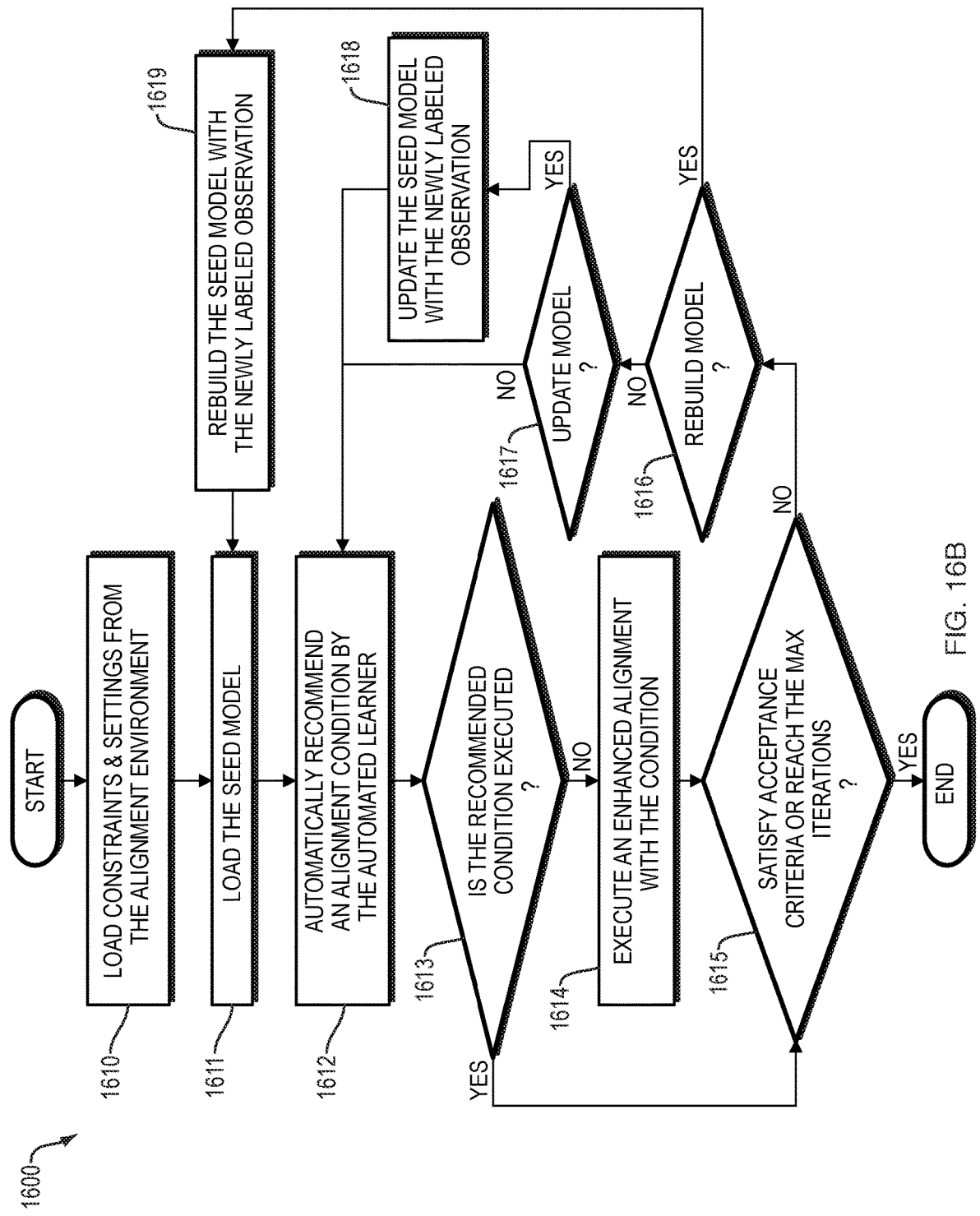

FIG. 16B illustrates an example implementation of the active learning workflow 1600 with the automated learner. In the example depicted in FIG. 16B the seed model is built with the PLS algorithm. Further, the AspenTech ProMV® Optimizer is used as the core of the automated learner to identify the next most informative observation (alignment experimental condition) that maximizes the predicted total alignment quality score while resulting in an alignment that can be performed under the maximum allowed time to perform the alignment. Moreover, in the method 1600, the enhanced online dynamic alignment method is used to run the alignment experiment with the condition, and the alignment results are evaluated with the performance metrics to confirm whether the acceptance criteria are satisfied. In an embodiment, this functionality is performed if the recommended alignment experiment condition has never been executed, but purely predicted by the seed model with the model optimizer to satisfy the optimization target(s), such as maximizing the predicted total alignment quality score while resulting in an alignment that can be performed under the maximum allowed time to perform the alignment.

At step 1610, constraints and settings are loaded. In an embodiment, these settings and constraints are loaded from an alignment environment. The loaded settings and options that are loaded are the settings and options needed to run the enhanced online dynamic alignment, the performance metrics, and the acceptance criteria. The process 1600 may also load the settings and options specifically for the automated active learning workflow. For example, if the AspenTech ProMV® PLS optimizer is configured as the core of the automated learner, constraints for this learning are loaded at step 1610. Example constraints loaded at step 1610 include (1) optimization targets, such as maximize the predicted total quality score, ensure alignment time taken is shorter than the maximum allowed alignment time, etc.; (2) soft bounds and hard bounds for alignment hyperparameters and performance metrics, such as the difference penalty must be between 0 and 1, the search interval is preferred to be between 1 and 1.03, the batch maturity score $Q_{batch\ maturity}>=60$, etc., and (3) maximum iterations the automated learner will learn until an acceptable alignment condition is found, amongst other examples.

The process 1600, at step 1611, loads the seed supervised machine learning model. According to an embodiment, the model loaded at step 1611 is automatically built based on the alignment metadata datasheet for a given batch dataset. In this example, the seed model is built with the PLS algorithm. In other example embodiments, the seed model can be built with another supervised machine learning method, such as Neural Network, amongst other examples. Moreover, the model loaded at step 1611 can be built based on any number, e.g., hundreds, of executed alignment experiments (labeled observations).

With the seed supervised machine learning model loaded at step 1611 and the configured constraints for the automated learner's core optimizer loaded at step 1610, the process 1600 at step 1612 may set up the model optimizer on the seed model with the loaded soft and hard constraints and then run the optimizer to approach the optimization target(s) the user specified. Example optimization targets include maximizing the predicted total quality score and keeping the total time to complete alignment to be less than 10 minutes, amongst other examples. In an embodiment, hard constraints are enforced during optimization, while the soft constraints may not always be satisfied. In the end, the alignment experiment condition optimized by the model optimizer is recommended, i.e. available for step 1613. In this example, the seed model is built with the 100 labeled observations for DS08, and the AspenTech ProMV® PLS optimizer is configured as the core optimizer for the automated learner. The automated learner is configured with the following constraints: (1) maximize the predicted total quality score, (2) time smoothness>=1, (3) difference penalty bounds between 0 and 1, (4) window size>=1, (5) search interval is preferred between 1 and 1.03, and (6) maximum allowed alignment time<10 minutes. In such an example implementation, at step 1612, the automated learner makes an alignment condition recommendation of time smoothness=2, window size=28, difference penalty=1, search interval=1.026, and "steps" pseudo variable to be enabled. For such an example, the predicted total alignment score is 79 and the predicted time to perform the alignment is 143 seconds.

Next, at step 1613 the system checks whether such an alignment experiment with the recommended condition was ever executed before. If an alignment experiment with the recommended conditions was previously performed, then there is no need to execute the alignment experiment again under the same conditions, and the process 1600 proceeds directly to step 1615. Otherwise, the process 1600 advances to step 1614.

To continue, at step 1614, the alignment experiment with the recommended condition is executed. The alignment's results are also evaluated at step 1614 by calculating the performance metrics. In turn, the performance metrics are used to label the observation corresponding to the alignment conditions used to perform the alignment at step 1614. In this example, the system executes the alignment using the enhanced online dynamic alignment method at step 1614.

The process 1600 checks at step 1615 whether the performance metrics either evaluated using the alignment results determined using the alignment conditions to perform the alignment at step 1614 or existing in the metadata datasheet used to build the seed model, satisfy the acceptance criteria. If the acceptance criteria are satisfied, then the alignment process is ready to end. If the alignment result does not satisfy the criteria and the maximum automated learning iteration count has not yet been reached, then the observation labeled at step 1614 is used to update or rebuild the supervised machine learning model, if applicable, by implementing steps 1616 to 1619. After step 1619, the process returns to step 1611 where the model will be loaded and, after which, the process 1600 will advance to step 1612 where the automated learner will continue making recommendations on the alignment conditions until either the acceptance criteria are met or the maximum automated learning iteration count is reached. When the automated active learning workflow stops at step 1615 in either case (satisfying the criteria or stopping because the maximum number of iterations has been carried out), the best-so-far or criteria-met alignment condition with the corresponding alignment results and performance metrics are available to downstream workflows. In an embodiment, before the process 1600 stops after step 1615, the automated active learning will repeatedly iterate automatically to improve alignment quality determined by the optimization target(s) and no additional user interference is expected. Only when the process 1600 stops, the batch trajectory dataset aligned with the best-so-far or criteria-met alignment condition is available to the user.

The model update or rebuild process of the method 1600 starts at step 1616. Rebuilding a model as described herein refers to building a machine learning model from scratch again for a given underlying batch dataset using alignment metadata, where a previous model's information or characteristics play no role in the new model. In contrast, updating a model as described herein refers to incrementally adjusting an existing machine learning model to accommodate the new labeled observation. Depending on updating complexity of an algorithm and time taken to rebuild or update a model, the supervised machine learning algorithm a user selects to build the seed model for learning may offer the "build" or "rebuild" option without supporting the "update" option. To illustrate, for a simple supervised machine learning algorithm, such as PLS, building a model just takes a couple of seconds on most computers. Implementation to support an "update" option may not be so computationally cheap. As such, it may make sense to simplify an implementation to only support the "build" or "rebuild" option, rather than the update option. For a more complicated supervised machine learning algorithm, such as Neural Network, building a model for the same alignment metadata would take more time. Therefore, if implementing the "update" option is too costly and the time it takes to rebuild such a model is acceptable, a system may be implemented without the "update" option, i.e. only support the "build" or "rebuild" option. If implementing the "update" option is straightforward and cheap and the time it takes to update a model is significantly smaller than that to rebuild a model, then it would be ideal that such an implementation employs the "update" option. However, such an implementation would still allow for the "build" or "rebuild" option because the rebuild option may be necessary when the variation carried by a new observation is too significant from others. When the variations introduced by the new observation are too significant (e.g., bigger than a preset condition, such as 3 standard deviation) from the dataset without it, rebuilding such a supervised machine learning model from scratch may become necessary regardless of whether or not such an embodiment implements the "update" option. For a system implementation which supports the "update" option for supervised machine learning, a user may choose to always apply "rebuild" when a newly labeled observation becomes available when configuring alignment settings.

At step 1616, the process 1600 checks if the seed supervised machine learning model should be rebuilt. In this example, the PLS algorithm is selected to build the seed model when setting up the alignment environment, i.e., settings, and the default implementation does not support the "update" option. Thus, whenever there is a newly labeled observation, a new PLS model is rebuilt. If the model should be rebuilt, then the process 1600 advances to step 1619. If the model should not be rebuilt, then the process 1600 moves to step 1617.

In an example embodiment, the steps for rebuilding the seed model are similar to those to initially build the seed model. For example, in an embodiment rebuilding the model includes: (1) loading the updated alignment metadata available at step 1619 if they are not loaded already; (2) dividing the loaded alignment metadata into a training dataset and a validation dataset; (3) preprocessing the training metadata, such as centering, scaling, categorical handling for alignment-guidance pseudo variables if the alignment-guidance pseudo variables enhancement is enabled, eliminating outliers, etc.; (4) building the seed model with the training dataset with the selected supervised machine learning algorithm, such as PLS, Neural Network, etc.; and (5) validating the seed model with the validation dataset to evaluate the model prediction quality, which are preprocessed with the same settings as those to the training dataset.

At step 1617, the process 1600 checks if the seed supervised machine learning model should be updated. In this example implementation, because the PLS algorithm is used to build the seed model, and the example system does not support the "update" option for PLS, the model is rebuilt, when a newly labeled observation becomes available. In other example implementations of the method 1600, if the underlying system implements the "update" option and the variation introduced by the newly labelled observation is not too significant (smaller than a preset condition, such as 3 standard deviations from the dataset without it), then the seed model may be updated to accommodate the new data. If the model should be updated, then the process 1600 advances to step 1618. If the model should not be updated, then the process 1600 moves to step 1612 and the automated learner will make another recommendation on the next most informative alignment condition.

The process 1600, at step 1618, updates the seed supervised machine learning model with the newly labeled observation and then proceeds to step 1612. However, if it was determined at step 1616 that the model should be rebuilt, then the method 1600 automatically rebuilds the seed supervised machine learning model at step 1619 with the newly labeled observation and then proceeds to step 1611 to load the new model into the automated active learning workflow 1600.

For the example implementation described herein where PLS is chosen to build the seed model from the alignment metadata datasheet for a given batch dataset, when there is a newly labeled observation, the seed model will be rebuilt. In an embodiment, rebuilding the model at step 1619 includes: (1) loading the updated alignment metadata datasheet available at step 1619 if they are not loaded already; (2) dividing the loaded metadata datasheet into the training dataset and the validation dataset; (3) preprocessing the training dataset, such as centering, scaling, categorical handling for alignment-guidance pseudo variables if the alignment-guidance pseudo variables enhancement is enabled, eliminating outliers, etc.; (4) building the seed model with the training dataset with PLS algorithm; and (5) validating the seed model with the validation dataset to evaluate the model prediction quality, which are preprocessed with the same settings as those to the training dataset. In another example embodiment, where a Neural Network is chosen to build the seed model from the alignment metadata datasheet for a given batch dataset and the corresponding "update" option is implemented, when a newly labeled observation does not carry too significant of a variation from past observations (smaller than a preset condition, such as 3 standard deviation from the dataset without it), the seed model can be updated by running another "fit." Running another fit will adjust weights and coefficients to accommodate the new data, instead of rebuilding or retraining the model from scratch with all historical observations and the new observation.

Interactive Active Learning Workflow to Recommend an Alignment Condition

Figure 16C:
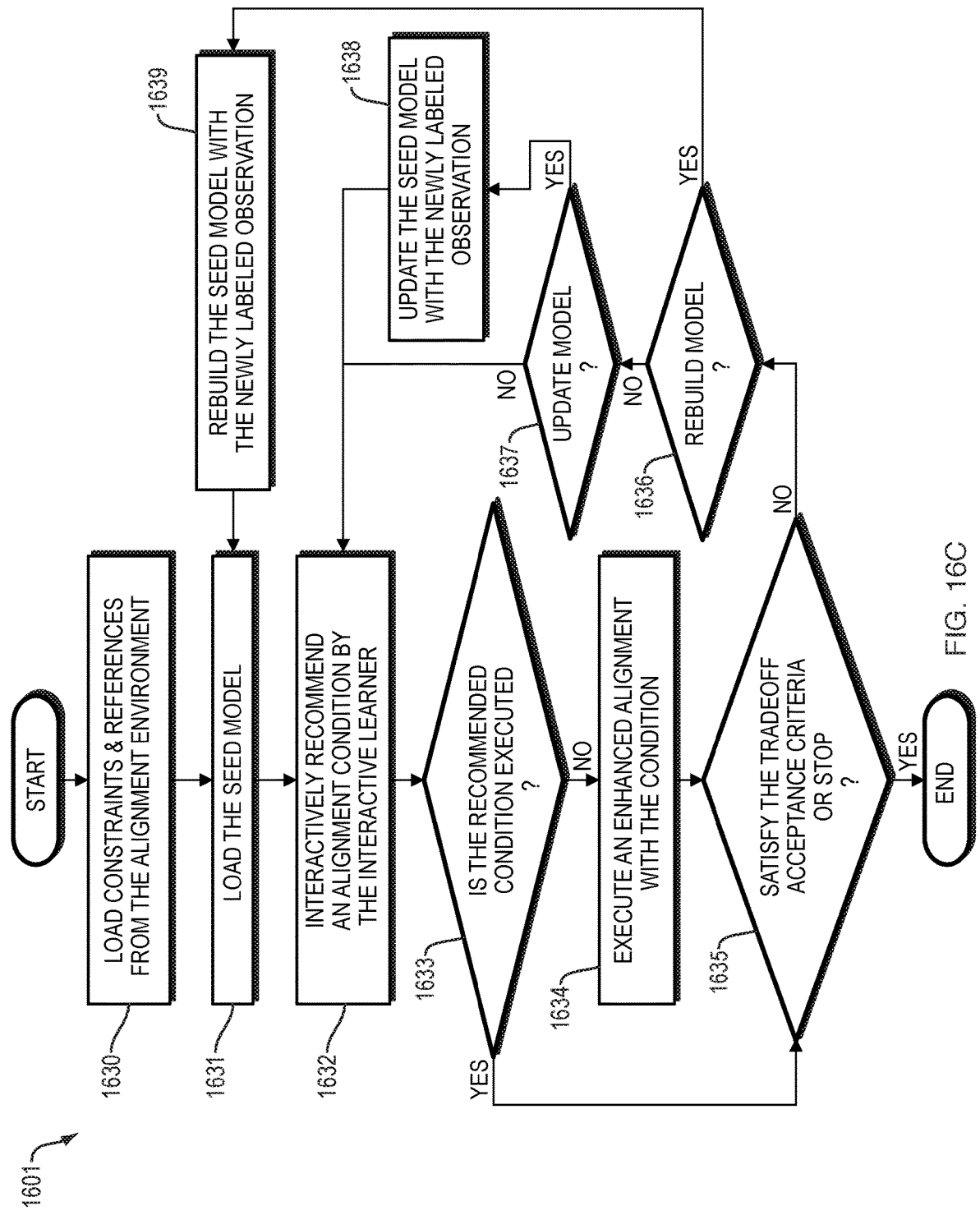

FIG. 16C illustrates an example implementation of an active learning workflow 1601 with an interactive learner. For the example implementation of the method 1601 described herein, the seed model is built with the PLS algorithm. The AspenTech ProMV® Optimizer is used as the core of the interactive learner and this interactive learner identifies the next most informative observation (alignment experiment conditions) that maximizes the predicted alignment total quality score while providing conditions for an alignment that can be performed within the maximum alignment time allowed. In contrast to the automated active learning performed in the method 1600 of FIG. 16B, the user is the center of the interactive active learning process 1601 and responsible for determining when/f to execute an alignment experiment to confirm the alignment quality under the alignment conditions suggested by the optimizer. In an embodiment, via a graphical user interface (GUI), a user can directly adjust the optimizer settings, i.e. optimization targets, to move the optimization in a desired direction and repeatedly perform as many optimizations as the user wants before approving an alignment experiment to be executed. After a user approves the suggested alignment experiment conditions from the optimizer, (assuming an alignment with those conditions was not previously performed) the enhanced online dynamic alignment method is used to run the alignment experiment with the suggested conditions. The alignment results are then evaluated with the performance metrics to confirm if the acceptance criteria are satisfied. In an embodiment of the method 1601, the interactive learner utilizes a graphical user interface (GUI) to display the best-so-far alignment condition, the alignment results, and the performance metrics from any previous executed alignment experiments. The GUI can also display the trajectory aligned under an alignment condition with its original trajectory side by side to allow visual inspection of the alignment quality for a given batch dataset.

The process 1601 begins at step 1630 with loading constraints and settings for the alignment. The data loaded may include settings and options needed to run the enhanced online dynamic alignment. Performance metrics, acceptance criteria, and settings and options specifically for the interactive active learning workflow may also be loaded at step 1630. To illustrate, if the AspenTech ProMV® PLS optimizer is configured as the core of the interactive learner, example constraints that are loaded into the interactive active learning workflow 1601 at step 1630 include: (1) default optimization targets, (2) optimization options (e.g., maximize the predicted total quality score, bound of the maximum allowed time to complete an alignment), (2) optimization targets, which can be set up on individual metrics, such as the batch maturity score $Q_{batch\ maturity}$, amongst other options, (3) soft bounds and hard bounds for the alignment hyperparameters and the performance metrics, such as the difference penalty must be between 0 and 1, the search interval is preferred to be between 1 and 1.03, the batch maturity score $Q_{batch\ maturity} >= 60$, etc., and where the hard bounds will be enforced and the soft bounds will be met as much as possible.

At step 1631 the process 1601 loads the seed supervised machine learning model. According an embodiment, the model loaded at step 1632 is automatically built based on the alignment metadata datasheet for a given batch dataset. In this example embodiment described herein, the seed model loaded at step 1631 is built with a PLS algorithm. It is noted that in other embodiments, the seed model can be built with any other supervised machine learning method known in the art.

With the seed supervised machine learning model loaded at step 1631 and the configured constraints for the interactive learner's core optimizer loaded at step 1630, the process 1601 interactively recommends an alignment condition at step 1632. In an embodiment of the method 1601, at step 1632 a user is presented with a graphical user interface (GUI), where the user can directly adjust the optimizer settings, i.e. optimization targets, to move the optimization in a desired direction and repeatedly run as many optimizations as the user wants before approving an alignment experiment to be executed. When an alignment experiment condition suggested by the optimizer at step 1632 is approved by a user for execution, the interactive recommendation step 1632 completes and the user approved alignment condition is the recommendation used in future steps of the process 1601. In embodiments, the optimization targets can include maximizing the predicted performance metrics or part of the metrics and keeping the time it takes for alignment to be less than a given maximum allowed time, amongst other options. In the example embodiment described herein, the seed model is built with the 100 labeled observations for DS08 and the AspenTech ProMV® PLS optimizer is configured as the core of the interactive learner. Moreover, the interactive learner is configured with the following constraints: (1) maximize predicted total quality score, (2) time smoothness>=1, (3) difference penalty bounds between 0 and 1, (4) window size>=1, (5) search interval is preferred between 1 and 1.03, (6) maximum allowed alignment time<10 minutes.

To continue, the process 1601, at step 1633, checks whether an alignment experiment was ever conducted using the conditions recommended at step 1633. If the alignment was executed before, then there is no need to execute the alignment experiment under the same conditions again and the process advances directly to step 1635. If the alignment was not previously executed with the recommended alignment conditions the process 1601 moves to step 1634.

The process 1601 executes the alignment experiment with the recommended conditions at step 1634. At step 1634, the alignment results may also be evaluated with performance metrics. In this example implementation described herein, the process 1601, at step 1634, executes the alignment with the enhanced online dynamic alignment method.

Next, at step 1635, the performance metrics evaluated based on the alignment results determined using the recommended alignment conditions at step 1634 are analyzed to determine if the results satisfy the acceptance criteria or if a user wishes to stop the interactive learning. If the results satisfy the acceptance criteria, or if a user wants to stop the interactive learning, the process 1601 ends. When the process 1601 ends, the recommended alignment conditions or the alignment conditions that have achieved the best results, the alignment results themselves, and the performance metrics are stored and made available to any downstream processes. If it is determined at step 1635 that the alignment results do not satisfy the acceptance criteria and a user does not want to end the process 1601, then the observation labeled at step 1634 is used to update or rebuild the seed model, if applicable, by implementing steps 1636 to 1639, and the interactive learner can continue making recommendations on the alignment conditions.

At step 1636, the process 1601 checks if the supervised machine learning model should be rebuilt. The principles used to determine if a model should be rebuilt or updated for the interactive active learning is the same as those for the automated active learning described hereinabove in relation to FIG. 16B. For example, updating complexity of a supervised machine learning algorithm, time it takes to rebuild or update such a model, and how much variation the newly labelled observation brings in can be considered when determining whether to update or rebuild the model. In this example, the PLS algorithm is selected to build the seed model when setting up the alignment environment and, as such, when there is new labeled observation, a new PLS model is rebuilt. If it is determined at step 1636 that the machine learning model should be rebuilt, then the process 1601 advances to step 1639. If the model should not be rebuilt, then the process 1601 moves to step 1637. The process 1601 checks at step 1637 if the supervised machine learning model should be updated. In another example, if a Neural Network is used to build the seed model and the variation introduced by the newly labelled observation is not too significant (smaller than a preset condition, such as 3 standard deviation from the dataset without it), then the seed model may be updated. Updating the model may include performing another run of "model fit", which adjusts the existing model's coefficients and weights to accommodate the new data. If the model should be updated, then the process 1601 proceeds to step 1638, if not, the method 1601 moves to step 1632.

To continue, at step 1638, the supervised machine learning model is updated with the newly labeled observation and then, the process 1601 proceeds to step 1632. If it was determined at step 1636 that the model should be rebuilt, then the process advances to step 1639 where the supervised machine learning model is automatically rebuilt with the newly labeled observation. After rebuilding the model at step 1639, the process advances to step 1631 where the newly rebuilt model is loaded and the process 1601 continues with the new model in the interactive active learning workflow 1601.

Guided Learning Process to Recommend an Alignment Condition

Figure 16D:
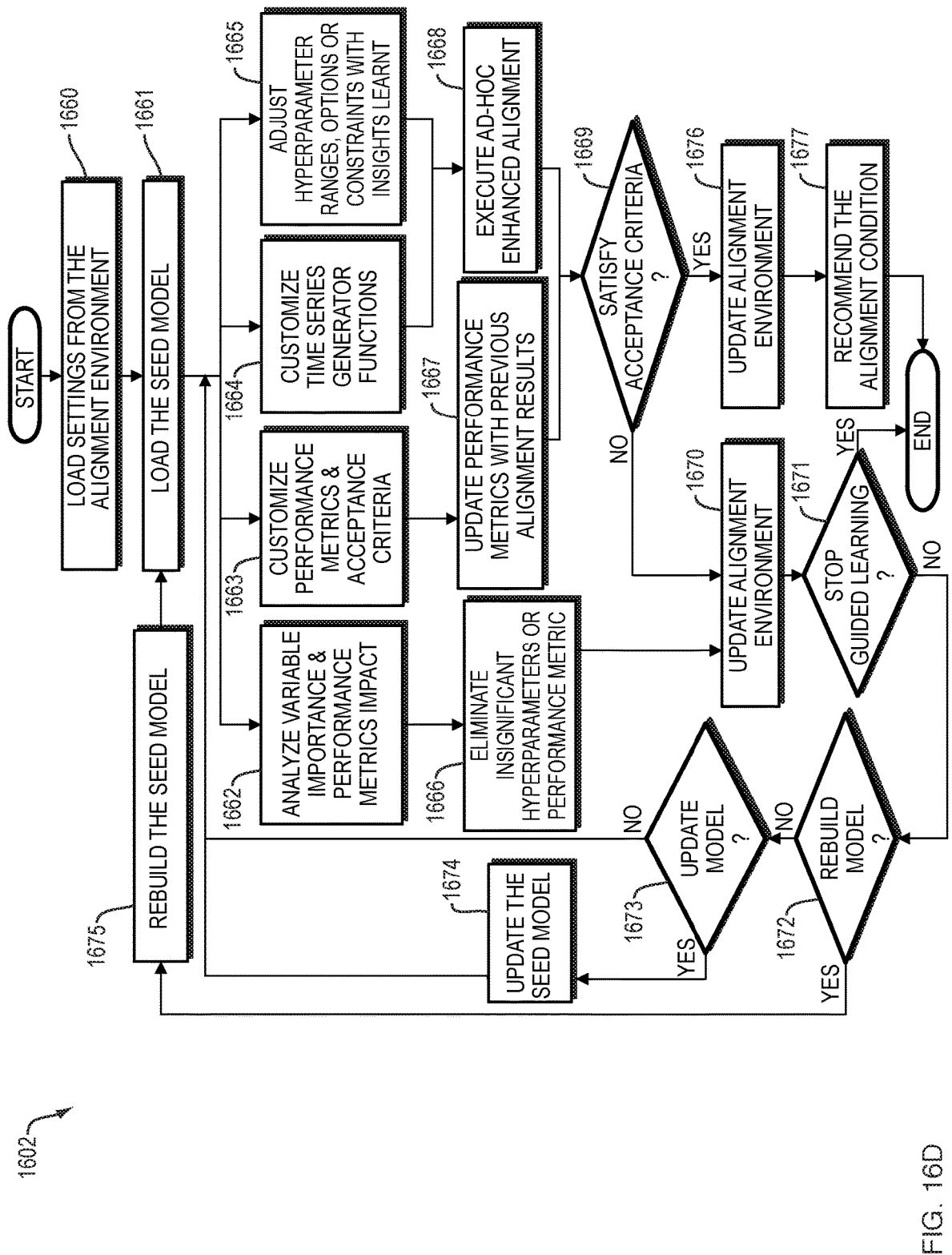

FIG. 16D depicts an example implementation of a guided learning process 1602 that may be implemented in embodiments. For the example embodiment depicted in FIG. 16D the seed model is built with the PLS algorithm on the alignment metadata datasheet for a given batch dataset. For the method 1602, a variety of different PLS-based model analyzers, explorers, and/or optimizers can be used to extract insights and repeatedly execute ad-hoc alignment experiments to determine the impact direction of variable adjustments or customizations on the alignment results. The guided learning process 1602 can access results from previously performed alignments, including the best alignment results available from any previously executed alignment experiments (labeled observations) for the batch dataset. The available results provide each observation, the alignment conditions, and the performance metrics. This allows a user make tradeoffs among metrics so as to select an alignment condition with practical alignment results. During the guided learning process 1602, a user can repeatedly traverse the different paths as many times as desired. Further details of the paths and functionalities that may be implemented in the method 1602 are described below.

The process 1602 starts at step 1660 with loading settings for the guided learning process. The data loaded at step 1660 may include any settings and options needed to implement the guided learning process 1602. The data loaded may include constraints and/or settings for model explorers, model analyzers and model optimizers, the settings and options needed to run the enhanced online dynamic alignment, the performance metrics, and the acceptance criteria, amongst other examples. Example constraints loaded at step 1660 include: (1) optimization targets, such as to maximize the predicted total quality score, ensure alignment time taken is shorter than a maximum allowed alignment time, etc.; (2) soft bounds and hard bounds for alignment hyperparameters and performance metrics, such as the difference penalty must be between 0 and 1, the search interval is preferred to be between 1 and 1.03, the batch maturity score $Q_{batch\ maturity} >= 60$, etc., and (3) maximum iterations the automated learner will learn until an acceptable alignment condition is found, amongst other examples.

To continue, at step 1661 the process 1602 loads the seed supervised machine learning model. In this example, the model is built with the PLS algorithm. After the model is loaded into the guided learning process 1602 at step 1661, a user can apply various PLS-based model analyzers, model explorers, and model optimizers to extract alignment process insights for the underlying batch dataset for a given alignment method. A few guided options 1662 to 1665, are included in the process 1602 (amongst other available examples) and a user can choose the next step 1662 to 1665 to implement.

Figure 17:
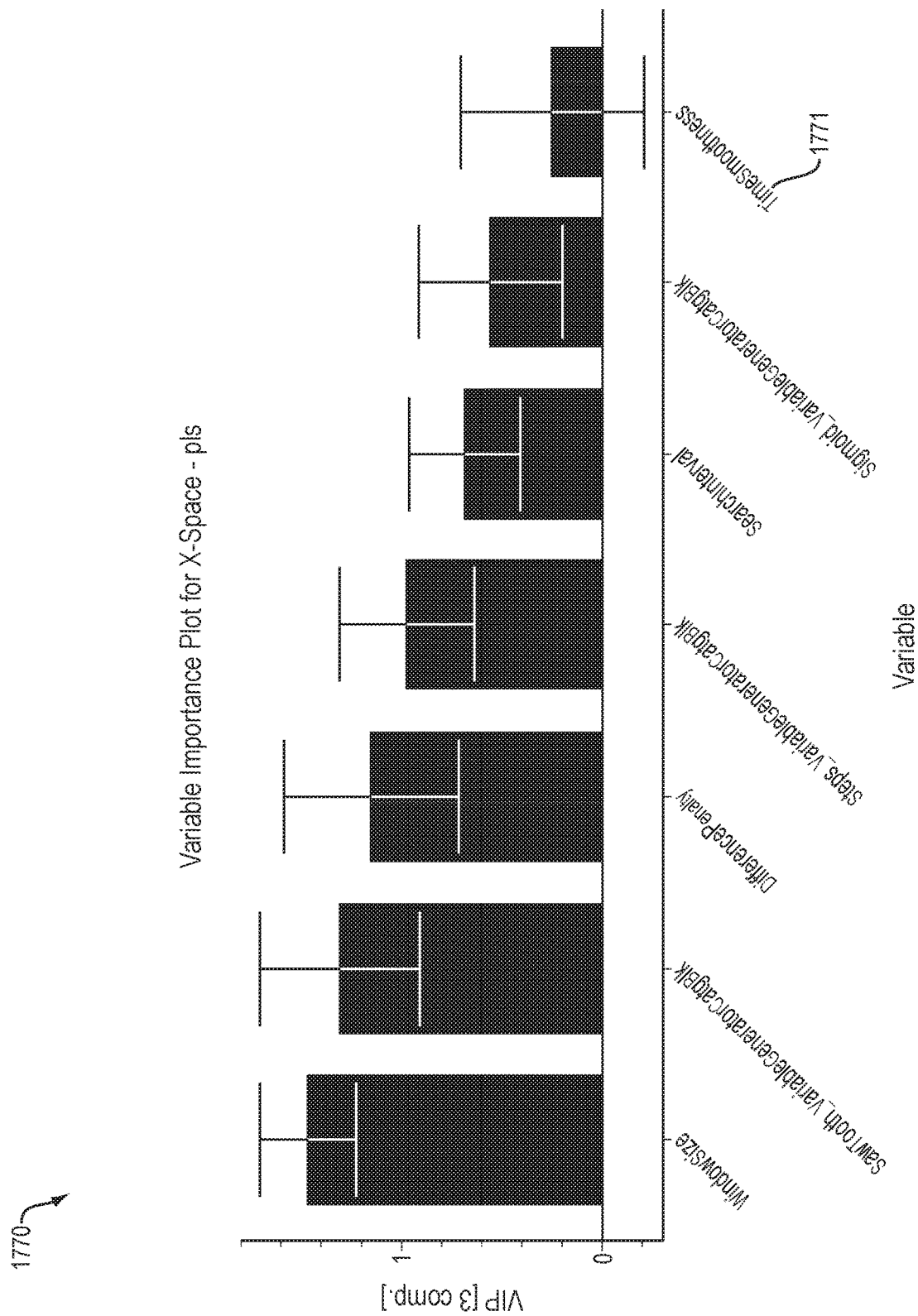
FIG. 17 is a plot depicting variable importance that may be used in embodiments.

If, for instance, a user proceeds to step 1662, the importance of variables, e.g., hyperparameters, to alignment quality and the impact of performance metrics to the seed model quality are evaluated. FIG. 17 shows an example plot 1770, where the PLS VIP (Variable Importance to the Projection) analysis is executed on the seed model built for DS08. In the plot 1770, for instance, the hyperparameter "time smoothness" 1771 seemingly has little impact on the alignment quality. Evaluating performance metrics determines how changes, e.g., including or excluding, to performance metrics impacts alignment results. To illustrate, in another example, after excluding the performance metrics, "batch maturity score" and "phase ID score" from the seed supervised machine learning model, the $Q^2$ value of the model for DS08 increased by 0.172. The $Q^2$ is a measure of how well the parameter will be predicted on future data (beyond the data used to train the model) and its value range is between 0 and 1. As such, in this example the improvement is significant.

Returning to FIG. 16D, after the analysis at step 1662, the process 1602 proceeds to step 1666. At step 1666, variations for the insignificant hyperparameters and performance metrics can be eliminated. In such an embodiment, the insignificant hyperparameters and performance metrics can be eliminated in response to user directions. If an insignificant hyperparameter is eliminated it is no longer utilized when preparing future alignment experiments. To illustrate, if the insignificant hyperparameter "time smoothness" is eliminated, time smoothness is set to have its default value and the value of time smoothness is not varied. This may reduce the total number of alignment experiments that would otherwise have to be prepared if all hyperparameters were varied. Users can also exclude unwanted performance metrics from the seed model to improve the model's prediction quality. For example, a user can indicate that "batch maturity score" and "phase ID score" be excluded from the model. It is noted that step 1666 is optional, and it is not required to eliminate insignificant hyperparameters and performance metrics.

To continue, after step 1666, the method 1602 proceeds to step 1670. At step 1670, the process 1602 updates the alignment environment, i.e., settings. These settings may include the included and excluded hyperparameter lists and the performance metrics list updated at step 1666, customizations to performance metrics and acceptance criteria made at step 1663, customizations to alignment guidance pseudo variable time series generation functions made at step 1664, and adjustments to hyperparameter ranges, options or constraints made at step 1665. At step 1670, the previous step is either step 1666 or step 1669 (with the acceptance criteria not being satisfied). After updating the alignment environment at step 1670, the process 1602 proceeds to step 1671.

At step 1671, the process 1602 checks if a user wants to stop the guided learning process. If yes, then the guided learning process ends. If the user does not want to end the process 1602, then the method continues to step 1672. At step 1672, the process 1602 checks whether the seed supervised machine learning model should be rebuilt. If the machine learning model should be rebuilt, then the method 1602 proceeds to step 1675. If the model should not be rebuilt, then the method 1602, moves to step 1673. The principles used to determine if a model should be rebuilt or updated for the guided learning (the method 1602) can be the same as those described hereinabove for the active learning (the method 1600 described in relation to FIG. 16B). For instance, conditions that may be considered when determining to update or rebuild a model include: updating complexity of an algorithm, time it takes to rebuild or update a model, and how much variation the newly labelled observation brings in. In this example, the PLS algorithm is selected to build the seed model when setting up the alignment environment and, thus, when there is a newly labeled observation, a new PLS model is rebuilt.

Step 1673 checks whether the seed supervised machine learning model should be updated. If model should be updated, then the method proceeds to step 1674. If the model does not need to be updated, then the user can choose one of the four actions, 1662, 1663, 1664, or 1665. If, at step 1673 it is determined that the model should be updated, at step 1674, the model is updated and, then, the process 1602 proceeds to step 1662, 1663, 1664, or 1665.

At step 1675, the process 1602 automatically rebuilds the supervised machine learning model and then proceeds to step 1661 to load the newly rebuilt model to continue the guided process 1602.

Returning to just after step 1661, where one of multiple options are selected, a user can choose the step 1663. At step 1663 a user can also adjust or customize the performance metrics and alignment acceptance criteria after exploring the seed model with various model analyzers. For example: in the default definition of the total quality score (12), the batch maturity score and the phase ID score are treated equally. However, if these factors should have different weights for a given batch process, a user can change the acceptance criteria at step 1663 to independently measure the batch maturity score and the phase ID score. Moreover, a user can modify the total quality score's definition to apply different coefficients to them, but still use "the total quality score" as an acceptance criterion. A user can also modify the default definition of each performance metric at step 1663 according to the user's domain expertise and process insights.

After customizing performance metrics and/or acceptance criteria at step 1663, the process 1602 moves to step 1667. If a user has modified any of the performance metrics definitions or acceptance criteria definitions at step 1663, it may be necessary to re-evaluate the previous alignment results for all executed alignment experiments for a given batch dataset according to the modified definitions. These results are still available and, thus, there is no need to rerun the alignment experiments under these conditions again. Instead, because evaluating the performance metrics is fast, the process 1602, at step 1667 re-evaluates all observations that were previously labeled and the observation with the best-so-far acceptance-based criteria, based on the re-evaluation, is identified. In turn, the process 1602 moves to step 1669.

At step 1669, the process 1602 checks if the observation (either with the best-so-far acceptance-based criteria from step 1667 or newly labeled by the ad hoc alignment at step 1668) satisfies the current acceptance criteria. If the acceptance criteria are not satisfied, the process 1602 moves to step 1670. If the acceptance criteria are satisfied, the process 1602 proceeds to step 1676. At both steps 1670 and 1676, the alignment environment, i.e., stored settings and conditions for performing the alignment are updated. If the method 1602 updates the alignment environment at step 1676 (after the acceptance criteria have been satisfied, the process 1602 proceeds to step 1677 where an alignment condition is recommended and, then, the process 1602 ends. In such a scenario, the alignment results and associated performance metrics are stored and, thus, available to any downstream processes.

Returning to just after step 1661, where one of multiple options are selected, a user can choose the step 1664. At step 1664 a user can customize the alignment-guidance pseudo variable generator function definitions or provide their own definitions for functions that produce monotonic time series based on the per phase relative index. After the customizations at step 1664 the process proceeds to step 1668.

At step 1668, the process 1602 runs an alignment experiment to either (1) confirm the impact on the alignment results of the modified generator functions and/or the newly user-provided generator functions or (2) confirm insights learned about the impact to the alignment results caused by adjustments to hyperparameter ranges, options, or constraints performed at step 1665 (described below). In an embodiment, the method used for this alignment is the same as that used to build the seed model at step 408 of the process 440. In addition to performing the alignment experiment at step 1668, the alignment results are evaluated by the performance metrics at step 1668. Then, the process 1602 proceeds to step 1669 to compare the results against the acceptance criteria.

Figure 18:
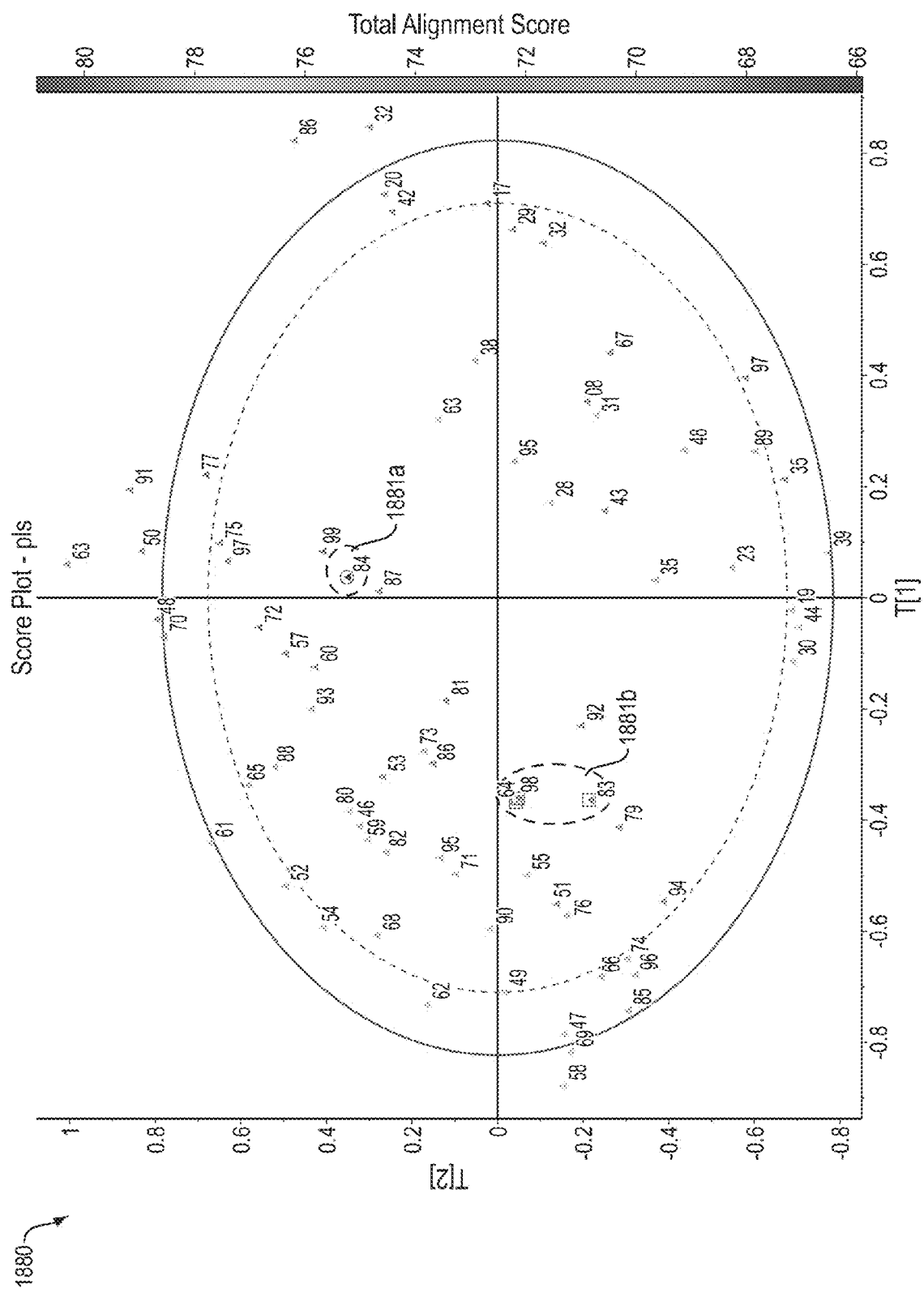
FIG. 18 illustrates example results from a model analyzer that may be employed in an embodiment.

Returning to just after step 1661, where one of multiple options are selected, a user can choose the step 1665. At step 1665 a user can adjust alignment hyperparameter ranges, options, or constraints with insights gained from various model analyzers. FIG. 18 shows an example plot 1880, generated by a model analyzer, that may be considered at step 1665. In the example plot 1880 a user applies the T[1] vs T[2] score plot analysis on the PLS seed model. In the plot 1880, each triangle represents a labeled observation (an executed alignment experiment) and the color represents the total quality score evaluated for the alignment results under that condition for DS08. In the plot 1880, two clusters 1881a and 1881b were selected to perform contribution analysis: (1) the cluster 1881a with less ideal performance, e.g. the observation 84 with the total quality score of about 66 and (2) the cluster 1881*b* with more ideal performance, e.g. the observations 64, 83, and 98 with the total quality score of about 80.

Figure 19:
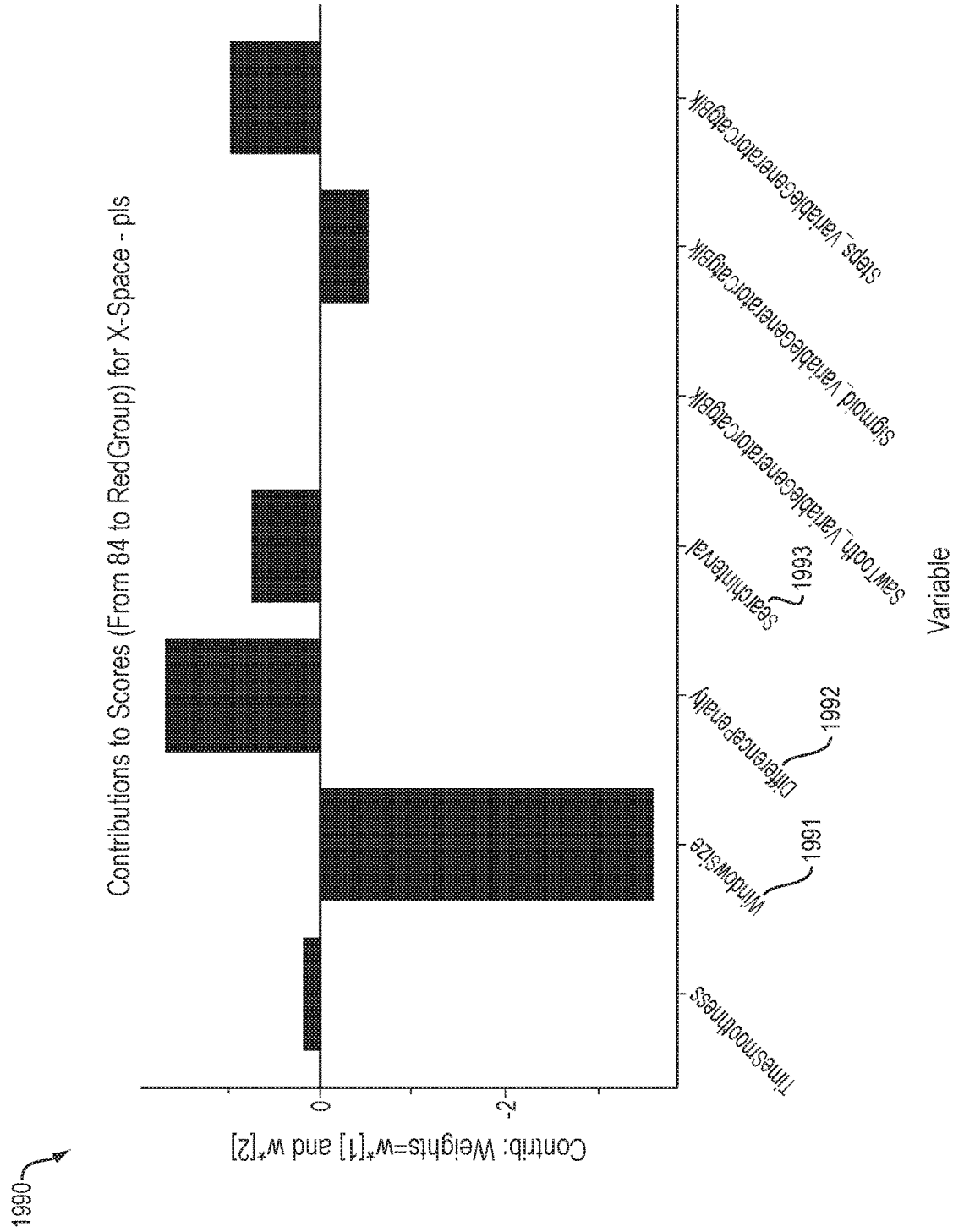
FIG. 19 is a plot depicting model analyzer results utilized in embodiments.

The plot 1990 in FIG. 19 illustrates the results of a contribution analysis that can also be considered at step 1665 of FIG. 16D. The plot 1990 reveals some insights, for instance, reducing window size 1991, increasing the difference penalty 1992, and increasing the search interval 1993, amongst other examples, could improve the total quality score.

Returning to FIG. 16D, at step 1665 the results of such analyses, e.g., the plots 1880 and 1990 can be used by users to adjust setting ranges for the hyperparameters and their options or constraints for future alignment experiments. After adjusting hyperparameter ranges, options, or constraints at step 1665, the process 1602 proceeds to step 1668.

Figure 20B:
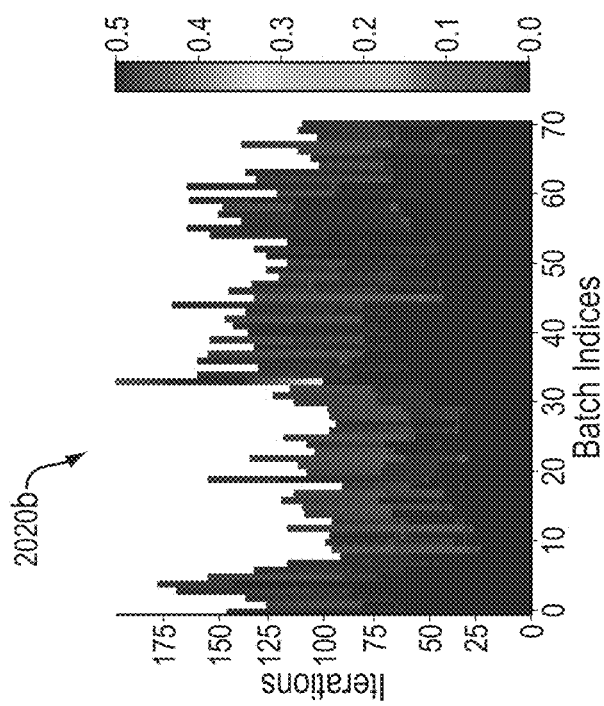
FIGS. 20A-B are graphs showing alignment quality indicators for alignments performed using default alignment settings in the existing online dynamic alignment method.
Figure 20A:
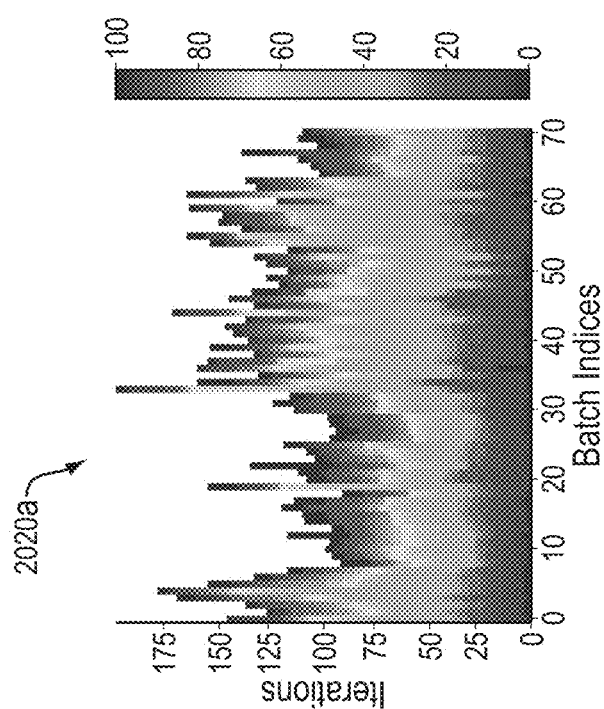

Example Alignment Quality Improvement for an Industrial Multi-Phase Batch Process The DS08 batch is a relatively simple batch and the default settings of the alignment hyperparameters for the online dynamic alignment method work reasonably well without the enhancements provided by embodiments of the present invention. FIG. 20A in the plot 2020*a* shows evolutions of batch maturities and FIG. 20B in the plot 2020*b* shows evolutions of misaligned phase ratios, as flame graphs for an DS08 alignment experiment executed with the default settings of the hyperparameters for the online dynamic alignment method. In FIGS. 20A-B, the x-axes give the batch indices from 0 to 70, the y-axes are the sampling point indices for a batch, and the color indicates the batch maturity percentage in FIG. 20A and the degree of the phase ID prediction mismatch ratios in FIG. 20B.

FIG. 20A shows the batch maturity percentage at each sampling point for each of these 71 batches. The plot 2020*a* shows a smooth graduation of color, which indicates the alignment processes for these batches progresses smoothly. FIG. 20B shows that the phase ID prediction mismatch ratios at each sampling point for each of these 71 batches. In the plot 2020*b* all batches except one show dark blue in most places, which indicates few phase ID prediction mismatches for most sampling points for these batches.

Figure 21:
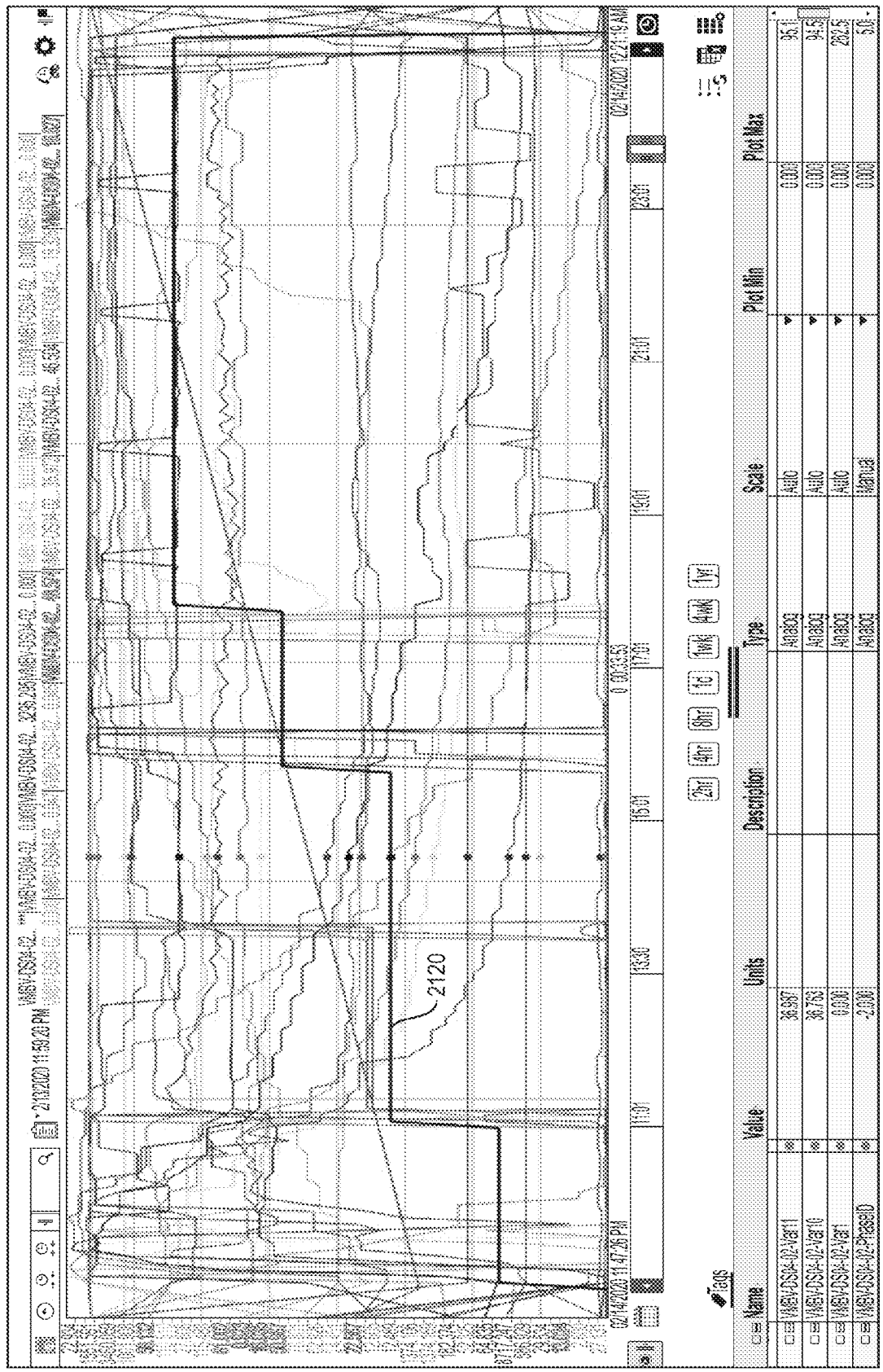
FIG. 21 is sample batch data that may be aligned utilizing embodiments.
Figures 22A, 22B:
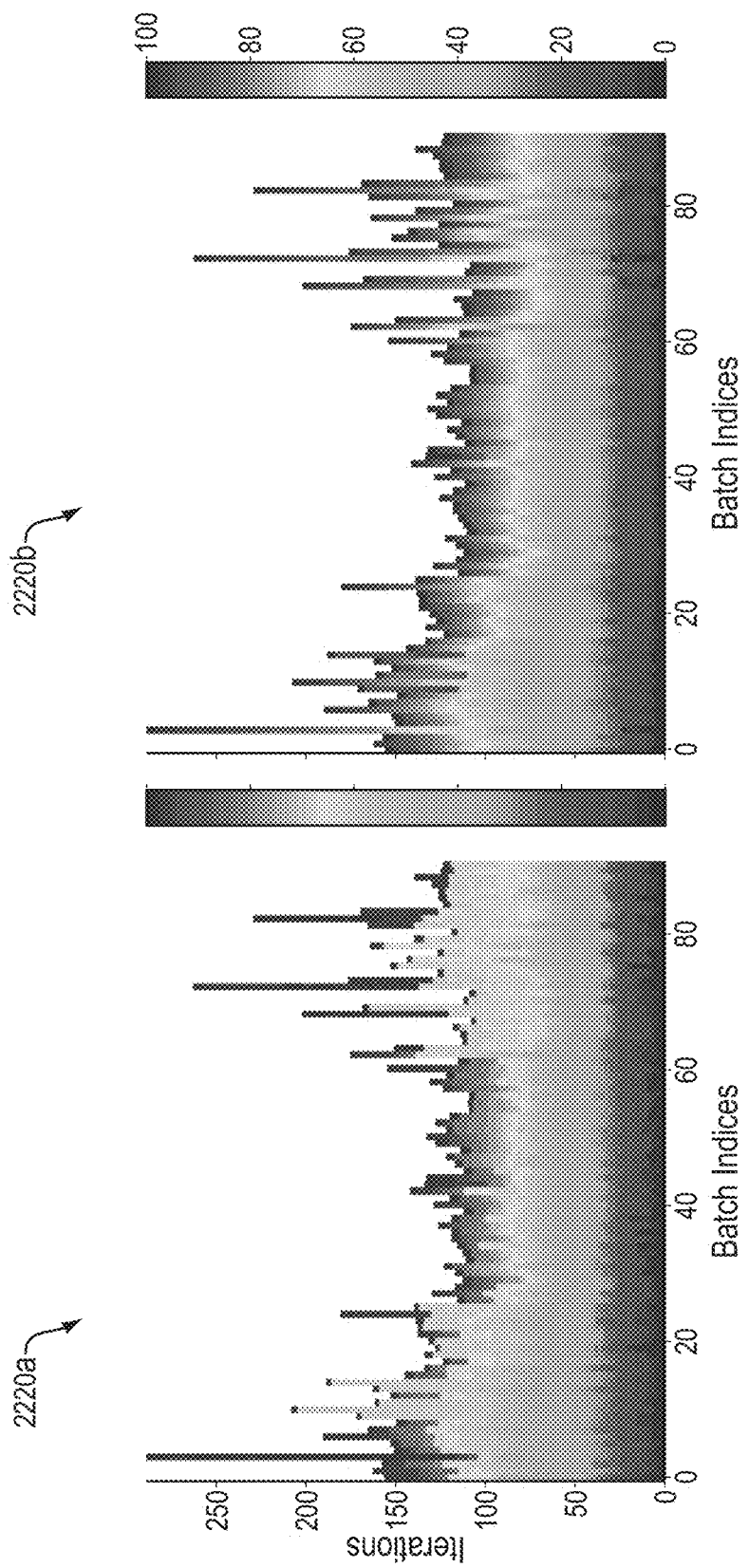
FIGS. 22A-B are graphs showing alignment quality indicators for alignments performed using default alignment settings and alignment settings developed using an embodiment of the present invention, respectively.
Figures 23A, 23B:
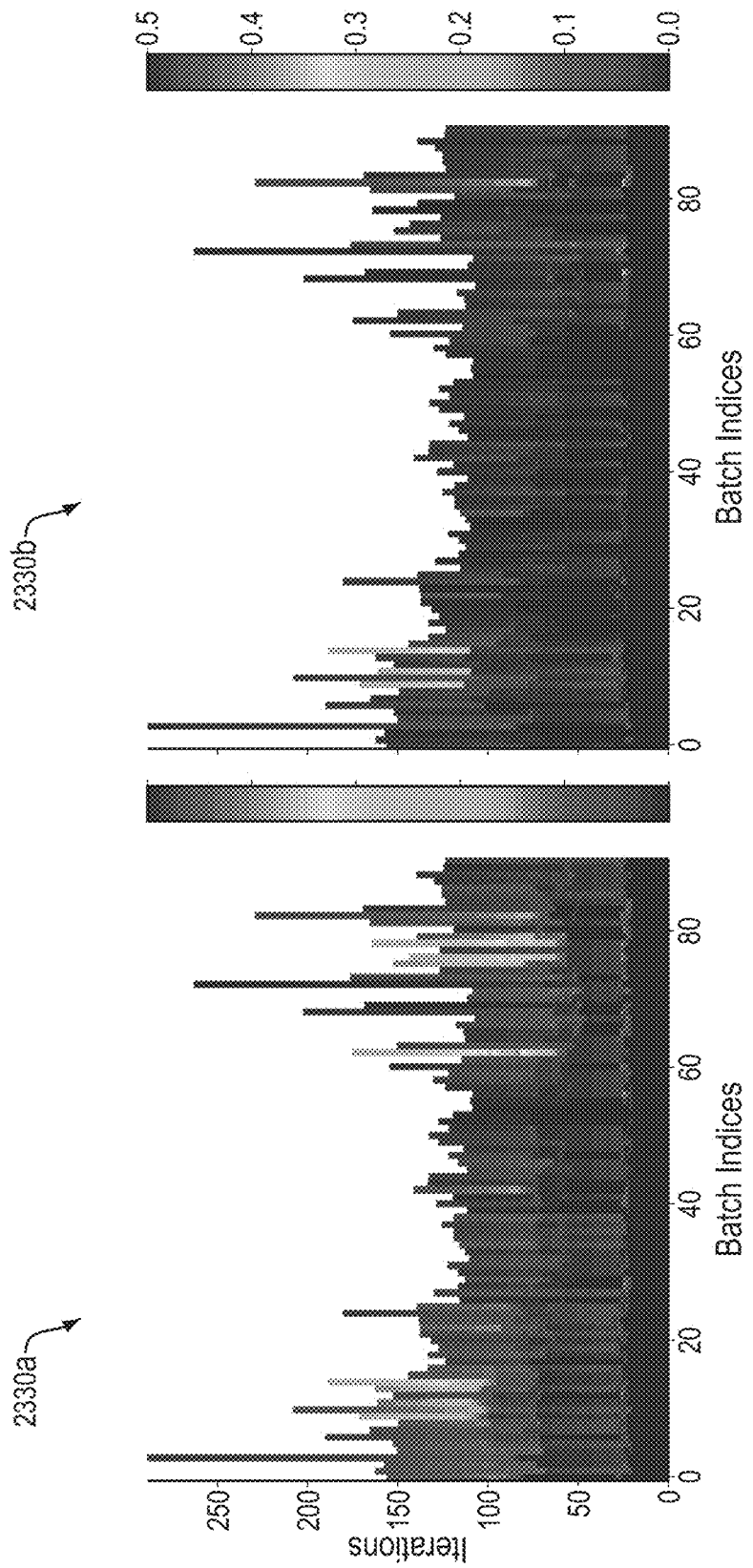
FIGS. 23A-B are graphs showing alignment quality indicators for alignments performed using default alignment settings and alignment settings developed using an embodiment of the present invention, respectively.

DS04, which includes 91 batches, is from another 4-phase industrial batch process and is more complicated than DS08. The plot 2100 in FIG. 21 shows a typical batch of DS04, where each batch has 54 trajectory variables, and its phase ID tag time series is the line 2120 in the trend and depicts the phases 1, 2, 3, and 4. Performing an alignment on the DS04 batch data with the default hyperparameter settings and the online dynamic alignment method suffers from issues observed in recent practice with other industrial applications. These errors include batch maturity prediction jumps and an unsmooth progression. The plot 2220*a* in FIG. 22A shows this issue with batch maturity progressions and the plot 2330*a* in FIG. 23A show errors in phase ID prediction that occur when performing alignment on the DS04 batch with default settings. However, the DS04 alignment results are significantly improved using embodiments of the present invention. Specifically, when the alignment is executed using the hyperparameter settings recommended by the active learning workflow and where a guided learning process as described herein is applied to the online dynamic alignment method and enhanced with the alignment-guidance pseudo variables. The plot 2220*b* in FIG. 22B and the plot 2330*b* in FIG. 23B shows these improvements to batch maturity and phase ID prediction, respectively.

FIGS. 22A-B illustrate the batch maturity percentage at each sampling point for each batch for the 91 batches of DS04. The x-axis gives the batch indices from 0 to 90, the y-axis is the sampling point indices for a batch, and the color indicates the batch maturity percentage. For batch maturities, the smoother the graduation of the hue, the better the alignment progresses. Sharp changes of color indicate dramatic changes in batch maturity and often result in a lower batch maturity score. FIG. 22A shows, in the plot 2220*a*, the batch maturity percentage at each sampling point for each batch of the 91 batches when using the online dynamic alignment method with the default values for the hyperparameters. Nearly half of these 91 batches show sharp changes of color. This means the alignment processes for these batches do not progress very smoothly. Also, the maturity percentage (color) for almost one-third of these 91 batches jumps from below 65 to almost 100, which means the alignment process for those batches have big jumps on their maturity predictions as the batch alignment is in progress. FIG. 22B, in the plot 2220*b*, shows the batch maturity percentage at each sampling point for each of these 91 batches when using embodiments, i.e., the alignment-guidance pseudo variable enhanced online dynamic alignment method with the hyperparameter settings determined using the functionality described herein. The majority of the 91 batches now show a smooth progression of color, which means the real-time alignment process for these batches is progressing smoothly.

FIGS. 23A-B demonstrate the phase ID prediction mismatch ratios at each sampling point for each of the 91 batches of DS04. The x-axis gives the batch indices from 0 to 90, the y-axis gives the sampling point indices for a batch, and the color indicates the degree of the phase ID prediction mismatch ratios. For phase mismatch ratios, dark blue indicates no errors observed, whereas warmer colors indicate errors existed during a batch evolution.

FIG. 23A, in the plot 2330*a*, shows the phase ID prediction mismatch ratios at each sampling point for each of the 91 batches when using the online dynamic alignment method with the default settings for the hyperparameters. There are 3 batches with warmer color bars shown near the middle of the batch and close to a blue color at the end, which means more severe phase ID prediction mismatch near the middle of the batch that then becomes less severe later in the batch. A few other batches show some degree of phase ID prediction mismatch indicated by the lighter blue color. FIG. 23B, in the plot 2330*b*, shows the phase ID prediction mismatch ratios at each sampling point for each of these 91 batches when using embodiments of the present invention. The batches from FIG. 23A with a warmer color earlier no longer suffer the phase ID prediction mismatch issue, shown by the fact that there are no longer warmer colors during the batch evolution. Overall, in FIG. 23B, all batches except three show dark blue in most places, which indicates few phase ID prediction mismatches for most sampling points for these batches.

Embodiments provide a comprehensive system to address several issues observed using the online dynamic batch alignment method in recent practice with industrial applications. Errors embodiments resolve include: errors for phase ID prediction, non-smooth progress for batch maturity estimation, batches never reaching 100% maturity, lack of robustness for industrial batch data with higher degrees of noise, and difficulty in selection of alignment hyperparameters and settings when the default hyperparameter settings do not work well. Embodiments described herein provide purpose-built performance metrics to quantify the alignment experiment results. Embodiments use the results of quantifying the alignment results to specify alignment acceptance criteria. This allows embodiments to employ supervised machine learning to explore the effect of alignment hyperparameter settings on these alignment performance metrics.

In embodiments, the alignment experiments to be executed for the alignment metadata datasheet (labeled observations) can be efficiently prepared with either a low-discrepancy sequence (LDS) approach, such as a Sobol sequence or other similar methods, or a design of experiments (DOE) approach such as a D-optimal design or other similar methods. In certain circumstances, a brute force approach can also be used to randomly or uniformly generate alignment conditions for the alignment experiments. By employing a seed supervised machine learning model that is automatically built based on the metadata datasheet for a given batch dataset, automated and interactive active learning workflows and guided learning processes can be used in embodiments to recommend an alignment experimental condition with acceptable alignment results for any given alignment method. Also, the alignment-guidance pseudo variable and the alignment-guidance-only variable can be included in the batch data to enhance any given alignment method by reducing alignment uncertainty and, thereby, improve alignment quality. Embodiments can also include an alignment environment library to make it easier to set up, customize, and change the current alignment environment and produce consistent alignment results.

Embodiments of the present invention enhance the functionality of U.S. patent application Ser. No. 15/967,099, entitled "Computer System and Method For Automated Batch Data Alignment In Batch Process Modeling, Monitoring And Control" with implicitly generated time series for alignment-guidance pseudo variable(s) and explicitly designated alignment-guidance-only process variables to remediate the alignment issues previously observed with the online dynamic alignment method alone. Purpose-built performance metrics are employed in embodiments to measure the batch trajectory alignment quality. This enables any machine learning workflows.

According to an embodiment, to facilitate the hyperparameter selection for the enhanced alignment method, instead of using a manual trial and error approach, two active learning workflows are used in embodiments, an automated active learning workflow and an interactive active learning workflow. The guided learning can also be used to prepare another run of machine learnings. An alignment environment library can also be included to manage the settings of hyperparameters for active learning workflows and to facilitate alignment environment setup and produce consistent alignment results.

The functionality of U.S. patent application Ser. No. 15/967,099 is improved by embodiments using implicitly generated time series for alignment-guidance pseudo variable(s) and/or explicitly designated alignment-guidance-only process variables. The use of these variables incorporates expertise on advanced batch alignment research and/or domain knowledge of subject matter experts (SMEs) to remediate issues in the online dynamic alignment method. Embodiments solve errors on phase ID prediction and batch maturity progress.

Pseudo variables can be included in embodiments to provide alignment-guidance for batch trajectory alignment. According to an embodiment, purpose-built time series generator functions produce batch trajectory for the pseudo variables, which can be configured or customized in the alignment environment by users. Generator functions that can be utilized in embodiments include any monotonic functions, such as "Steps", "SawTooth", "Sigmoid", or any user-provided monotonic function. The input to a generator function is the current observation's relative index in each batch phase. In other words, the generated batch trajectory for each alignment-guidance pseudo variable is monotonic in each batch phase. In embodiments, the automatically generated trajectories for pseudo variables will be merged together with to-be-aligned batch process variables' trajectories on which the online dynamic alignment is applied. Trajectories produced by different functions may have different effects on alignment quality. After the alignment, the trajectories of pseudo variables can be automatically excluded from the aligned trajectory dataset before applying the dataset for model building, analysis, and predicting.

When the batch trajectory alignment quality is not satisfying, users can utilize their domain knowledge to bring in additional process variables, which are insignificant to the batch process itself, but which can provide meaningful guidance on batch trajectory alignment. These variables are referred to as "alignment-guidance-only process variables". After the alignment, the trajectories of process variables, which are explicitly designated as alignment-guidance-only, can be automatically excluded from the aligned trajectory dataset before applying the dataset for model building, analysis, and predicting. This can reduce unnecessary computing efforts. Failure to explicitly designate insignificant process variables as alignment-guidance-only will not degrade the model built on the aligned trajectory dataset.

Embodiments can employ purpose-built performance metrics to measure batch trajectory alignment quality. These metrics enable the active learning workflow. The metrics evaluate the batch maturity score (smoothness of maturity progress), the phase ID score (errors on batch phase ID prediction), and the total quality score (combined quality measurements). The time it takes to run the alignment process can also be considered in embodiments.

As described above, active learning is a special case of supervised machine learning and well-motivated in many modern machine learning problems, where unlabeled data is easily available, but labels are very time-consuming or expensive to prepare. The active learning workflows in embodiments attempt to work with a smaller sized training dataset by actively selecting the valuable observation data points. Rather than using tedious and time-consuming manual trial and error approaches to tune these settings when the batch trajectory alignment quality is unsatisfactory, embodiments use two active learning workflows: (1) automated active learning and (2) interactive active learning to determine settings.

In an embodiment, the automated active learning workflow includes several of the following automated steps: (1) load selected alignment hyperparameters, the maximum sequence, etc. from the alignment environment; (2) apply a Low Discrepancy Sequences method (LDS) on these hyperparameters to produce a smaller set of their settings as observations for X variables, which provides better uniformity for higher dimensions without a larger set of hyperparameter variations; (3) for each set of alignment hyperparameter settings, run the enhanced online dynamic alignment and label its aligned trajectory quality metrics as observations for Y variables; (4) with the X/Y observation sets prepared, build the model(s) of supervised machine learning algorithm(s) (such as Projection to Latent Structure (PLS) multivariate statistical models), which can be configured at the alignment environment; and (5) apply model analyzers with their constraints (such as a PLS model optimizer with hard or soft bounds), which are configured at the alignment environment, to recommend the settings of alignment hyperparameters to maximize the predicted batch trajectory alignment quality.

According to an embodiment, when the batch trajectory alignment quality is not satisfactory after using the automated workflow, the interactive active learning workflow can be implemented. The interactive active learning workflow is based on the supervised machine learning model(s) built during the automated active learning. The interactive active learning workflow can include several of the following automated steps: (1) load settings, constraints or references from the alignment environment; (2) exploit potential impact of hyperparameter settings (inside/outside typical ranges or options) to the predicted alignment quality; (3) trade off among quality metrics to select settings for alignment hyperparameters; and (4) optionally execute the enhanced online dynamic alignment under the traded off settings of hyperparameters.

In an embodiment, when further exploratory experiments are needed, users, such as subject matter experts, can interactively exploit the supervised machine learning model(s) built, rebuilt, or updated during earlier workflows to gain insights on settings of hyperparameters versus batch trajectory alignment quality metrics. The user can trim and/or change the hyperparameter list and adjust hyperparameter ranges or options to prepare another run of machine learning.

An alignment environment library can be implemented in embodiments to manage settings of hyperparameters for active learning workflows in enhanced online dynamic alignment processes. Alignment environments can include any variety of settings and configuration information used to implement embodiments. For instance, an environment library can include: (1) hyperparameters for the enhanced online dynamic alignment method, such as time smoothness, sliding window size, difference penalty, search interval, etc.; (2) a list of selected alignment-guidance pseudo variable time series monotonic generator functions (including user-defined) if the pseudo variable option is enabled by users; (3) an optional list of explicitly designated alignment-guidance-only process variables; (4) a list of prioritized batch trajectory alignment quality metrics (including user-defined) to be evaluated after each enhanced batch trajectory alignment run; (5) acceptance criteria for the alignment quality metrics; (6) a list of hyperparameters to be exploited in automated or interactive active learning or guided learning workflows and their value ranges/options; (7) a sequence maximum; (8) a list of selected supervised machine learning methods (such as Projection to Latent Structure (PLS) multivariate statistical models); (9) model analyzers (such as AspenTech ProMV model optimizer) for the machine learning methods; (10) settings used in the automated active learning workflow for the machine learning methods; (11) a list of selected model analyzers for the interactive active learning and their settings; and (12) a list of selected model analyzers for the guided learning and their settings, amongst other examples.

An embodiment has a generic alignment environment that has default settings. These may include default settings for alignment hyperparameters, the pseudo variable option enabled with a built-in time series generator function (such as "Steps"), a full list of batch trajectory alignment quality metrics (default definitions), and default acceptance criteria for alignment quality metrics. Embodiments allow users to customize settings for different batch processes or even for the same process that is executed at a different manufacturing plant. A user can customize all tunable settings, provide user-defined functions, and persist these settings into different alignment environments. This allows users to quickly switch from one alignment environment, e.g., collection of alignment settings, to another, and also allows users to get consistent alignment results when the same alignment environment is applied to the same set of batch trajectories.

Embodiments provide significant advantages over existing alignment methods. First, embodiments provide all of the advantages of the online dynamic alignment methods described in U.S. patent application Ser. No. 15/967,099, e.g., the first ever method for aligning batch trajectory in an online fashion for online or offline applications.

Moreover, embodiments remediate alignment issues for industrial batch processes. Amongst other examples, embodiments remediate errors for phase ID prediction, jagged progress for batch maturity, and batches never reaching 100% maturity.

Embodiments implement performance metrics to measure the batch trajectory alignment quality to evaluate alignment results objectively and systematically. This enables the machine learning workflows (the automated and interactive active learnings and the guided learning). Before this, the alignment quality could only be evaluated visually by an expert with domain knowledge.

Embodiments also facilitate selection of alignment hyperparameter settings through learning workflows, instead of the tedious time-consuming manual trial and error approaches existing methods require. The active learning workflows of embodiments work with a smaller sized training dataset by actively selecting the valuable observation data points. The learning workflows can recommend the settings for alignment hyperparameters to maximize the predicted batch trajectory alignment quality within given constraints. The interactive workflow allows users to explore potentials inside and outside typical ranges for the hyperparameters and trade off among the predicted alignment quality metrics to select settings for hyperparameters. When further exploratory experiments are needed, the guided learning can be used to prepare another run of machine learning.

FIG. 24 is a simplified block diagram of a computer-based system 2440 that may be used to perform automated batch data time alignment according to any variety of the embodiments of the present invention described herein. The system 2440 comprises a bus 2443. The bus 2443 serves as an interconnect between the various components of the system 2440. Connected to the bus 2443 is an input/output device interface 2446 for connecting various input and output devices such as a keyboard, mouse, display, speakers, etc. to the system 2440. A central processing unit (CPU) 2442 is connected to the bus 2443 and provides for the execution of computer instructions. Memory 2445 provides volatile storage for data used for carrying out computer instructions. Storage 2444 provides non-volatile storage for software instructions, such as an operating system (not shown). The system 2440 also comprises a network interface 2441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 2440, or a computer network environment such as the computer environment 2550, described herein below in relation to FIG. 25. The computer system 2440 may be transformed into the machines that execute the methods 100, 440, 1020, 1300, 1400*a*, 1400*b*, 16, 1600, 1601, 1602 described herein, for example, by loading software instructions into either memory 2445 or non-volatile storage 2444 for execution by the CPU 2442. One of ordinary skill in the art should further understand that the system 2440 and its various components may be configured to carry out any embodiments or combination of embodiments of the present invention described herein. Further, the system 2440 may implement the various embodiments described herein utilizing any combination of hardware, software, and firmware modules operatively coupled, internally, or externally, to the system 2440.

Figure 25:
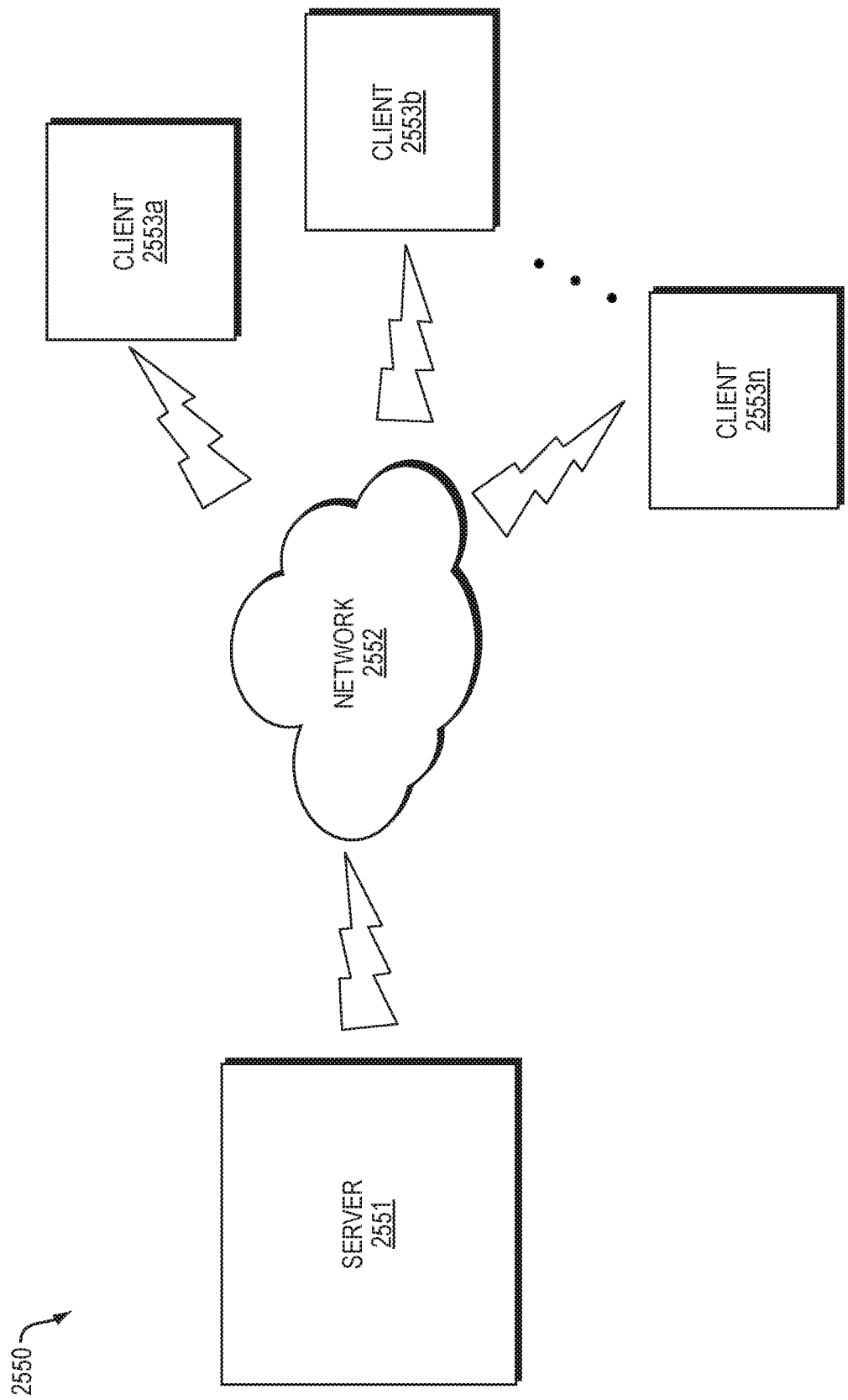
FIG. 25 is a simplified diagram of a computer network environment in which an embodiment of the present invention may be implemented.

FIG. 25 illustrates a computer network environment 2550 in which an embodiment of the present invention may be implemented. In the computer network environment 2550, the server 2551 is linked through the communications network 2552 to the clients 2553*a-n*. The environment 2550 may be used to allow the clients 2553*a-n*, alone or in combination with the server 2551, to implement the network equivalent of system 2440 and any of the embodiments and methods 100, 440, 1020, 1300, 1400*a*, 1400*b*, 16, 1600, 1601, 1602 described herein. For non-limiting example, computer network environment 2550 provides cloud computing embodiments, software as a service (SAAS) embodiments, and the like.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for performing automated batch data alignment for a batch production industrial process, the method comprising:

selecting a reference batch from batch data for an industrial process;
configuring batch alignment settings;
constructing a seed model configured to predict alignment quality given settings for one or more alignment hyperparameters;
using the selected reference batch, the configured batch alignment settings, the constructed seed model, and a set of representative batches, representative of the batch data for the industrial process, performing at least one of: (i) automated active learning, (ii) interactive active learning, and (iii) guided learning to determine settings for the one or more alignment hyperparameters; and
performing batch alignment on a batch from the batch data for the industrial process using the determined settings for the one or more alignment hyperparameters and the configured batch alignment settings, said performing resulting in alignment of batch data of the industrial process in a manner that enables improved modeling of the industrial process.

2. The method of claim 1 wherein configuring batch alignment settings comprises at least one of:

selecting a batch alignment method for performing the batch alignment;
selecting the one or more alignment hyperparameters and corresponding setting ranges for the one or more alignment hyperparameters for performing at least one of the automated active learning, the interactive active learning, and the guided learning;
setting values for at least one hyperparameter of the one or more alignment hyperparameters;
selecting constraints and settings for performing at least one of the automated active learning, the interactive active learning, and the guided learning;
selecting and customizing performance metrics for evaluating alignment results for at least one batch of the set of representative batches during an alignment experiment;
setting up acceptance criteria for at least one of the automated active learning, the interactive active learning, and the guided learning based on selected performance metrics; and
selecting to enable or disable early termination of performing at least one of the automated active learning, the interactive active learning, and the guided learning upon satisfying acceptance criteria.

3. The method of claim 2 wherein selecting a batch alignment method for performing the batch alignment on the batch comprises:

selecting a base batch alignment method.

4. The method of claim 3 further comprising at least one of:

enhancing the selected base batch alignment method with one or more alignment-guidance pseudo variables by performing at least one of: (i) selecting the one or more alignment-guidance pseudo variables to be included as a process variable for the batch, (ii) selecting one or more generator functions for generating one or more alignment-guidance pseudo variable time series for the one or more alignment-guidance pseudo variables, and (iii) selecting one or more if/what customizations for one or more generator functions; and
enhancing the selected base batch alignment method with one or more alignment-guidance only process variables by selecting the one or more alignment-guidance only process variables to be included as a process variable for the batch.

5. The method of claim 1 wherein constructing the seed model comprises:
selecting (i) an alignment method, (ii) hyperparameters associated with the selected alignment method (iii) respective settings for the selected hyperparameters, and (iv) a minimum number of observations to build the seed model;
determining a set of alignment experiments to perform based upon the selected (i) alignment method, (ii) hyperparameters associated with the selected alignment method (iii) respective settings for the selected hyperparameters, and (iv) minimum number of observations to build the seed model;
executing each experiment in the determined set of alignment experiments to generate respective alignment results for the set of representative batches;
quantifying the respective alignment results with selected performance metrics for each experiment; and
constructing the seed model based upon the quantified respective alignment results and the respective settings for the selected hyperparameters.

6. The method of claim 5 wherein the set of alignment experiments is determined using at least one of:
low-discrepancy sequence processing;
design of experiments processing;
randomly generating experiment conditions; and
uniformly generating experiment conditions.

7. The method of claim 5 wherein executing each experiment in the determined set of alignment experiments comprises:
executing each experiment in the determined set sequentially; or
executing each experiment in the determined set in parallel.

8. The method of claim 1 wherein performing automated active learning comprises:
configuring constraints and alignment quality settings for performing the automated active learning;
using the constructed seed model, the configured constraints, and the configured alignment quality settings, automatically determining a given setting for the one or more alignment hyperparameters that maximizes an alignment quality score as predicted by the constructed seed model;
performing an experimental batch alignment on at least one batch of the set of representative batches using the given setting for the one or more alignment hyperparameters; and
if results of performing the experimental batch alignment satisfy a criterion, maintaining the given setting for the one or more alignment hyperparameters, and if the results do not satisfy the criteria, updating or rebuilding the constructed seed model and iterating (i) the configuring constraints and the alignment quality settings, (ii) the automatically determining a given setting, and (iii) the performing an experimental batch alignment.

9. The method of claim 1 wherein performing the interactive active learning comprises:
configuring constraints and alignment quality settings for performing the interactive active learning;
using the constructed seed model, the configured constraints, and the configured alignment quality settings, interactively recommending a given setting for the one or more alignment hyperparameters;
performing an experimental batch alignment on at least one batch of the set of representative batches using the given setting for the one or more alignment hyperparameters;
if results of performing the experimental batch alignment satisfy a criterion or based on user input:
maintaining the given setting for the one or more alignment hyperparameters; or
updating or rebuilding the constructed seed model and iterating (i) the configuring constraints and the alignment quality settings, (ii) the interactively recommending the given setting, and (iii) the performing an experimental batch alignment; and
if results of performing the experimental batch alignment do not satisfy a criterion or based on user input:
updating or rebuilding the constructed seed model and iterating (i) the configuring constraints and the alignment quality settings, (ii) the interactively recommending the given setting, and (iii) the performing an experimental batch alignment.

10. The method of claim 1 wherein performing the guided learning process comprises:
based upon user input and the constructed seed model, performing at least one of:
analyzing importance of the one or more alignment hyperparameters and impact of the one or more alignment hyperparameters on alignment quality predicted by the constructed seed model;
customizing alignment quality performance metrics and acceptance criteria;
customizing alignment-guidance pseudo time series generator functions;
adjusting ranges, options, or constraints for the one or more alignment hyperparameters; and
performing a batch alignment experiment on at least one batch of the set of representative batches using an exploratory setting for the one or more alignment hyperparameters to confirm impact of the one or more alignment hyperparameters to alignment quality.

11. The method of claim 1 further comprising, after performing batch alignment on the batch:
determining if the performed batch alignment satisfies acceptance criteria; and
if the performed batch alignment does not satisfy the acceptance criteria, iteratively performing, until the performed batch alignment satisfies the acceptance criteria:
updating or rebuilding the constructed seed model;
using the updated or rebuilt constructed seed model, the selected reference batch, the configured batch alignment settings, and the set of representative batches, performing at least one of (i) automated active learning, (ii) interactive active learning, and (iii) guided learning to determine settings for the one or more alignment hyperparameters;
performing the batch alignment on the batch using the settings for the one or more alignment hyperparameters determined using the updated or rebuilt constructed seed model and the configured batch alignment settings; and
determining if the batch alignment performed using the settings for the one or more alignment hyperparameters determined using the updated or rebuilt constructed seed model satisfy the acceptance criteria.

12. The method of claim 1 further comprising:
storing and managing the determined settings for the one or more alignment hyperparameters in an alignment environment library.

13. The method of claim 12 wherein storing and managing the determined settings for the one or more alignment hyperparameters in the alignment environment library comprises:
associating the determined settings for the one or more alignment hyperparameters with the batch data for the industrial process;
classifying and organizing the determined settings for the one or more alignment hyperparameters based on at least one of: industrial processes, plants, and operating conditions for transfer learning; and
applying the determined settings for the one or more alignment hyperparameters as a starting point for a new batch data set.

14. A system for performing automated batch data alignment for a batch production industrial process, the system comprising:
a processor; and
a memory with computer code instructions stored thereon, the processor and the memory, with the computer code instructions, being configured to cause the system to:
select a reference batch from batch data for an industrial process;
configure batch alignment settings;
construct a seed model configured to predict alignment quality given settings for one or more alignment hyperparameters;
using the selected reference batch, the configured batch alignment settings, the constructed seed model, and a set of representative batches, representative of the batch data for the industrial process, perform at least one of: (i) automated active learning, (ii) interactive active learning, and (iii) guided learning to determine settings for the one or more alignment hyperparameters; and
perform batch alignment on a batch from the batch data for the industrial process using the determined settings for the one or more alignment hyperparameters and the configured batch alignment settings, said performing resulting in alignment of batch data of the industrial process in a manner that enables improved modeling of the industrial process.

15. The system of claim 14 wherein, in configuring batch alignment settings, the processor and the memory, with the computer code instructions, are further configured to cause the system to perform at least one of:
selecting a batch alignment method for performing the batch alignment;
selecting the one or more alignment hyperparameters and corresponding setting ranges for the one or more alignment hyperparameters for performing at least one of the automated active learning, the interactive active learning, and the guided learning;
setting values for at least one hyperparameter of the one or more alignment hyperparameters;
selecting constraints and settings for performing at least one of the automated active learning, the interactive active learning, and the guided learning;
selecting and customizing performance metrics for evaluating alignment results for at least one batch of the set of representative batches during an alignment experiment;
setting up acceptance criteria for at least one of the automated active learning, the interactive active learning, and the guided learning based on selected performance metrics; and
selecting to enable or disable early termination of performing at least one of the automated active learning, the interactive active learning, and the guided learning upon satisfying acceptance criteria.

16. The system of claim 15 wherein, in selecting a batch alignment method for performing the batch alignment on the batch, the processor and the memory, with the computer code instructions, are further configured to cause the system to:
select a base batch alignment method.

17. The system of claim 16, wherein the processor and the memory, with the computer code instructions, are further configured to cause the system to perform at least one of:
enhancing the selected base batch alignment method with one or more alignment-guidance pseudo variables by performing at least one of: (i) selecting the one or more alignment-guidance pseudo variables to be included as a process variable for the batch, (ii) selecting one or more generator functions for generating one or more alignment-guidance pseudo variable time series for the one or more alignment-guidance pseudo variables, and (iii) selecting one or more if/what customizations for one or more generator functions; and
enhancing the selected base batch alignment method with one or more alignment-guidance only process variables by selecting the one or more alignment-guidance only process variables to be included as a process variable for the batch.

18. The system of claim 15 wherein, in constructing the seed model, the processor and the memory, with the computer code instructions, are further configured to cause the system to:
select (i) an alignment method, (ii) hyperparameters associated with the selected alignment method (iii) respective settings for the selected hyperparameters, and (iv) a minimum number of observations to build the seed model;
determine a set of alignment experiments to perform based upon the selected (i) alignment method, (ii) hyperparameters associated with the selected alignment method (iii) respective settings for the selected hyperparameters, and (iv) minimum number of observations to build the seed model;
execute each experiment in the determined set of alignment experiments to generate respective alignment results for the set of representative batches;
quantify the respective alignment results with selected performance metrics for each experiment; and
construct the seed model based upon the quantified respective alignment results and the respective settings for the selected hyperparameters.

19. The system of claim 18 wherein, the processor and the memory, with the computer code instructions, are further configured to cause the system to determine the set of alignment experiments using at least one of:
low-discrepancy sequence processing;
design of experiments processing;
randomly generating experiment conditions; and
uniformly generating experiment conditions.

20. The system of claim 18 wherein, in executing each experiment in the determined set of alignment experiments, the processor and the memory, with the computer code instructions, are further configured to cause the system to:

execute each experiment in the determined set sequentially; or execute each experiment in the determined set in parallel.

21. The system of claim 14 wherein, in performing automated active learning, the processor and the memory, with the computer code instructions, are further configured to cause the system to:

configure constraints and alignment quality settings for performing the automated active learning;

using the constructed seed model, the configured constraints, and the configured alignment quality settings, automatically determine a given setting for the one or more alignment hyperparameters that maximizes an alignment quality score as predicted by the constructed seed model;

perform an experimental batch alignment on at least one batch of the set of representative batches using the given setting for the one or more alignment hyperparameters; and if results of performing the experimental batch alignment satisfy a criterion, maintain the given setting for the one or more alignment hyperparameters, and if the results do not satisfy the criteria, update or rebuild the constructed seed model and iterate (i) the configuring constraints and the alignment quality settings, (ii) the automatically determining a given setting, and (iii) the performing an experimental batch alignment.

22. The system of claim 14 wherein, in performing the interactive active learning, the processor and the memory, with the computer code instructions, are further configured to cause the system to:

configure constraints and alignment quality settings for performing the interactive active learning;

using the constructed seed model, the configured constraints, and the configured alignment quality settings, interactively recommend a given setting for the one or more alignment hyperparameters;

perform an experimental batch alignment on at least one batch of the set of representative batches using the given setting for the one or more alignment hyperparameters;

if results of performing the experimental batch alignment satisfy a criterion or based on user input:

maintain the given setting for the one or more alignment hyperparameters; or update or rebuild the constructed seed model and iterate (i) the configuring constraints and the alignment quality settings, (ii) the interactively recommending the given setting, and (iii) the performing an experimental batch alignment; and if results of performing the experimental batch alignment do not satisfy a criterion or based on user input:

update or rebuild the constructed seed model and iterate (i) the configuring constraints and the alignment quality settings, (ii) the interactively recommending the given setting, and (iii) the performing an experimental batch alignment.

23. The system of claim 14 wherein, in performing the guided learning process, the processor and the memory, with the computer code instructions, are further configured to cause the system to:

based upon user input and the constructed seed model, perform at least one of:

analyzing importance of the one or more alignment hyperparameters and impact of the one or more alignment hyperparameters on alignment quality predicted by the constructed seed model;

customizing alignment quality performance metrics and acceptance criteria;

customizing alignment-guidance pseudo time series generator functions;

adjusting ranges, options, or constraints for the one or more alignment hyperparameters; and performing a batch alignment experiment on at least one batch of the set of representative batches using an exploratory setting for the one or more alignment hyperparameters to confirm impact of the one or more alignment hyperparameters to alignment quality.

24. The system of claim 14 wherein, the processor and the memory, with the computer code instructions, are further configured to cause the system to, after performing batch alignment on the batch:

determine if the performed batch alignment satisfies acceptance criteria; and if the performed batch alignment does not satisfy the acceptance criteria, iteratively perform, until the performed batch alignment satisfies the acceptance criteria:

updating or rebuilding the constructed seed model;

using the updated or rebuilt constructed seed model, the selected reference batch, the configured batch alignment settings, and the set of representative batches, performing at least one of (i) automated active learning, (ii) interactive active learning, and (iii) guided learning to determine settings for the one or more alignment hyperparameters;

performing the batch alignment on the batch using the settings for the one or more alignment hyperparameters determined using the updated or rebuilt constructed seed model and the configured batch alignment settings; and determining if the batch alignment performed using the settings for the one or more alignment hyperparameters determined using the updated or rebuilt constructed seed model satisfy the acceptance criteria.

25. The system of claim 14 wherein the processor and the memory, with the computer code instructions, are further configured to cause the system to:

store and manage the determined settings for the one or more alignment hyperparameters in an alignment environment library.

26. The system of claim 14 wherein, in storing and managing the determined settings for the one or more alignment hyperparameters in the alignment environment library, the processor and the memory, with the computer code instructions, are further configured to cause the system to:

associate the determined settings for the one or more alignment hyperparameters with the batch data for the industrial process;

classify and organize the determined settings for the one or more alignment hyperparameters based on at least one of: industrial processes, plants, and operating conditions for transfer learning; and apply the determined settings for the one or more alignment hyperparameters as a starting point for a new batch data set.

27. A non-transitory computer program product for performing automated batch data alignment for a batch production industrial process, the computer program product comprising a computer-readable medium with computer code instructions stored thereon, the computer code instructions being configured, when executed by a processor, to cause an apparatus associated with the processor to:
- select a reference batch from batch data for an industrial process;
- configure batch alignment settings;
- construct a seed model configured to predict alignment quality given settings for one or more alignment hyperparameters;
- using the selected reference batch, the configured batch alignment settings, the constructed seed model, and a set of representative batches, representative of the batch data for the industrial process, perform at least one of: (i) automated active learning, (ii) interactive active learning, and (iii) guided learning to determine settings for the one or more alignment hyperparameters; and
- perform batch alignment on a batch from the batch data for the industrial process using the determined settings for the one or more alignment hyperparameters and the configured batch alignment settings, said performing resulting in alignment of batch data of the industrial process in a manner that enables improved modeling of the industrial process.

\* \* \* \* \*